(12) United States Patent
Donnay et al.

(10) Patent No.: US 8,567,453 B2
(45) Date of Patent: Oct. 29, 2013

(54) APPARATUS, METHODS, COMPONENTS, AND SYSTEMS FOR ASSEMBLING AND/OR INFLATING A TIRE-WHEEL ASSEMBLY

(75) Inventors: John Donnay, Fenton, MI (US); Gregory J. Masserang, Clarkston, MI (US); James Thomas-Charles Krom, Huntington Woods, MI (US); Patrick W. Zoller, Royal Oak, MI (US); Joshua James Hicks, Clarkston, MI (US); David Henry Larson, Swartz Creek, MI (US)

(73) Assignee: Android Industries LLC, Auburn Hills, MI (US)

( * ) Notice: Subject to any disclaimer, the term of this patent is extended or adjusted under 35 U.S.C. 154(b) by 504 days.

(21) Appl. No.: 12/961,289

(22) Filed: Dec. 6, 2010

(65) Prior Publication Data
US 2011/0132491 A1 Jun. 9, 2011

Related U.S. Application Data

(60) Provisional application No. 61/285,093, filed on Dec. 9, 2009.

(51) Int. Cl.
*B65B 31/00* (2006.01)
*B60C 25/00* (2006.01)

(52) U.S. Cl.
USPC ..................... 141/38; 157/1; 157/1.1

(58) Field of Classification Search
USPC ......... 141/38, 95, 197; 157/1, 1.1, 1.11, 1.17, 157/1.22, 1.33
See application file for complete search history.

(56) References Cited

U.S. PATENT DOCUMENTS

| | | | | |
|---|---|---|---|---|
| 6,148,892 A | * | 11/2000 | Koerner et al. | 157/1.1 |
| 7,044,188 B2 | * | 5/2006 | Pellerin et al. | 157/1.17 |
| 7,584,775 B2 | * | 9/2009 | Nomura | 157/1.17 |
| 8,096,328 B2 | * | 1/2012 | Hoenke | 141/38 |
| 8,161,650 B2 | * | 4/2012 | Lawson et al. | 29/894.31 |
| 8,176,960 B2 | * | 5/2012 | Lawson et al. | 157/1 |
| 8,365,794 B2 | * | 2/2013 | Lawson et al. | 157/1.1 |

FOREIGN PATENT DOCUMENTS

| | | |
|---|---|---|
| JP | 11301226 A | 11/1999 |
| KR | 10-0476219 | 3/2005 |
| KR | 20080049591 A | 6/2008 |
| WO | WO-9834802 A1 | 8/1998 |

OTHER PUBLICATIONS

International Search Report for Application PCT/US2010/059356 dated Jul. 22, 2011.

* cited by examiner

*Primary Examiner* — Timothy L Maust
*Assistant Examiner* — Brandon J Warner
(74) *Attorney, Agent, or Firm* — Honigman Miller Schwartz and Cohn LLP

(57) ABSTRACT

An apparatus for processing an un-inflated tire-wheel assembly for forming an inflated tire-wheel assembly is disclosed. The apparatus includes at least a first robotic arm and a second robotic arm forming a pair of robotic arms; an assembling end effecter attached to the first robotic arm; and an inflating end effecter attached to the second robotic arm, wherein the assembling end effecter is indirectly interfaceable with the inflating end effecter by way of the un-inflated tire-wheel assembly. One or more methods are also disclosed. One or more components are also disclosed. One or more systems are also disclosed.

29 Claims, 38 Drawing Sheets

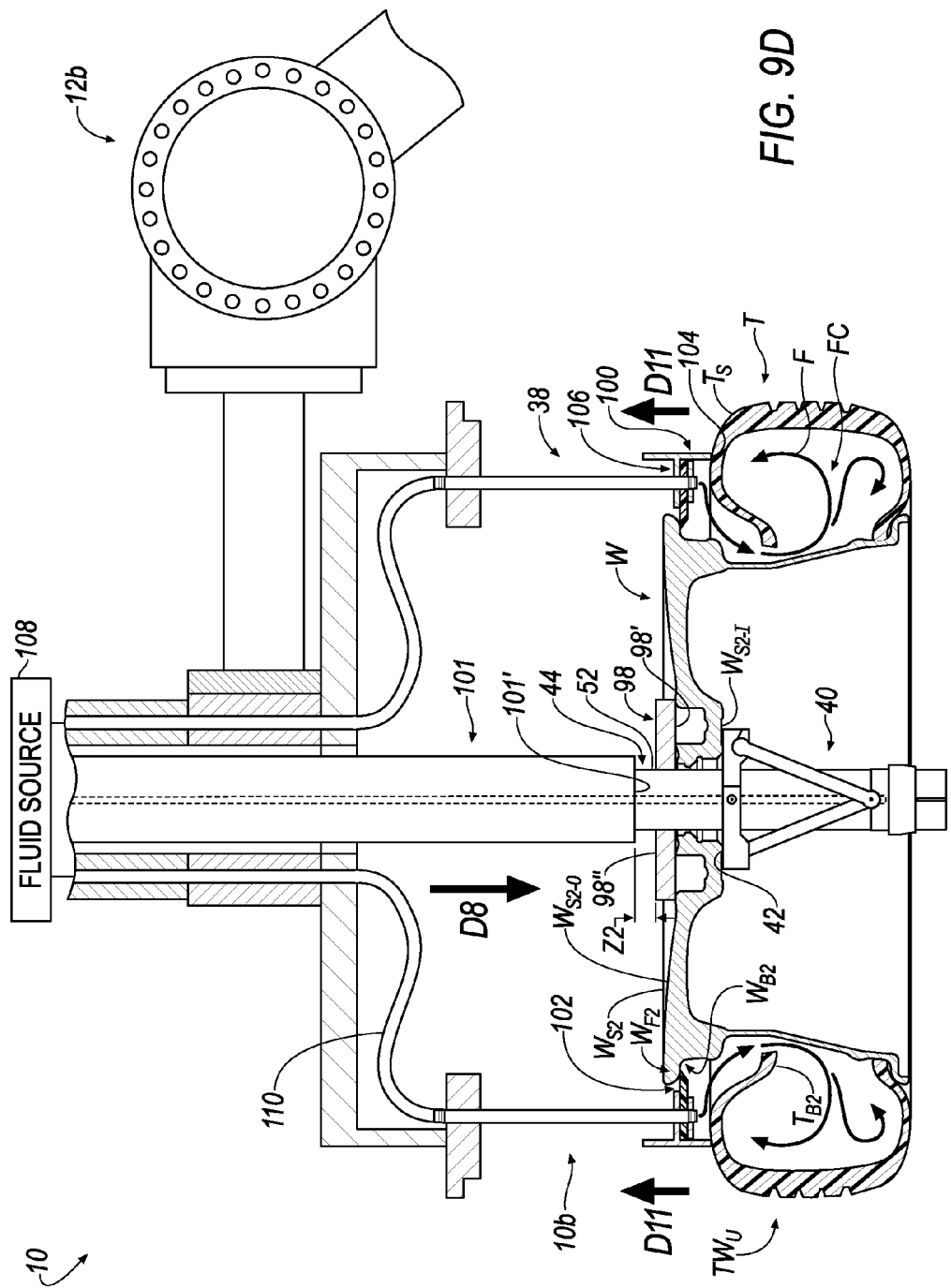

APPARATUS, METHODS, COMPONENTS, AND SYSTEMS FOR ASSEMBLING AND/OR INFLATING A TIRE-WHEEL ASSEMBLY

RELATED APPLICATION

This application claims the benefit of U.S. Provisional Application 61/285,093 filed Dec. 9, 2009, which is entirely incorporated herein by reference.

FIELD OF THE INVENTION

The disclosure relates to tire-wheel assemblies and to a method and apparatus for processing a tire-wheel assembly.

DESCRIPTION OF THE RELATED ART

It is known in the art that a tire-wheel assembly is processed in several steps. Usually, conventional methodologies that conduct such steps require a significant capital investment and human oversight. The present invention overcomes drawbacks associated with the prior art by setting forth a device utilized for processing a tire-wheel assembly.

BRIEF DESCRIPTION OF THE DRAWINGS

The disclosure will now be described, by way of example, with reference to the accompanying drawings, in which:

FIG. 9D-9E illustrates the orientation of the inflating end effecter of the apparatus being further manipulated during the inflation procedure for inflating the un-inflated tire-wheel assembly according to FIG. 9C in accordance with an exemplary embodiment of the invention;

DETAILED DESCRIPTION OF THE INVENTION

Figure 1:
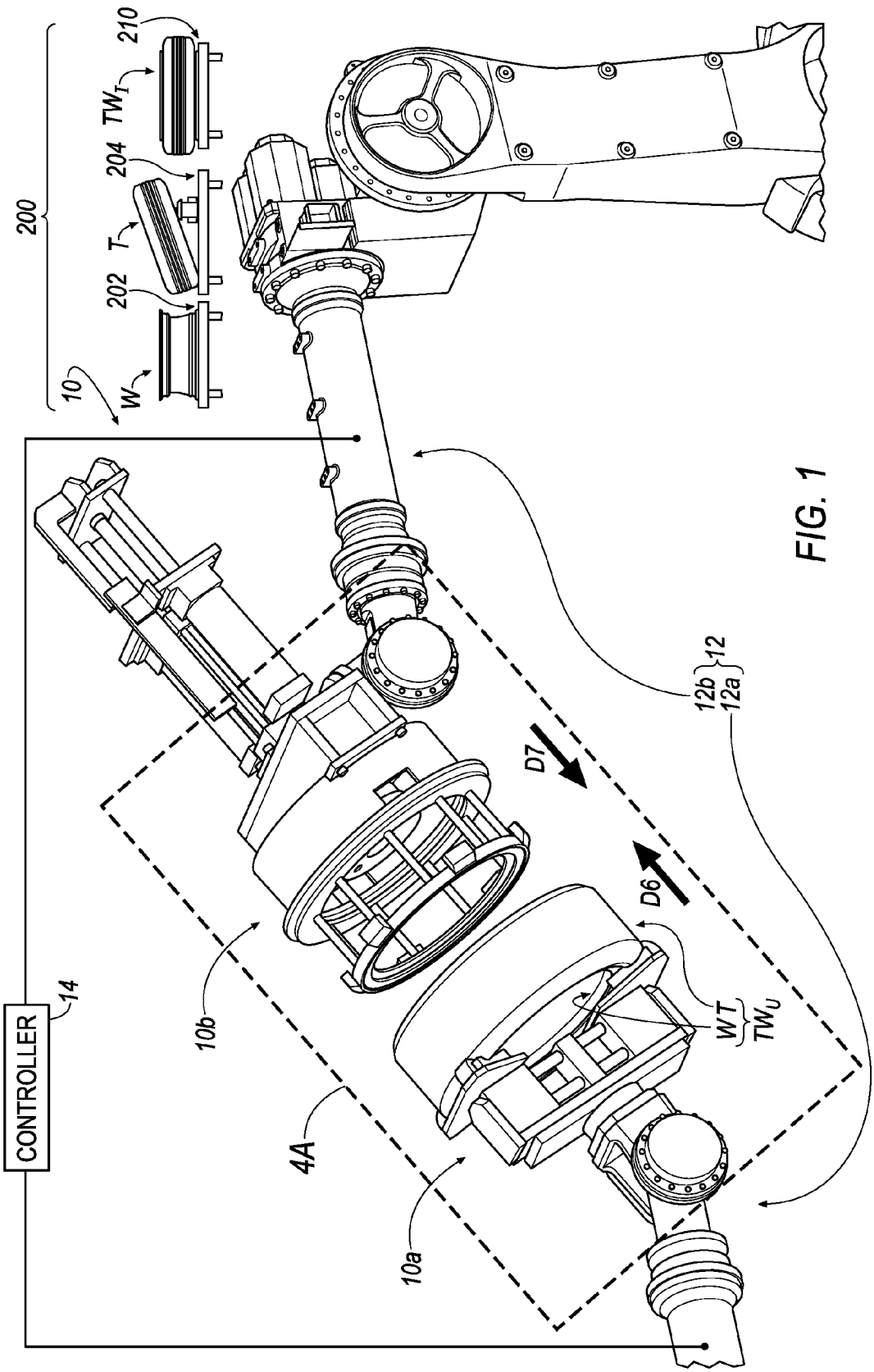
FIG. 1 illustrates a perspective view of an apparatus including an assembling end effecter for assembling an un-inflated tire-wheel assembly and an inflating end effecter for inflating the assembled, un-inflated tire-wheel assembly in accordance with an exemplary embodiment of the invention.

The Figures illustrate an exemplary embodiment of an apparatus, methods, components and systems for assembling and/or inflating a tire-wheel assembly in accordance with an embodiment of the invention. Based on the foregoing, it is to be generally understood that the nomenclature used herein is simply for convenience and the terms used to describe the invention should be given the broadest meaning by one of ordinary skill in the art.

An apparatus for processing a tire-wheel assembly is shown generally at 10 in accordance with an exemplary embodiment of the invention. In an embodiment, the apparatus 10 includes at least an assembling end effecter 10a for joining a wheel, W, to a tire, T, in order to provide an un-inflated tire-wheel assembly, $TW_U$, and, an inflating end effecter 10b for inflating the un-inflated tire-wheel assembly, $TW_U$, for providing an inflated tire-wheel assembly, $TW_1$ (see also, e.g., FIG. 9F).

In an embodiment, each of the assembling end effecter 10a and the inflating end effecter 10b are respectively connected to a robotic arm 12a, 12b forming a pair of robotic arms 12. In an embodiment, the pair of robotic arms 12 may include any desirable design or components to permit each robotic arm 12a, 12b of the pair of the robotic arms 12 to have any desirable spatial movement. For example, each robotic arm 12a, 12b of the pair of robotic arms 12 may include pivot joints, hinges, telescoping sections and the like. Further, in an embodiment, the spatial movements provided by each robotic arm 12a, 12b of the pair of the robotic arms 12 may be provided by any type of actuator (not shown) including, but not limited to: one or more motors, hydraulic cylinders, solenoid actuators or the like.

In an embodiment, the assembling end effecter 10a, inflating end effecter 10b and each robotic arm 12a, 12b of the pair of robotic arms 12 may be connected to a controller 14. In an embodiment, the controller 14 may control movements of one or more of the assembling end effecter 10a, inflating end effecter 10b and each robotic arm 12a, 12b of the pair of robotic arms 12. It will be appreciated that the foregoing movements of the assembling end effecter 10a, inflating end effecter 10b and pair of robotic arms 12 may be automatic. In an embodiment, the automatic movement of the assembling end effecter 10a, inflating end effecter 10b and each robotic arm 12a, 12b of the pair of robotic arms 12 may be carried out in a pre-determined fashion (e.g., by way of a program stored within the controller 14). However, in an embodiment, it will be appreciated that movements of the assembling end effecter 10a, inflating end effecter 10b and each robotic arm 12a, 12b of the pair of robotic arms 12 may be carried out manually by way of an operator that controls, for example, a joystick (not shown) that may cause movements of one or more of the assembling end effecter 10a, inflating end effecter 10b and each robotic arm 12a, 12b of the pair of robotic arms 12.

Referring now to FIGS. 2A-3E, a method for utilizing the assembling end effecter 10a of the apparatus 10 for joining a wheel, W, to a tire, T, to form an un-inflated tire-wheel assembly, $TW_U$, is described according to an embodiment of the invention. In describing the method for utilizing assembling end effecter 10a, it will be appreciated that the assembling end effecter 10a may be later indirectly interface able with/ indirectly joined to (by way of the un-inflated tire-wheel assembly, $TW_U$) the inflating end effecter 10b (see, e.g., FIG. 4D); as such, in an embodiment, the assembling end effecter 10a may be said to "hand off" the un-inflated tire-wheel assembly, $TW_U$, to the inflating end effecter 10b without directly engaging the inflating end effecter 10b. As such, it will be appreciated that the assembling end effecter 10a may operate independently of the inflating end effecter 10b during, for example, the method for joining the wheel, W, to the tire, T; thus, it will be appreciated that, in one aspect of the invention, the inflating end effecter 10b is not a critical or essential feature of the apparatus 10 that is required for the assembling end effecter 10a to properly function or operate during, for example, the assembling procedure shown and described at FIGS. 2A-3E.

Figure 2A:
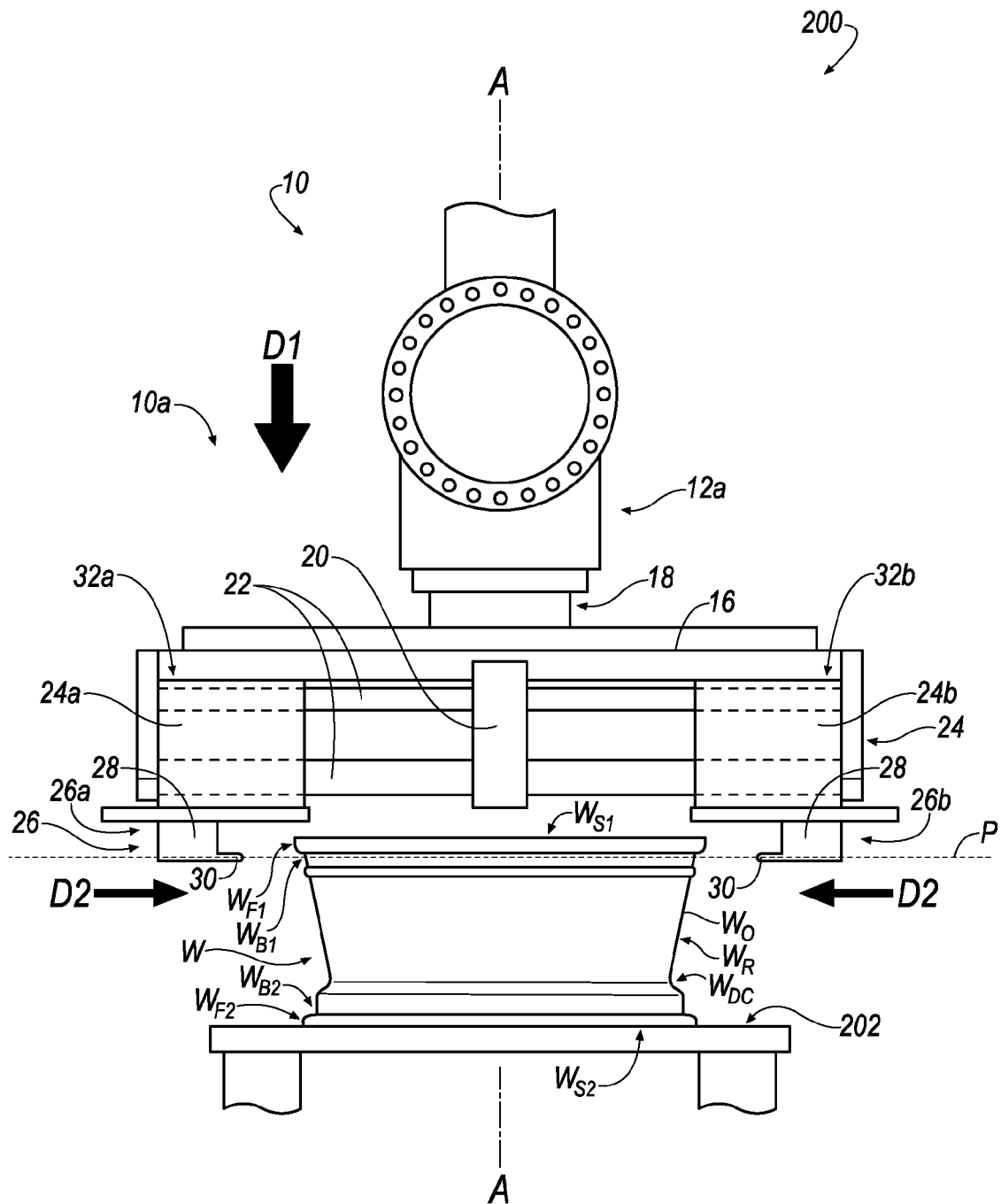
FIG. 2A illustrates a partial side view of the assembling end effecter of the apparatus of FIG. 1 prior to engaging a wheel in accordance with an exemplary embodiment of the invention.

Referring to FIG. 2A, a wheel is shown generally at W according to an embodiment of the invention. In an embodiment, the wheel, W, includes a first side, $W_{S1}$, a second side, $W_{S2}$, and a rim portion, $W_R$, extending between the first side, $W_{S1}$, and the second side, $W_{S2}$. In an embodiment, the first side, $W_{S1}$, includes a first flange, $W_R$, and, the second side, $W_{S2}$, includes a second flange, $W_{F2}$. In an embodiment, the rim portion, $W_R$, and the first flange, $W_{F1}$, form a first bead seat, $W_{B1}$, and, the rim portion, $W_R$, and the second flange, $W_{F2}$, form a second bead seat, $W_{B2}$. A drop-center portion of the rim portion, $W_R$, is shown generally at $W_{DC}$ according to an embodiment.

In an embodiment, the second side, $W_{S2}$, of the wheel, W, is shown to be located adjacent a support surface, such as, for example, a conveyor 202. As seen in each of FIGS. 1 and 2A, in an embodiment, the apparatus 10 and the conveyor 202 may be said to be components of a system 200 for assembling and inflating an un-inflated tire-wheel assembly, $TW_U$.

In an embodiment, as seen in FIG. 2A, the assembling end effecter 10a is shown in a spatial orientation that is proximate, but not yet engaging, the wheel, W. In an embodiment, the assembling end effecter 10a includes, for example, a base portion 16 connected to a distal end 18 of the first robotic arm 12a.

In an embodiment, the assembling end effecter 10a may further include a bracket 20 connected to the base portion 16. In an embodiment, the bracket 20 may be joined to one or more flanges 22 that are connected to a pair of sliding members 24 including a first sliding member 24a and a second sliding member 24b. In an embodiment, the first and second sliding members 24a, 24b are slidably-supported upon the one or more flanges 22.

In an embodiment, assembling end effecter 10a further includes a pair of wheel-engaging members 26 including a first wheel-engaging member 26a and a second wheel-engaging member 26b. In an embodiment, the first wheel-engaging member 26a is attached to the first sliding member 24a and the second wheel-engaging member 26b is attached to the second sliding member 24b.

In an embodiment, each wheel-engaging member 26a, 26b of the pair of wheel-engaging members 26 includes an arm portion 28 and a finger portion 30. In an embodiment, the arm portion 28 extends axially away from the sliding member 24a, 24b, and, in an embodiment, the finger portion 30 extends radially inwardly and away from the arm portion 28. In an embodiment, the relative axial and radial descriptions provided above are referenced from an axis, A-A, extending through an axial center of the wheel, W, that is co-axial with an axial center of the assembling end effecter 10a.

In order to initiate an assembling operation for joining a wheel, W, to a tire, T, to form an un-inflated tire-wheel assembly, $TW_U$, the assembling end effecter 10a is firstly disposed in a spatial orientation that is proximate, but not yet engaging the wheel, W, according to the direction of the arrow, D1, as seen in FIG. 2A. Movement according to the direction of the arrow, D1, may result in the finger portion 30 of each wheel-engaging member 26a, 26b of the pair of wheel-engaging members 26 being arranged in a spaced, opposing relationship with an outer surface, $W_O$, of the rim portion, $W_R$, of the wheel, W.

In an embodiment, for the above-described spaced, opposing relationship to take place, the pair of sliding members 24 are said to be initially arranged in an "expanded orientation" such that each sliding member 24a, 24b of the pair of sliding members 24 are slidably disposed at least proximate terminal ends 32a, 32b of the one or more flanges 22. It will be appreciated that the "expanded orientation" of the pair of sliding members 24 permits each wheel-engaging member 26a, 26b of the pair of wheel-engaging members 26 to be positioned in a manner that does not result in the wheel, W, interfering with the movements of the assembling end effecter 10a according to the direction of the arrow, D1. In an embodiment, movement of the assembling end effecter 10a according to the direction of the arrow, D1, may terminate approximately when not only the finger portion 30 of each wheel-engaging member 26a, 26b of the pair of wheel-engaging members 26 are arranged in the spaced, opposing relationship with an outer surface, $W_O$, of the rim portion, $W_R$, of the wheel, W, but also when the finger portion 30 of each wheel-engaging member 26a, 26b of the pair of wheel-engaging members 26 are arranged in a substantially co-planar relationship, P, with the first bead seat, $W_{B1}$, of the wheel, W.

Upon locating the finger portion 30 of each wheel-engaging member 26a, 26b of the pair of wheel-engaging members 26 relative the wheel, W, as described above, the assembling end effecter 10a may be actuated in order to move each sliding member 24a, 24b of the pair of sliding members 24 to be disposed at least proximate the terminal ends 32a, 32b of the one or more flanges 22 from the "expanded orientation" to a "contracted orientation" (see, e.g., FIGS. 2B, 2C) according to the direction of the arrow, D2. In an embodiment, movement according to the direction of the arrow, D2, results in each sliding member 24a, 24b of the pair of sliding members 24 being moved radially inwardly and away from the terminal ends 32a, 32b of the one or more flanges 22 and toward an axial center of the assembling end effecter 10a.

Figure 2B:
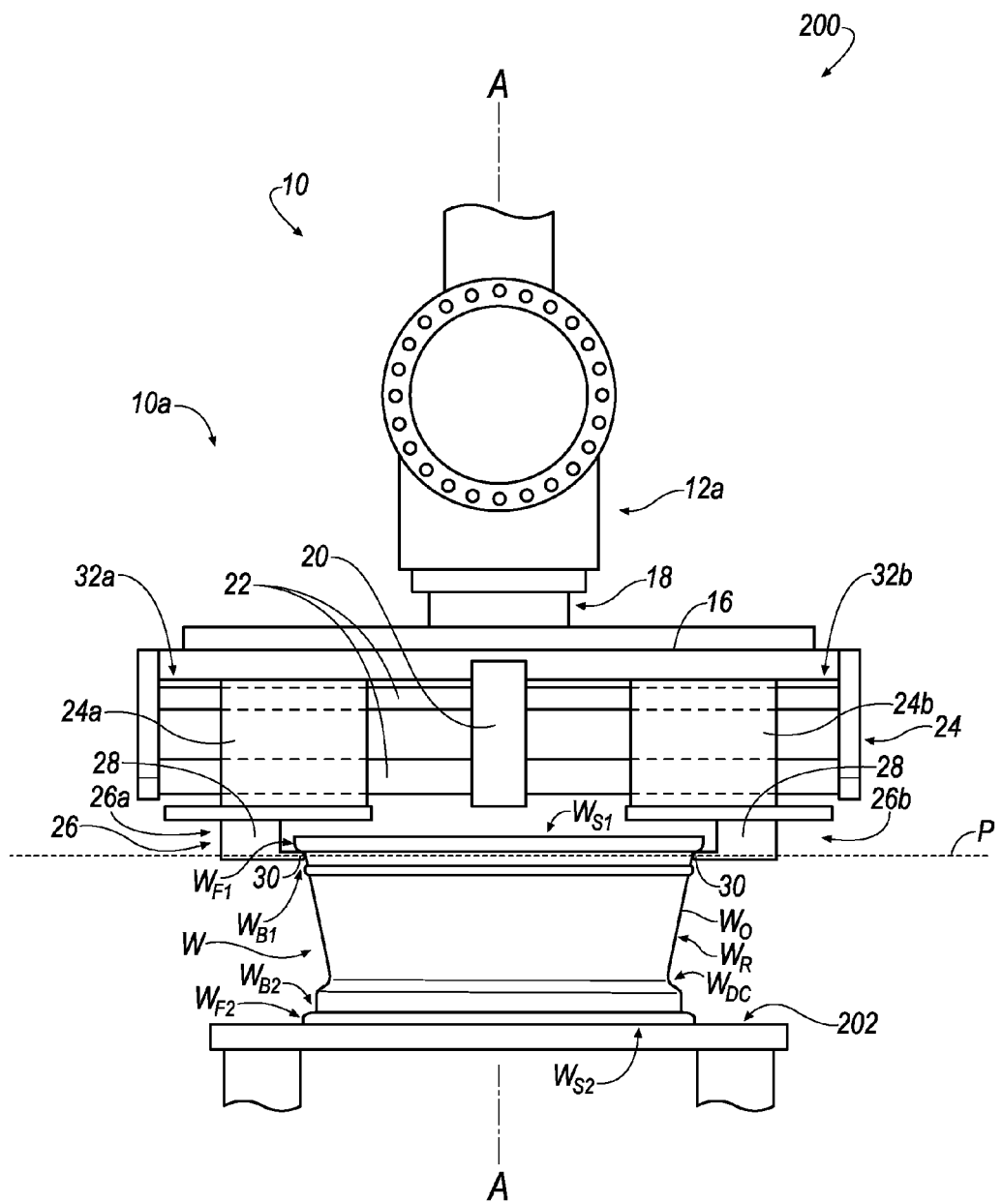
FIGS. 2B-2C illustrate partial side views of the assembling end effecter of the apparatus according to FIG. 2A that is manipulated to an orientation that is proximate to/directly engaged with a wheel in accordance with an exemplary embodiment of the invention.

Referring to FIG. 2B, in an embodiment, movement according to the direction of the arrow, D2, results in the finger portion 30 of each wheel-engaging member 26a, 26b of the pair of wheel-engaging members 26 coming into contact with and engaging the first bead seat, $W_{B1}$, of the wheel, W. Upon the finger portion 30 of each wheel-engaging member 26a, 26b of the pair of wheel-engaging members 26 coming into contact with and engaging the first bead seat, $W_{B1}$, of the wheel, W, movement of each sliding member 24a, 24b of the pair of sliding members 24 according to the direction of the arrow, D2, may cease.

In an alternative embodiment, movement of each sliding member 24a, 24b of the pair of sliding members 24 according to the direction of the arrow, D2, may further result in the finger portion 30 of each wheel-engaging member 26a, 26b of the pair of wheel-engaging members 26 being arranged in a substantially close, but spaced, opposing relationship with one or more of the first bead seat, $W_{B1}$, and the first flange, $W_{F1}$, of the wheel, W. In an embodiment, the close, but spaced, opposing relationship of the finger portion 30 of each wheel-engaging member 26a, 26b with one or more of the first bead seat, $W_{B1}$, and the first flange, $W_{F1}$, of the wheel, W, may prevent the finger portions 30 from scraping or otherwise degrading the surface characteristic of one or more of the first bead seat, $W_{B1}$, and the first flange, $W_{F1}$, of the wheel, W.

In an embodiment, it will be appreciated that the substantially close but contact-less positioning of the finger portions 30 and the wheel, W, may result in the fingers 30 not initially contacting the wheel, W, but, may result in subsequent contact of the finger portions 30 with the wheel, W. For example, in an embodiment, when the assembling end effecter 10a is moved axially away from the conveyor 202 according to the direction of the arrow, D3, as seen in FIG. 2C, the fingers 30 may be also be axially moved relative the wheel, W, such that the fingers 30 may axially contact, for example, the first flange, $W_{F1}$, of the wheel, W (without, for example, radially contacting the first bead seat, $W_{B1}$), in order to axially lift the wheel, W, axially away from the conveyor 202.

Figure 2C:
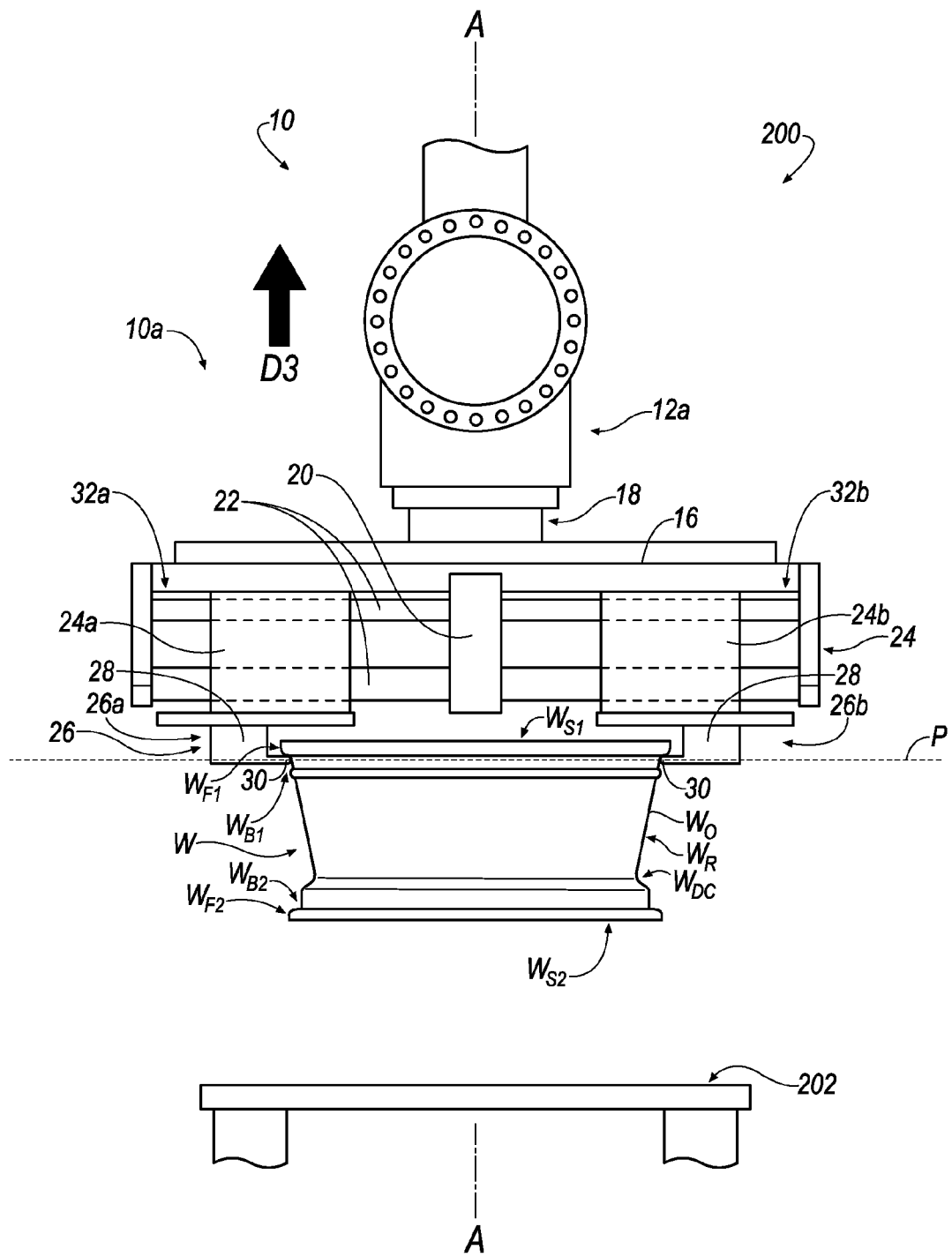

Referring to FIG. 2C, once the pair of sliding member 24 are moved from a location at least proximate the terminal ends 32a, 32b of the one or more flanges 22 from the "expanded orientation" to an "contracted orientation" as described above, the robotic arm 12a may axially move according to the direction of the arrow, D3, in order to axially move the wheel, W, away from the conveyor 202. It will be appreciated that the pair of sliding members 24 are not moved relative the one or more flanges 22 from the "contracted orientation" as the robotic arm 12a moves the wheel, W, from the conveyor 202 to a mounting station 204 (see, e.g., FIG. 3A) for attaching the wheel, W, to a tire, T. Further, as seen in FIGS. 1 and 3A, it will be appreciated that the apparatus 10, conveyor 202 and mounting station 204 may be said to be components of the system 200 for assembling and inflating an un-inflated tire-wheel assembly, $TW_U$.

Figure 3A:
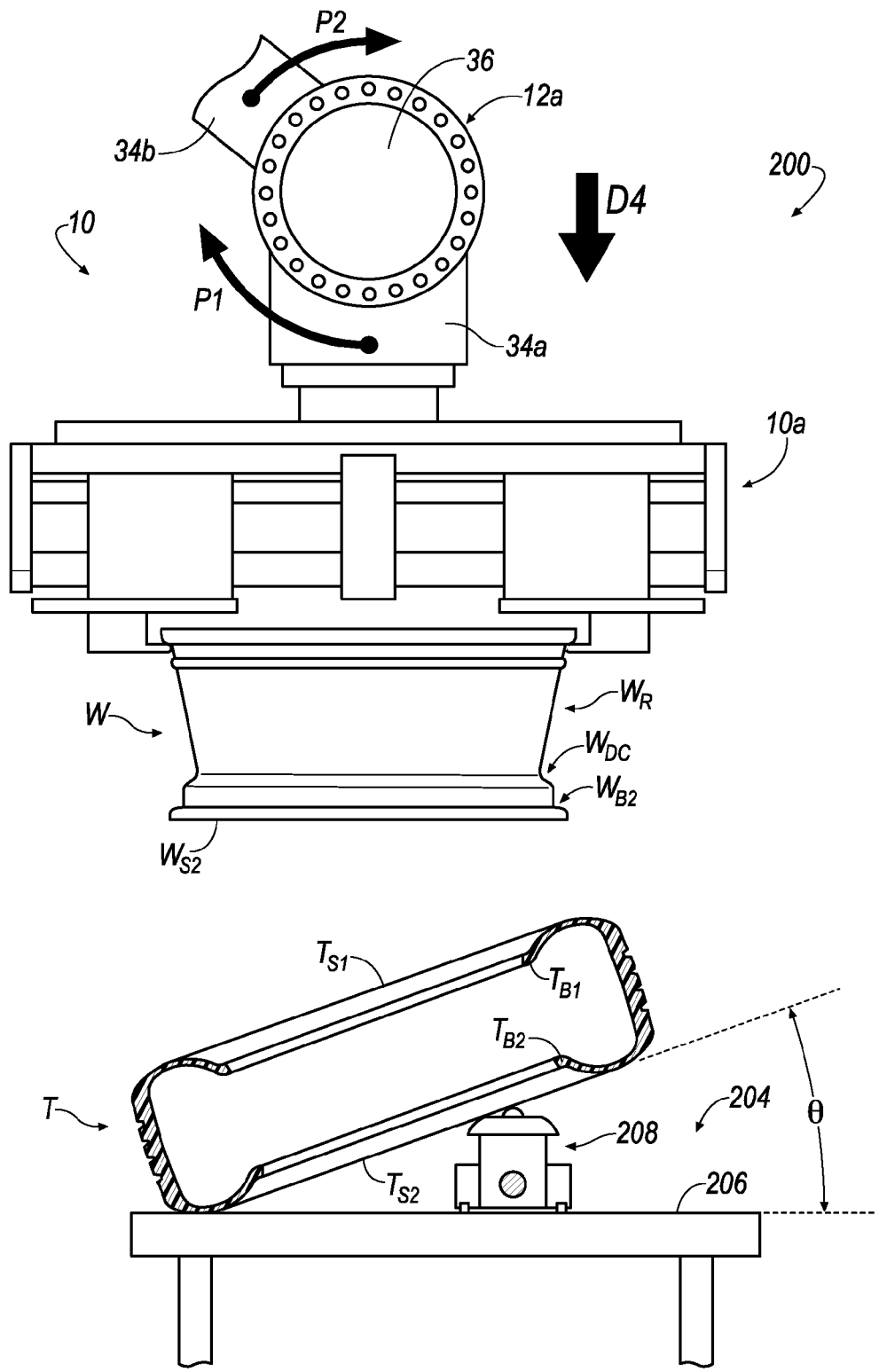
FIG. 3A illustrates a partial side view of the assembling end effecter of the apparatus according to FIG. 2C prior to engaging the wheel with a tire in accordance with an exemplary embodiment of the invention.

Referring now to FIG. 3A, a method for mounting a tire, T, to the wheel, W, by utilizing the robotic arm 12a and assembling end effecter 10a is described in accordance with an embodiment of the invention. In an embodiment, the wheel, W, is releasably-fixed to the robotic arm 12a by way of the assembling end effecter 10a. In an embodiment, a second sidewall, $T_{S2}$, of the tire, T, is supported, in part, by a surface 206 of the mounting station 204, and, also, in part, by a tire-engaging portion 208. In an embodiment, the second sidewall, $T_{S2}$, of the tire, T, is initially canted at an angle, θ, upon the tire-engaging portion 208 relative the surface 206 as the second side, $W_{S2}$, of the wheel, W, is initially arranged substantially parallel to the surface 206.

In an embodiment, the tire, T, is joined to the wheel, W, by firstly moving the robotic arm 12a according to the direction of the arrow, D4, as seen in FIG. 3A. As will be explained in the foregoing disclosure, as the robotic arm 12a is moved according to the direction of the arrow, D4, portions 34a, 34b of structure of the robotic arm 12a may be pivoted relative a joint 36 of the robotic arm 12a according to the direction of the arrows, P1, P2. Further, as will be described in the foregoing disclosure, the robotic arm 12a may be moved in a "drop and sweep" motion according to the direction of the arrows, D4 and D5 (see, e.g., FIG. 3C) for mounting the tire, T, to the wheel, W. In an embodiment, the "drop motion" results in the robotic arm 12a moving the wheel, W, through the central opening of the tire, T, and, the "sweep motion" results in the tire, T, being joined to the wheel, W, such that the tire, T, is loosely configured about the rim portion, $W_R$, of the wheel, W.

Figure 3B:
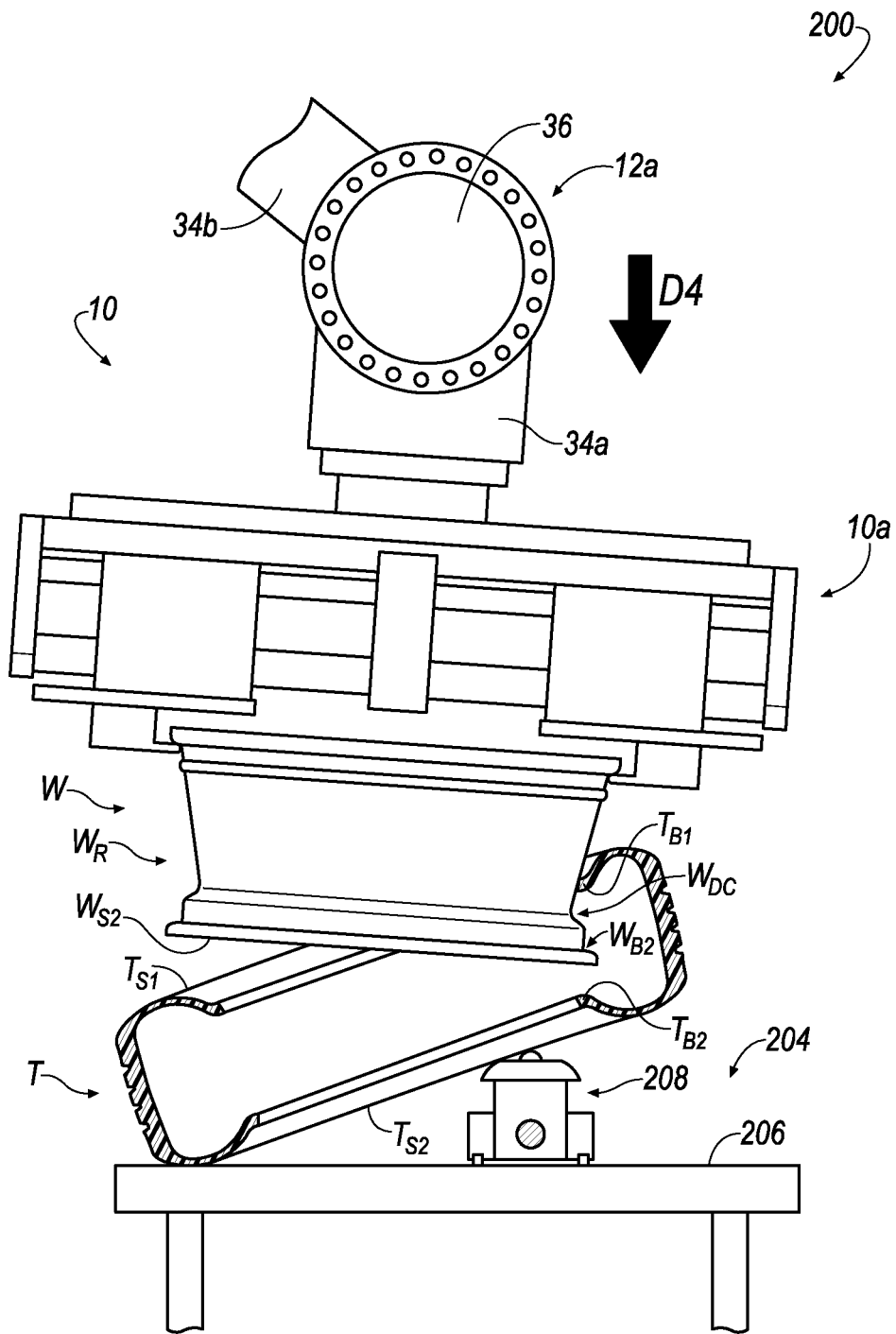
FIG. 3B illustrates a partial side view of the assembling end effecter of the apparatus according to FIG. 3A partially engaging the wheel with the tire in accordance with an exemplary embodiment of the invention.

With initial reference to FIG. 3A, in an embodiment, as the robotic arm 12a is moved toward the mounting station 204 according to the direction of the arrow, D4, the portion 34a of the structure of the robotic arm 12a may be pivoted clockwise relative the joint 36 according to the direction of the arrow, P1, as the portion 34b of the robotic arm 12a is pivoted clockwise relative the joint 36 according to the direction of the arrow, P2, in order to position the second side, $W_{S2}$, of the wheel, W, proximate a first sidewall, $T_{S1}$, of the tire, T. In an embodiment, as seen in FIG. 3B, further movement according to the direction of the arrow, D4, results in a portion of the drop center portion, $W_{DC}$, of the wheel, W, being moved proximate a portion of a first bead, $T_{B1}$, of the tire, T, as a portion of the second bead seat, $W_{B2}$, of the wheel, W, is disposed substantially between the first and second beads, $T_{B1}$, $T_{B2}$, of the tire, T.

Figure 3C:
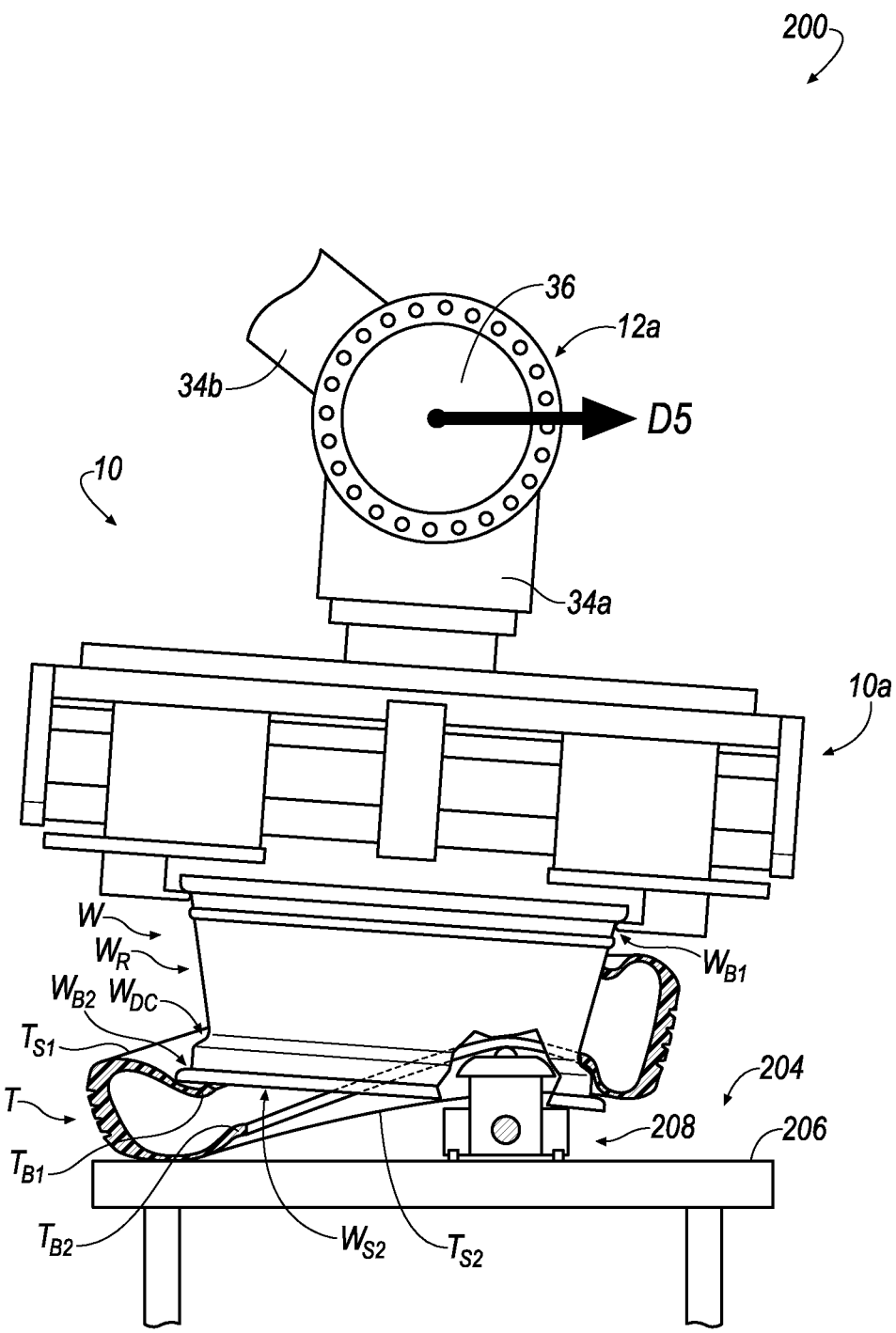
FIG. 3C illustrates a partial side view of the assembling end effecter of the apparatus according to FIG. 3B further partially engaging the wheel with the tire in accordance with an exemplary embodiment of the invention.

Referring to FIG. 3C, further movement of the robotic arm 12a according to the direction of the arrow, D4, results in a portion of the second bead, $T_{B2}$, of the tire, T, being disposed substantially adjacent one or more of the drop center portion, $W_{DC}$, and second bead seat, $W_{B2}$, of the wheel, W, as a portion of the second side, $W_{S2}$, of the wheel, W, is disposed adjacent a portion of the first sidewall, $T_{S1}$, of the tire, T, such that a portion of the wheel, W, substantially "crushes" a portion of the tire, T, thereby bringing a portion of the first bead, $T_{B1}$, of the tire, T, and a portion of the second bead, $T_{B2}$, of the tire, T, substantially adjacent or proximate one another. Further, as seen in FIG. 3C, the movement of the robotic arm 12a according to the direction of the arrow, D4, results in the portion of the first bead, $T_{B1}$, of the tire, T, being located further away from the drop center portion, $W_{DC}$, of the wheel, W, and in closer proximity to that of the first bead seat, $W_{B1}$, of the wheel, W.

In an embodiment, upon movement of the robotic arm 12a according to the direction of the arrow, D4, concluding, the "drop" motion of the "drop and sweep" motion described above may be said to be concluded. The "sweep" movement of the "drop and sweep" motion is then initiated as shown in FIG. 3C by moving the robotic arm 12a according to the direction of the arrow, D5.

Figure 3D:
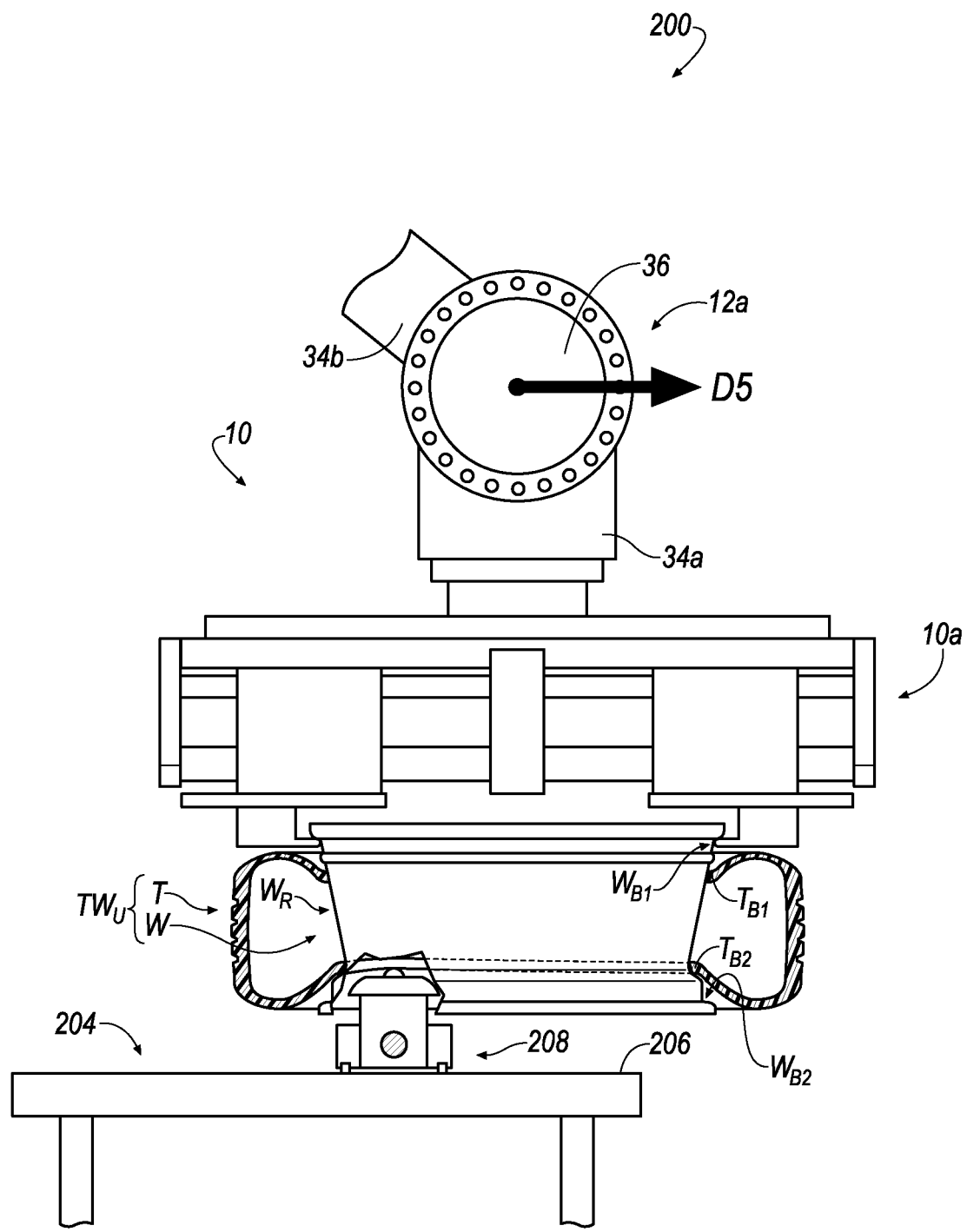
FIG. 3D illustrates a partial side view of the assembling end effecter of the apparatus according to FIG. 3C yet even further partially engaging the wheel with the tire in accordance with an exemplary embodiment of the invention.

As illustrated in FIGS. 3C-3D, the tire-engaging portion 208 engages and operates on the tire, T, such that the first and second beads, $T_{B1}$, $T_{B2}$, of the tire, T, are ultimately seated at least proximate the first and second bead seats, $W_{B1}$, $W_{B2}$, of the wheel, W. In an embodiment, as seen in FIG. 3C, the tire-engaging portion 208 engages the second bead, $T_{B2}$, of the tire, T, such that the second bead, $T_{B2}$, of the tire, T, is pushed over the second beat seat, $W_{B2}$, of the wheel, W, and, as seen in FIG. 3D, as the "sweep motion" according to the direction of the arrow, D5, is continued, the tire-engaging portion 208 further causes the second bead, $T_{B2}$, of the tire, T, to be pushed over the second beat seat, $W_{B2}$, of the wheel, W, such that the remaining portion of the first bead, $T_{B1}$, of the tire, T, that was not located between the first bead seat, $W_{B1}$, and second bead seat, $W_{B2}$, of the wheel, W, is shifted in orientation and space such that the first bead, $T_{B1}$, of the tire, T, is moved to an orientation and space that is proximate the first bead seat, $W_{B1}$, of the wheel, W.

Figure 3E:
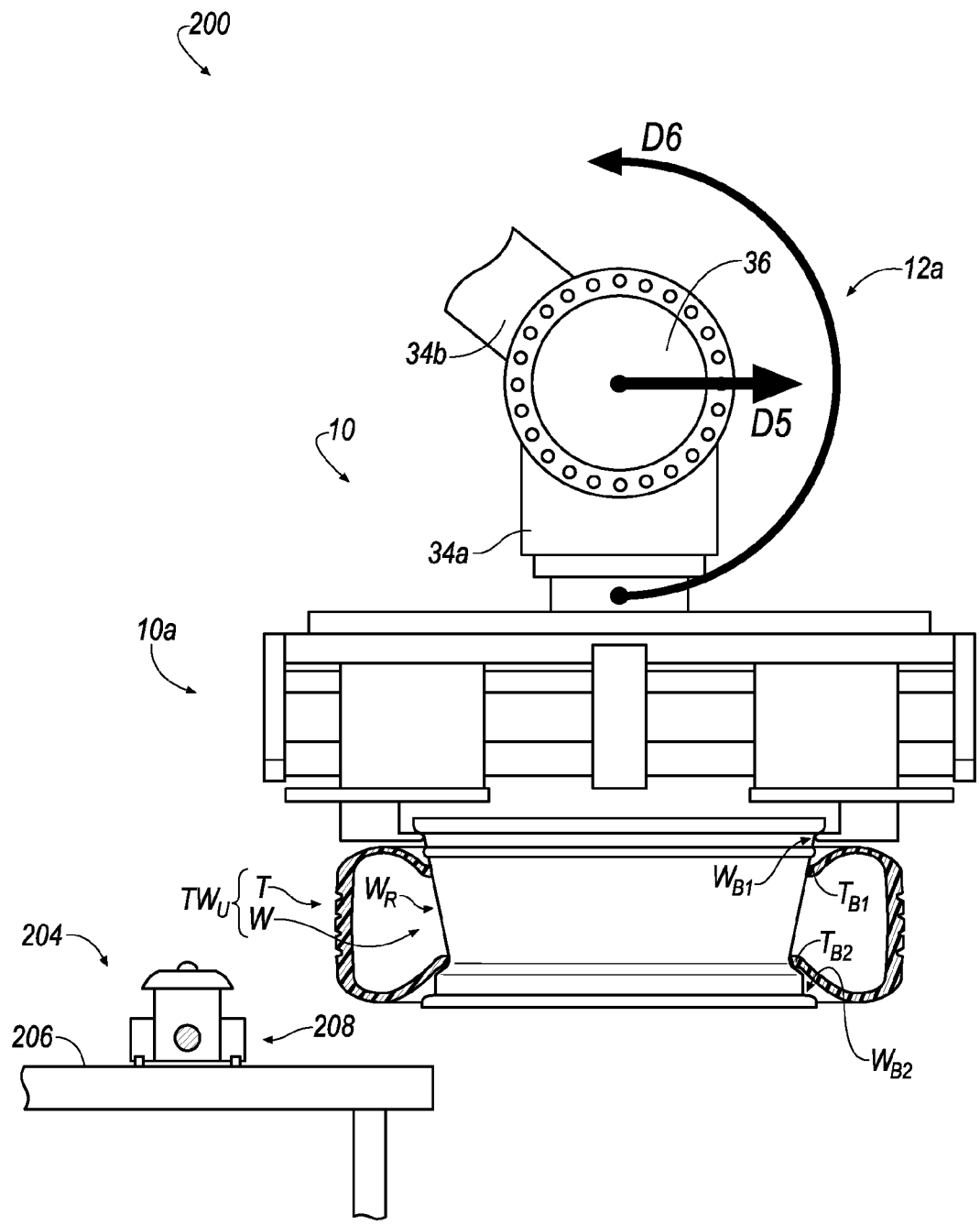
FIG. 3E illustrates a partial side view of the assembling end effecter of the apparatus according to FIG. 3D with the wheel fully engaged with the tire to form an un-inflated tire-wheel assembly in accordance with an exemplary embodiment of the invention.

Referring to FIG. 3E, the "sweep motion" according to the direction of the arrow, D5, continues such that the tire, T, no longer contacts the tire-engaging portion 208. In an embodiment, once the tire, T, no longer contacts the tire-engaging portion 208, the tire, T, may be joined to the wheel, W, such that the tire, T, is loosely-disposed about the rim portion, $W_R$, of the wheel, W, to form the un-inflated tire-wheel assembly, $TW_U$. The robotic arm 12a may then be moved according to the direction of the arrow, D6, in order to move the un-inflated tire-wheel assembly, $TW_U$, toward the inflating end effecter 10b of the apparatus 10 for inflating the un-inflated tire-wheel assembly, $TW_U$.

Figure 4A:
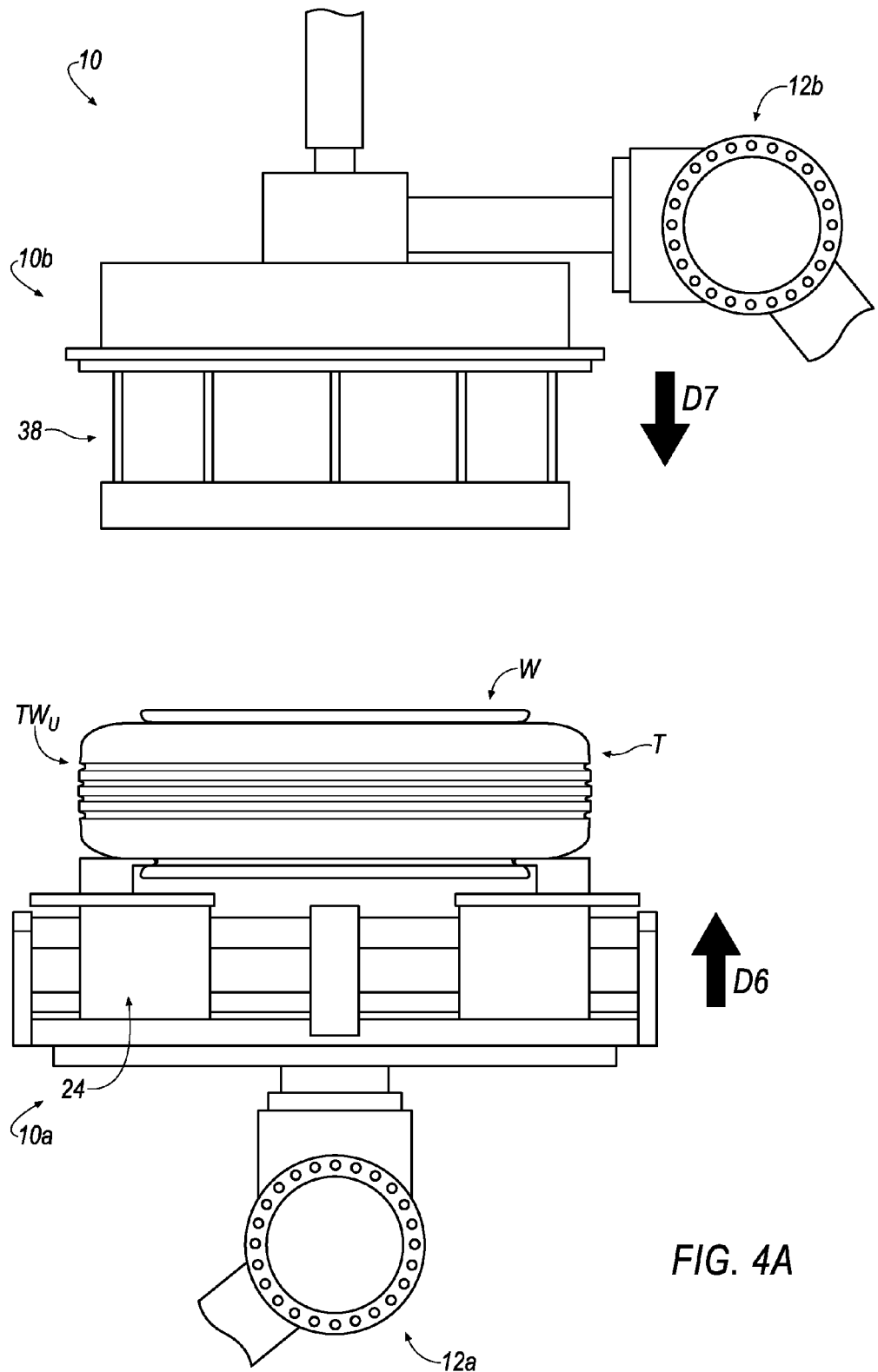
FIG. 4A illustrates a partial side view of the apparatus of FIG. 1 according to line 4A in accordance with an exemplary embodiment of the invention.

Referring to FIG. 4A, the first robotic arm 12a moves the un-inflated tire-wheel assembly, $TW_U$ (that is attached to the assembling end effecter 10a), according to the direction of the arrow, D6, such that the un-inflated tire-wheel assembly, $TW_U$, is located proximate the inflating end effecter 10b of the apparatus 10. In an embodiment, the second robotic arm 12b may move the inflating end effecter 10b according to the direction of the arrow, D7, for moving the inflating end effecter 10b toward the assembling end effecter 10a. In an embodiment, it will be appreciated that movement of both of the assembling end effecter 10a and inflating end effecter 10b according to the direction of arrows D6, D7 is not required and that movement of one of the assembling end effecter 10a and inflating end effecter 10b toward the other may be provided in order to subsequently inflate the un-inflated tire-wheel assembly, $TW_U$.

Figure 4B:
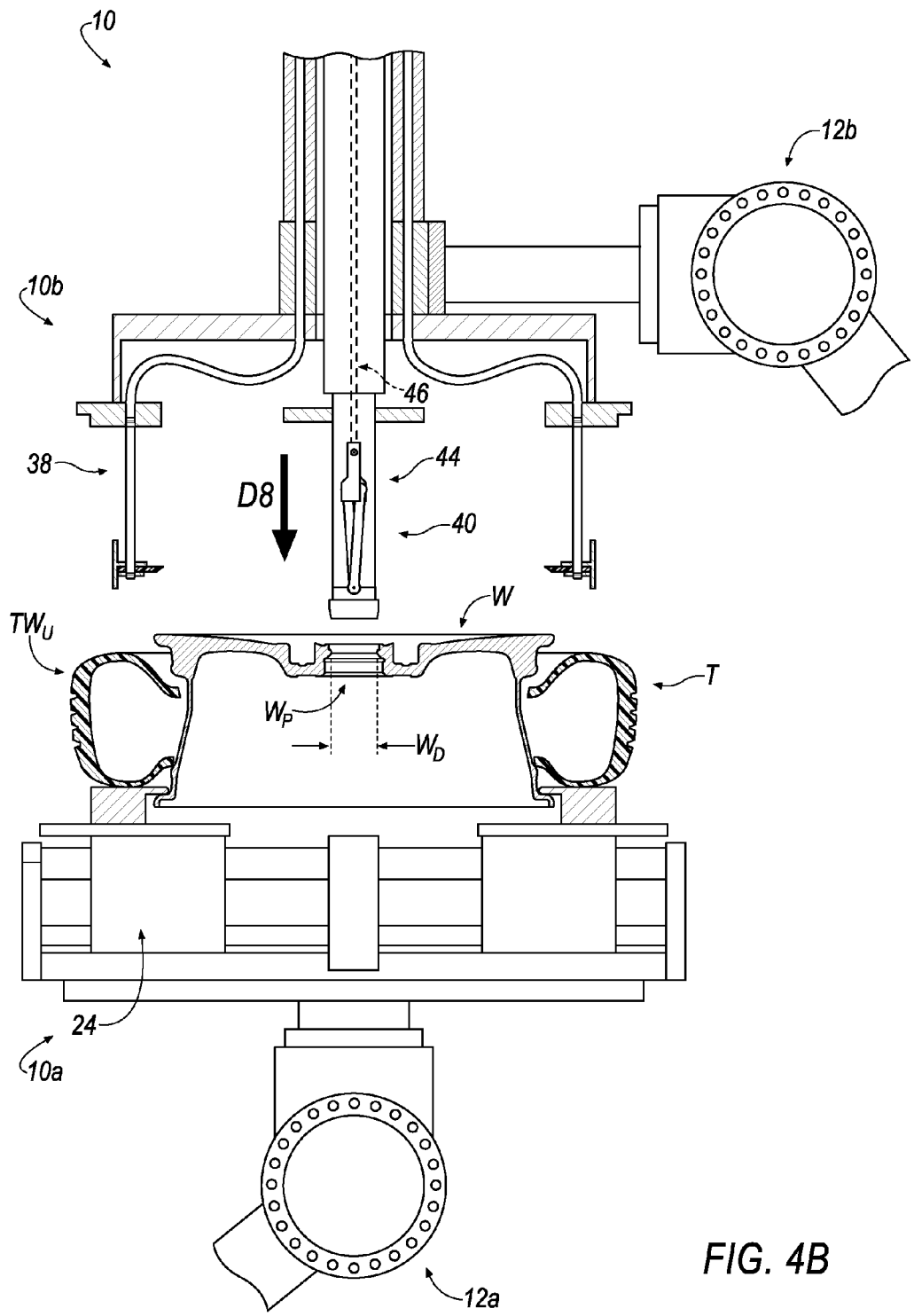
FIG. 4B illustrates a partial side, partial cross-sectional view of the assembling and inflating end effecters of the apparatus according to FIG. 4A in accordance with an exemplary embodiment of the invention.

Referring now to FIG. 4B, a partial cross-sectional view of the assembling end effecter 10a, the inflating end effecter 10b and un-inflated tire-wheel assembly, $TW_U$, is shown according to an embodiment of the invention. In an embodiment, the inflating end effecter 10b includes an inflating portion 38. In an embodiment, the inflating portion 38 includes a retaining member 40 having a distal end surface 42 (see, e.g., FIG. 4E) for selectively engaging and retaining the wheel, W, to the inflating end effecter 10b. Further, in an embodiment, the inflating portion 38 includes a plunging portion 44 and an actuating rod 46.

In an embodiment, the actuating rod 46 is movably-disposed within a bore of the plunging portion 44. In an embodiment, the retaining member 40 is attached to one or more of the plunging portion 44 and actuating rod 46. In an embodiment, the retaining member 40 is attached to an outer surface (see, e.g., outer surface 52 in FIG. 5) of the plunging portion 44. In an embodiment, the retaining member 40 is attached to the actuating rod 46 by way of an actuating pin (see, e.g., pin 58e in FIG. 5) that extends through one or more slots (see, e.g., slots 74a, 74b in FIG. 5) formed in the plunging portion 44.

Figure 4C:
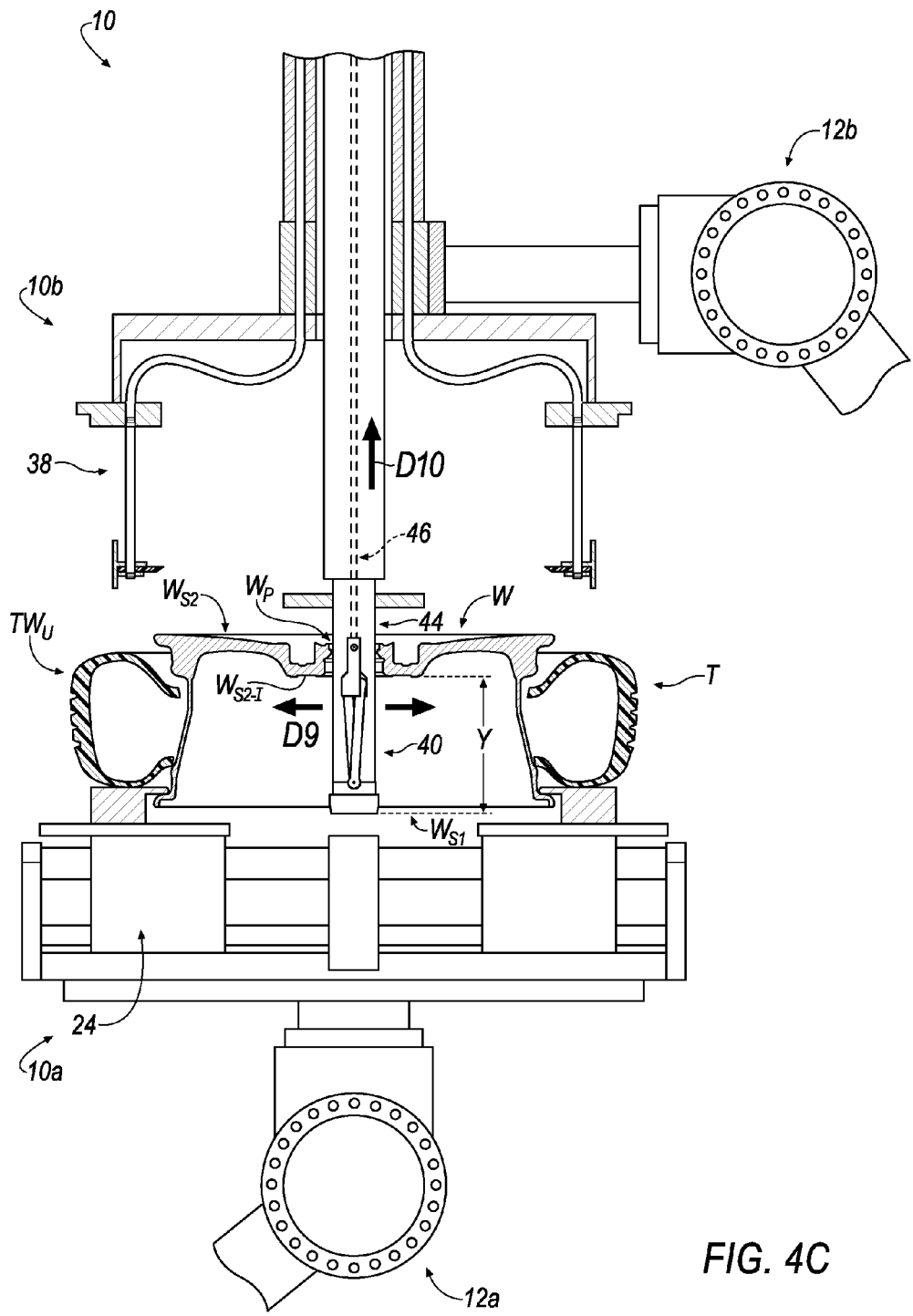
FIG. 4C illustrates a retaining member of the inflating end effecter in a first orientation being extended through the un-inflated tire-wheel assembly that is removably-attached to the assembling end effecter according to FIG. 4B in accordance with an exemplary embodiment of the invention.

In an embodiment, as seen in FIG. 4B, an axial orientation of the plunging portion 44 is changed according to the direction of arrows, D8. In an embodiment, as seen in FIG. 4C, a radial orientation of the retaining member 40 may be changed according to the direction of the arrow, D9, which is responsive to movement of the actuating rod 46 according to the direction of the arrow, D10. In an embodiment, movement of the retaining member 40 according to the direction of the arrow, D9, may result in the retaining member 40 engaging the un-inflated tire-wheel assembly, $TW_U$, by way of coming into contact with/engaging the wheel, W.

Figure 4D:
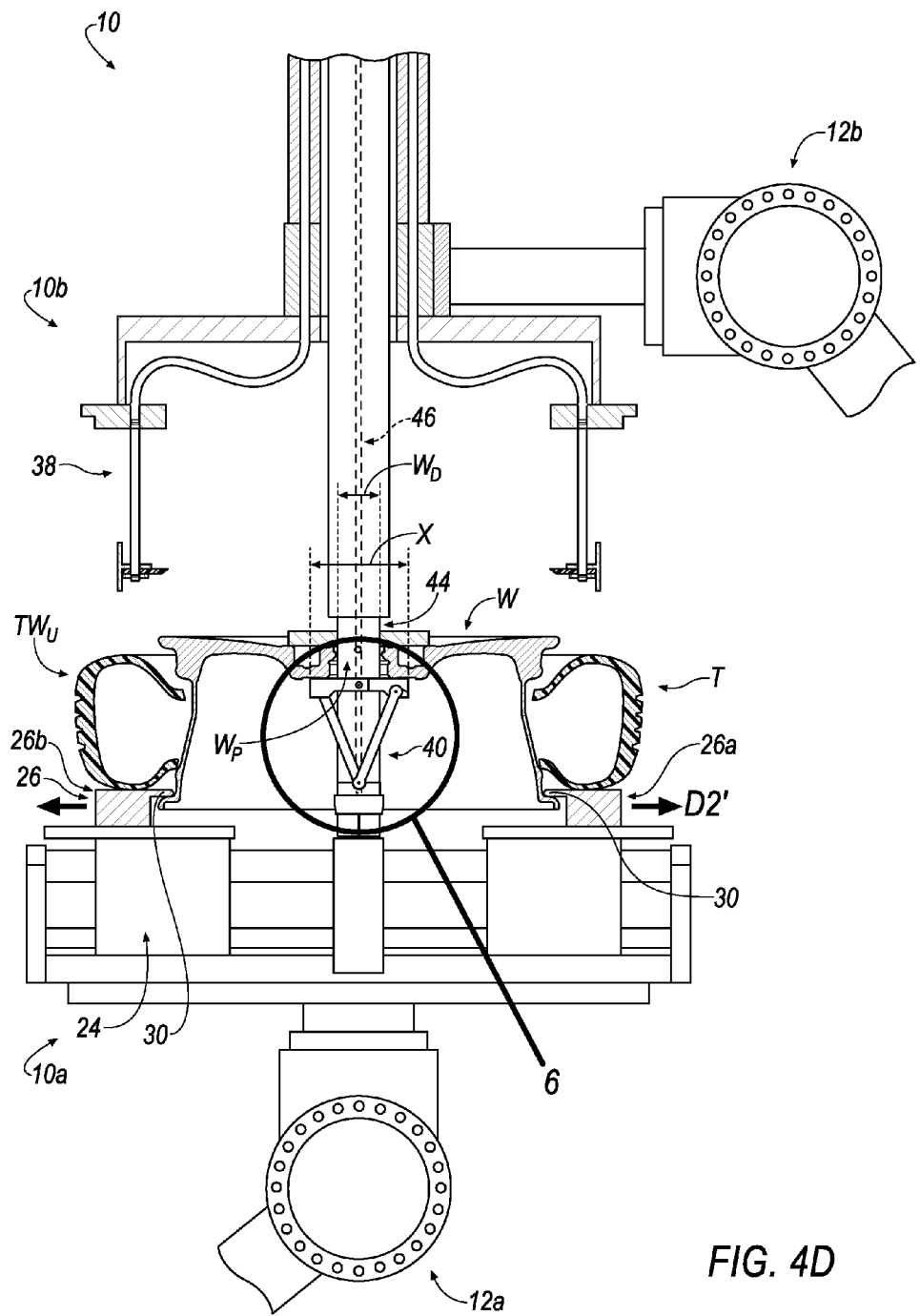
FIG. 4D illustrates the retaining member of the inflating end effecter moved to a second orientation for engaging the un-inflated tire-wheel assembly that is removably-attached to the assembling end effecter according to FIG. 4C in accordance with an exemplary embodiment of the invention.
Figure 4E:
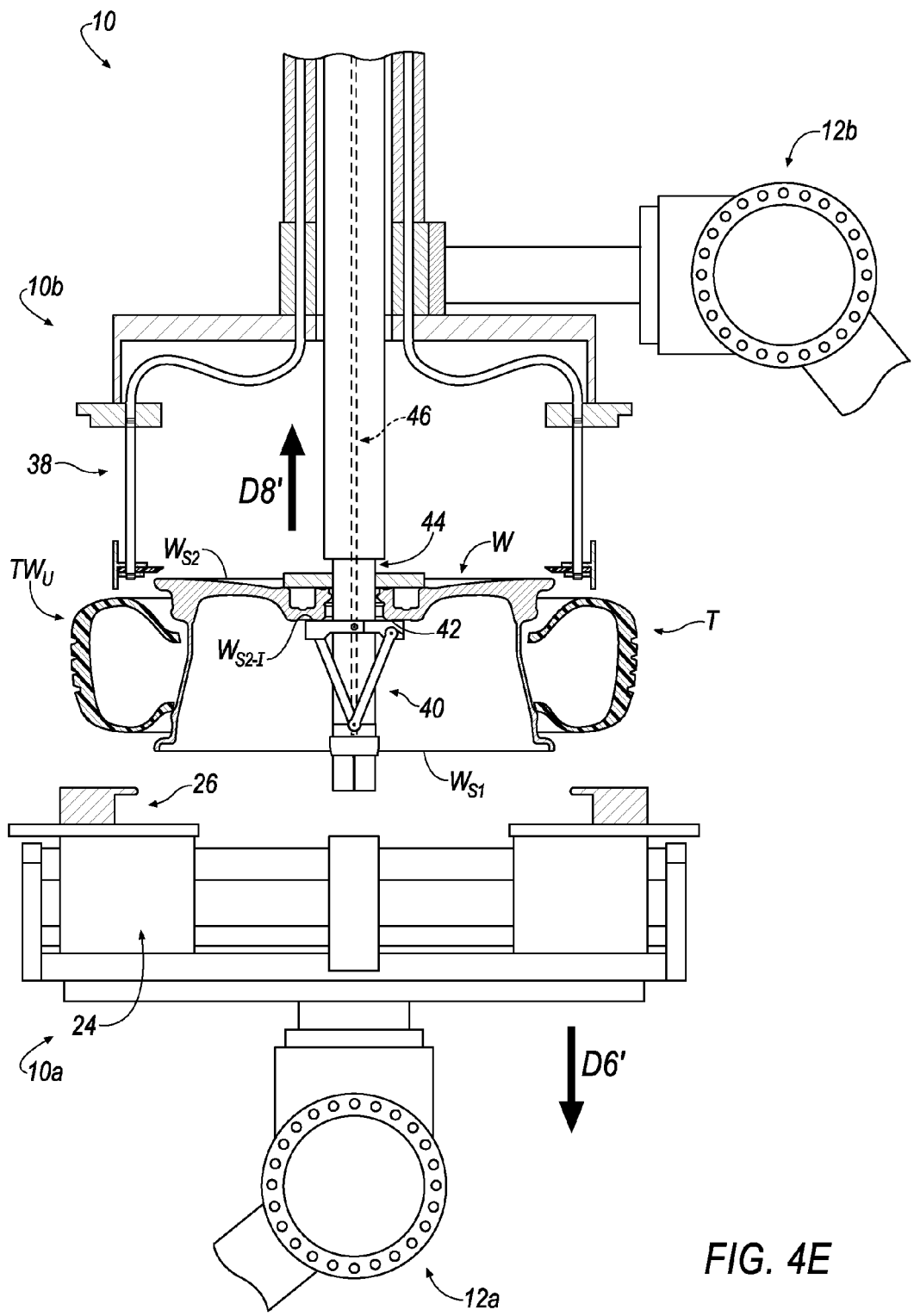
FIG. 4E illustrates the assembling end effecter selectively de-coupled from the un-inflated tire-wheel assembly such that the retaining member removably-attaches the un-inflated tire-wheel assembly to the inflating end effecter for permitting the inflating end effecter to move the un-inflated tire-wheel assembly away from the assembling end effecter according to FIG. 4D in accordance with an exemplary embodiment of the invention.

Once the retaining member 40 is radially expanded in order to potentially engage the un-inflated tire-wheel assembly, $TW_U$, as seen in FIG. 4D, the pair of sliding members 24 of the assembling end effecter 10a is moved according to the direction of the arrow, D2', which is opposite the direction of the arrow, D2, from the "contracted orientation" back to "expanded orientation" for selectively de-coupling the un-inflated tire-wheel assembly, $TW_U$, from the assembling end effecter 10a. Then, as seen in FIG. 4E, the assembling end effecter 10a of the apparatus 10 may be moved according to the direction of the arrow D6' for moving the assembling end effecter 10a away from the inflating end effecter 10b such that the assembling end effecter 10a may be moved away from the un-inflated tire-wheel assembly, $TW_U$, which is now retained by the inflating end effecter 10b of the apparatus 10.

With reference to FIG. 4D, in an embodiment, it will be appreciated that once the pair of sliding members 24 of the assembling end effecter 10a is moved according to the direction of the arrow, D2', the assembling end effecter 10a may be said to be disconnected from the un-inflated tire-wheel assembly, $TW_U$, such that the inflating end effecter 10b may inflate the un-inflated tire-wheel assembly, $TW_U$, without the assistance of or support by the assembling end effecter 10a of the apparatus 10. As such, in describing the method for utilizing inflating end effecter 10b for inflating the un-inflated tire-wheel assembly, $TW_U$ (see, e.g., FIGS. 9A-9F), it will be appreciated that the inflating end effecter 10b may operate independently of the assembling end effecter 10a during, for example, the method for inflating the un-inflated tire-wheel assembly, $TW_U$; thus, it will be appreciated that, in one aspect of the invention, the assembling end effecter 10a is not a critical or essential feature of the apparatus 10 that is required for the inflating end effecter 10b to properly function or operate during, for example, the inflating procedure shown and described at FIGS. 9A-9F.

Referring back to FIG. 4B, the change of orientation of the retaining member 40 is described in greater detail according to an embodiment of the invention. In an embodiment, the retaining member 40 is initially arranged in a radially-retracted, "collapsed orientation" such that the retaining member 40 may be permitted to be axially plunged by the plunging member 44 according to the direction of the arrow, D8, and through an axially-centered passage, $W_P$, of the wheel, W, having an opening diameter, $W_D$.

Referring to FIG. 4C, once the retaining member 40 has been axially plunged by the plunging member 44 past an inner surface, $W_{S2-I}$, of the second side, $W_{S2}$, of the wheel, W, at a distance, Y, the plunging movement of the plunging member 44 according to the direction of the arrow, D8, may be ceased. Once movement of the plunging member 44 according to the direction of the arrow, D8, is ceased, the orientation of the retaining member 40 may be changed from the radially-retracted, "collapsed orientation" of FIG. 4C to a radially-expanded, "enlarged orientation" (see, e.g., FIG. 4D) according to the direction of the arrow, D9, by moving the actuating rod 46 according to the direction of the arrow, D10.

Referring to FIG. 4D, in an embodiment, the radially-expanded, "enlarged orientation" of the retaining member 40 may result in the retaining member 40 having a width, X, that is greater than the opening diameter, $W_D$, of the axially-centered passage, $W_P$, of the wheel, W. Once the retaining member 40 is arranged in the radially-expanded, "enlarged orientation," the pair of sliding members 24 of the assembling end effecter 10a is moved from the "contracted orientation" back to "expanded orientation" such that the finger portion 30 of each wheel-engaging member 26a, 26b of the pair of wheel-engaging members 26 may no longer contact or engage the wheel, W.

Referring to FIG. 4E, once the pair of sliding members 24 of the assembling end effecter 10a is moved from the "contracted orientation" back to "expanded orientation," the assembling end effecter 10a may be moved according to the direction of the arrow, D6', which is opposite the direction of the arrow, D6, for moving the assembling end effecter 10a away from the un-inflated tire-wheel assembly, $TW_U$, which is retained by the inflating end effecter 10b of the apparatus 10 by way of the retaining member 40. In an embodiment, movement of the retaining member 40 according to the direction of the arrow, D9, results in the distal end surface 42 of the retaining member 40 being drawn in a substantially close, opposing relationship with, or, alternatively, substantially adjacent to the inner surface, $W_{S2-I}$, of the second side, $W_{S2}$, of the wheel, W.

Figure 5:
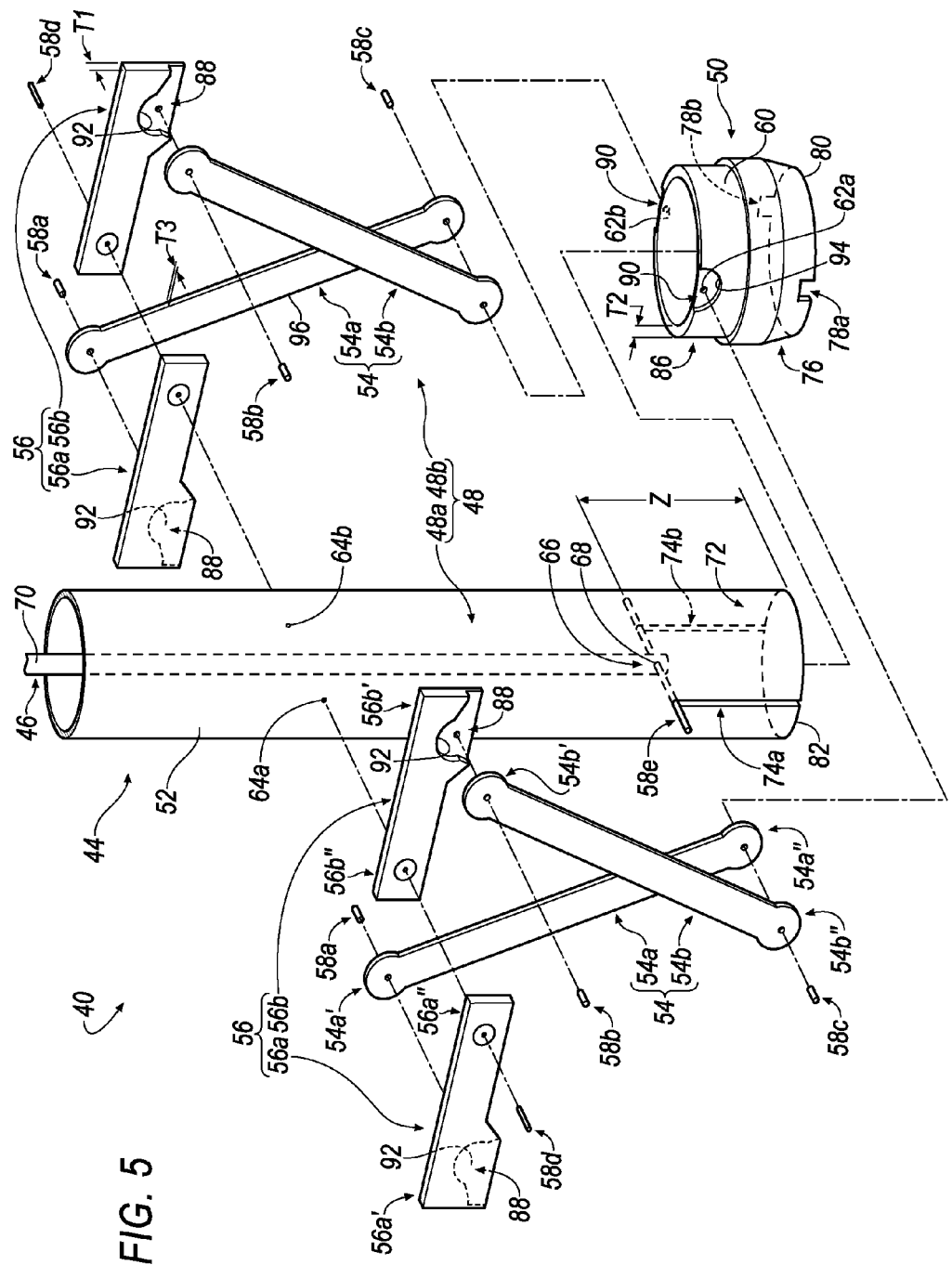
FIG. 5 illustrates an exploded view of the retaining member of the inflating end effecter in accordance with an exemplary embodiment of the invention.

Referring now to FIG. 5, an exploded view of the retaining member 40 is shown according to an embodiment of the invention relative the plunger member 44 and the actuating rod 46. In an embodiment, the retaining member 40 includes a pair hinged assemblies 48 including a first hinged assembly 48a and a second hinged assembly 48b. In an embodiment, the retaining member 40 also includes a sleeve member 50, which may also be referred to as a carrier member.

In an embodiment, when the retaining member 40 is assembled together (see, e.g., FIGS. 6A, 6B), each of the first and second hinged assembly 48a, 48b of the pair of hinged assemblies 48 are arranged in an opposing relationship relative an outer surface 52 of the plunger member 44 as the sleeve member 50 is slidably-disposed about the outer surface 52 of the plunger member 44. In an embodiment, one or more of the first and second hinged assembly 48a, 48b and sleeve member 50 may contact the outer surface 52 of the plunger member 44, or, alternatively, be disposed proximate, but not directly contacting the outer surface 52 of the plunger member 44.

With continued reference to FIG. 5, each of the first and second hinged assembly 48a, 48b includes a pair of hinge arms 54 and a pair of hinge arm bearing brackets 56. In an embodiment, the pair of hinge arms 54 include a first hinge arm 54a and a second hinge arm 54b. In an embodiment, the pair of hinge arm brackets 56 include a first hinge arm bracket 56a and a second hinge arm bracket 56b.

In an embodiment, a first pin 58a extends at least partially into and rotatably-couples a first end 54a' of the first hinge arm 54a and a first end 56a' of the first hinge arm bracket 56a. In an embodiment, a second pin 58b extends at least partially into and rotatably-couples a first end 54b' of the second hinge arm 54b and a first end 56b' of the second hinge arm bracket 56b. In an embodiment, a third pin 58c extends at least partially into and rotatably-couples a second end 54a" of the first hinge arm 54a and a second end 54b" of the second hinge arm 54*b*. In an embodiment, a fourth pin 58*d* extends at least partially into and rotatably-couples a second end 56*a*" of the first hinge arm bracket 56*a* and a second end 56*b*" of the second hinge arm bracket 56*b*.

In an embodiment, the sleeve member 50 includes an outer surface 60. In an embodiment, the outer surface 60 forms a first pin passage 62*a* and a second pin passage 62*b*. In an embodiment, the first pin passage 62*a* and second pin passage 62*b* are arranged in a diametrically-opposed relationship.

In an embodiment, the third pin 58*c* corresponding to the first hinged assembly 48*a* also extends into the first pin passage 62*a* for coupling the second ends 54*a*", 54*b*" of the first and second hinge arms 54*a*, 54*b* of the first hinged assembly 48*a* to the sleeve member 50. In an embodiment, the third pin 58*c* corresponding to the second hinged assembly 48*b* similarly extends into the second pin passage 62*b* for coupling the second ends 54*a*", 54*b*" of the first and second hinge arms 54*a*, 54*b* of the second hinged assembly 48*b* to the sleeve member 50.

In an embodiment, the outer surface 52 of the plunger member 44 forms a first pin passage 64*a* and a second pin passage 64*b*. In an embodiment, the first pin passage 64*a* and second pin passage 64*b* are arranged in a diametrically-opposed relationship.

In an embodiment, the fourth pin 58*d* corresponding to the first hinged assembly 48*a* extends into the first pin passage 64*a* for coupling the second ends 56*a*", 56*b*" of the first and second hinge arm brackets 56*a*, 56*b* of the first hinged assembly 48*a* to the plunger member 44. In an embodiment, the fourth pin 58*d* corresponding to the second hinged assembly 48*b* similarly extends into the second pin passage 64*b* for coupling the second ends 56*a*", 56*b*" of the first and second hinge arm brackets 56*a*, 56*b* of the second hinged assembly 48*b* to the plunger member 44.

In an embodiment, a distal end 66 of the actuating rod 46 forms a passage 68. In an embodiment, the passage 68 extends through the distal end 66 of the actuating rod 46. In an embodiment, a fifth pin 58*e*, which may be referred to as an actuating pin, extends through the passage 68. In an embodiment, the actuating pin 58*e* extends through the passage 68 and radially beyond an outer surface 70 of the actuating rod 46.

In an embodiment, a distal end 72 of the plunger member 44 forms a first slot 74*a* and a second slot 74*b*. In an embodiment, the first slot 74*a* and the second slot 74*b* are arranged in a diametrically-opposed relationship. In an embodiment, the first slot 74*a*, the second slot 74*b* and the passage 68 are aligned such that the actuating pin 58*e* may extend radially beyond the outer surface 70 of the actuating rod 46 and through each of the first slot 74*a* and the second slot 74*b*. In an embodiment, the actuating pin 58*e* extends through each of the first and second slots 74*a*, 74*b* and radially beyond the outer surface 52 of the plunger member 44.

In an embodiment, a lower distal end 76 of the sleeve member 50 may form an optional first slot 78*a* and an optional second slot 78*b*. In an embodiment, the optional first slot 78*a* and the optional second slot 78*b* are arranged in a diametrically-opposed relationship. In an embodiment, the optional slots 78*a*, 78*b* are aligned with the first slot 74*a*, the second slot 74*b* and the passage 68 such that the actuating pin 58*e* may extend at least partially into each of the optional first and second slots 78*a*, 78*b* of the sleeve member 50. It will be appreciated that extension of the actuating pin 58*e* into the optional first and second slots 78*a*, 78*b* prevents free rotation of the sleeve member 50 relative the outer surface 52 of the plunger member 44.

Figure 6A:
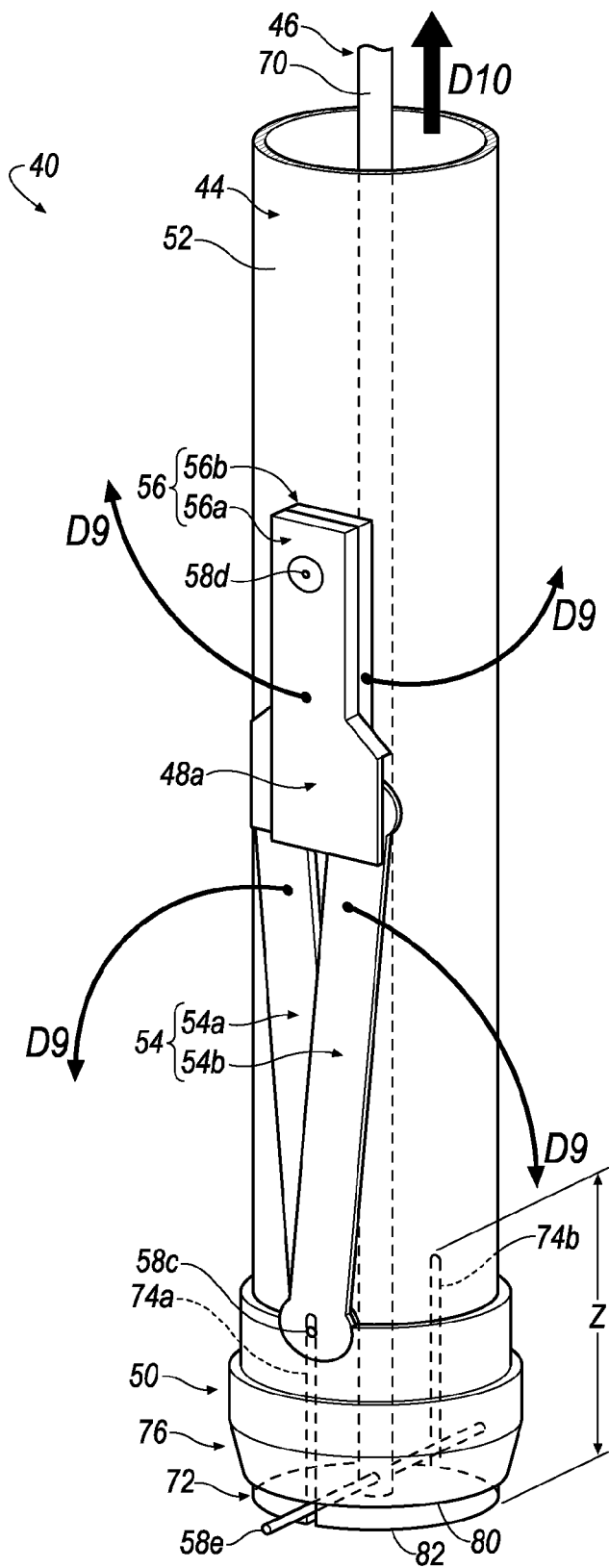
FIG. 6A illustrates an assembled view of the retaining member of FIG. 5 when arranged in the first orientation in accordance with an exemplary embodiment of the invention.
Figure 6B:
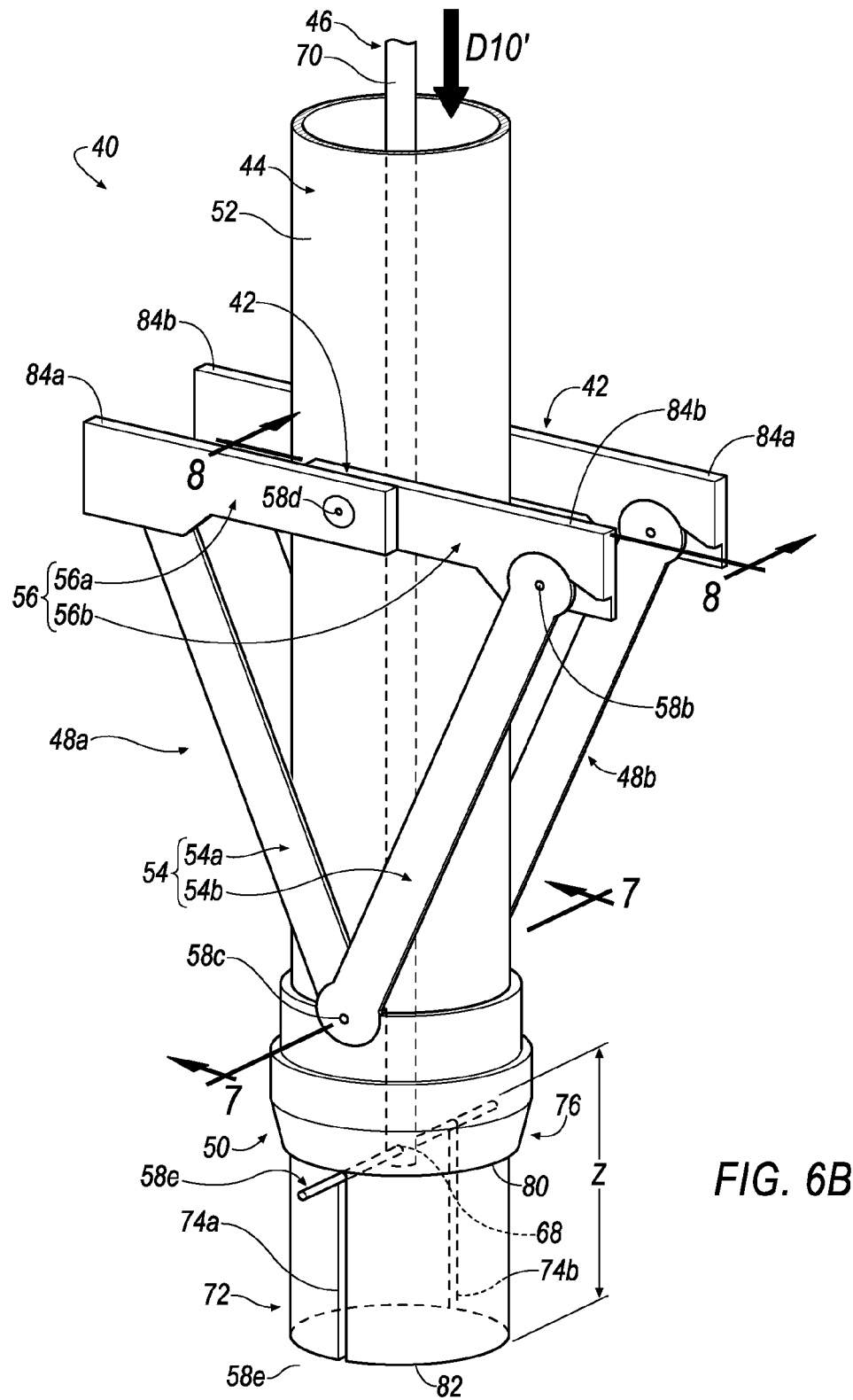
FIG. 6B illustrates an assembled view of the retaining member of FIG. 5 when arranged in the second orientation in accordance with an exemplary embodiment of the invention.

Referring to FIGS. 6A-6B, in an embodiment, it will be appreciated that the optional first and second slots 78*a*, 78*b* formed at the lower distal end 76 of the sleeve member 50 may not be included in the design of the sleeve member 50. As such, in an embodiment, the fifth actuating pin 58*e* may be adjacently-/opposingly-disposed relative to an axial end surface 80 of the lower distal end 76 of the sleeve member 50. Further, in an embodiment, if, for example, the first and second slots 78*a*, 78*b* are included in the design of the sleeve member 50, the first and second slots 78*a*, 78*b* may form part of the axial end surface 80 of the lower distal end 76 of the sleeve member 50.

In an embodiment, it will be appreciated that when the retaining member 40 is joined to one or more of the plunger member 44 and actuating rod 46, the sleeve member 50 is firstly arranged at a distance, Z (see, e.g., FIG. 6B), away from an axial end surface 82 of the distal end 72 of the plunger member 44. Then, the actuating pin 58*e* may be inserted through each of the slots 74*a*, 74*b* of the plunger member 44 and the passage 68 of the actuating rod 46 such that the actuating pin 58*e* may be disposed within the slots 78*a*, 78*b* and/or adjacent the axial end surface 80 of the sleeve member 50. Subsequent to the arrangement of the actuating pin 58*e* as described immediately above, the remaining pins 58*a*-58*d* may be arranged as described above to finish the assembly the retaining member 40 relative the outer surface 52 of the plunger member 44.

Further, in an embodiment, it will be appreciated that the first and second slots 74*a*, 74*b* formed in the plunger member 44 extend from an axial end surface 82 of the plunger member 44 at the distance, Z. Further, as will be described in the foregoing disclosure, axial travel of the actuating rod 46 relative the plunger member 44 is limited to the distance, Z, such that corresponding axial travel of the actuating pin 58*e* is also limited to the distance, Z. Further, it will be appreciated that the limitation of the axial travel of the actuating rod 46 according to the distance, Z, prevents the actuating pin 58*e* from travelling axially beyond the axial end surface 82 of the plunger member 44 such that a concentric arrangement of the sleeve member 50 relative the outer surface 52 of the plunger member 44 is maintained, thereby preventing the sleeve member 50 to be concentrically-decoupled from the plunger member 44.

Referring to FIGS. 6A and 6B, the change in orientation of the retaining member 40 from one of the radially-retracted, "collapsed orientation" (see, e.g., FIG. 6A) and the radially-expanded, "enlarged orientation" (see, e.g., FIG. 6B) is described according to an embodiment of the invention. Referring initially to FIG. 6A, movement of the actuating rod 46 relative the plunging member 44 according to the direction of the arrow, D10, results in the actuating pin 58*e* axially moving away from the axial end surface 82 of the plunger member 44 and within the slots 74*a*, 74*b*.

As the actuating pin 58*e* moves away from the axial end surface 82 of the plunger member 44 according to the direction of the arrow, D10, the actuating pin 58*e* engages the axial end surface 80 of the lower distal end 76 of the sleeve member 50 such that the sleeve member 50 is also urged according to the direction of the arrow, D10, thereby permitting the sleeve member 50 to axially move concurrently with the movement of the actuating rod 46 and actuating pin 58*e*.

Once the sleeve member 50 moves according to the direction of the arrow, D10, a pulling force initiated by the actuating rod 46 according to the direction of the arrow, D10, is transmitted to the pair of hinge arms 54 and the pair of hinge arm brackets 56 by way of the pulling force applied by the actuating pin 58*e* and the sleeve member 50 such that the first and second hinge arms 54a, 54b and first and second hinge arm brackets 56a, 56b of each of the first and second hinged assembly 48a, 48b of the pair of the pair hinged assemblies 48 are pivoted about the pins 58c, 58d according to the direction of the arrows, D9, for changing the orientation of the retaining member 40 from the radially-retracted, "collapsed orientation" to the radially-expanded, "enlarged orientation" of FIG. 6B.

Figure 7:
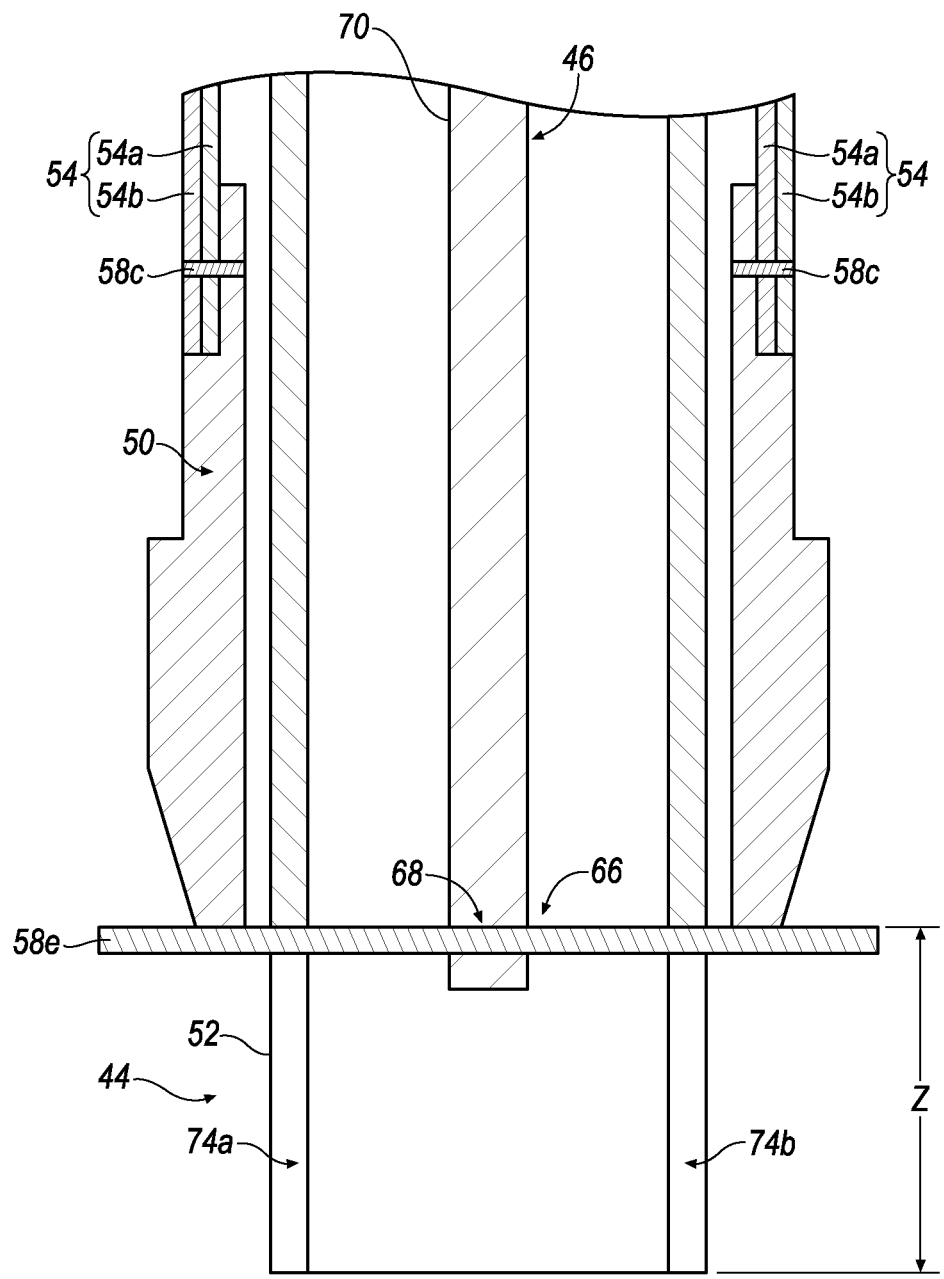
FIG. 7 illustrates a cross-sectional view of the retaining member of FIG. 6B according to line 7-7 in accordance with an exemplary embodiment of the invention.

Referring to FIGS. 6B and 7, the actuating rod 46 is shown to have moved the actuating pin 58e at a maximum lift orientation according to the distance, Z (as limited by the length of the slots 74a, 74b). When the actuating rod 46 moves the actuating pin 58e to the maximum lift orientation according to the distance, Z, movement of the first and second hinge arms 54a, 54b and first and second hinge arm brackets 56a, 56b according to the direction of the arrows, D9, is ceased. Referring to FIG. 6B, in an embodiment, the lengths of the first and second hinge arms 54a, 54b and first and second hinge arm brackets 56a, 56b is designed such that upon ceasing movement of the first and second hinge arms 54a, 54b and first and second hinge arm brackets 56a, 56b according to the direction of the arrows, D9, an upper surface 84a, 84b of each of the first and second hinge arm brackets 56a, 56b are substantially co-planar with one another in order to form the distal end surface 42 of the retaining member 40. As described above in FIG. 4D, the distal end surface 42 of the retaining member 40 is drawn adjacent the inner surface, $W_{S2-I}$, of the second side, $W_{S2}$, of the wheel, W, when the retaining member 40 (i.e., the first and second hinge arms 54a, 54b and first and second hinge arm brackets 56a, 56b) is moved according to the direction of arrows, D9.

Figure 10A:
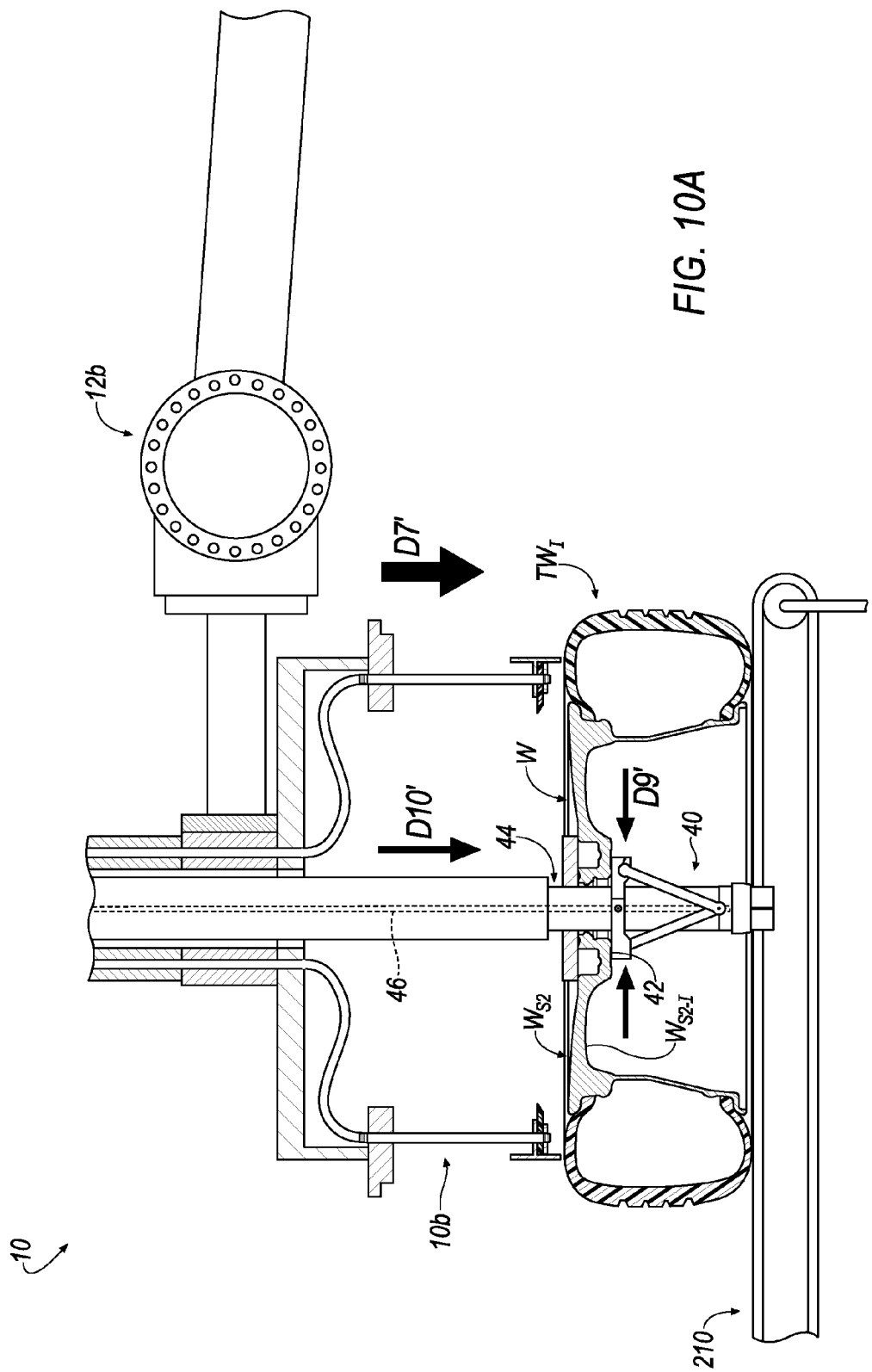
FIG. 10A illustrates the inflating end effecter of the apparatus positioning the inflated tire-wheel assembly proximate a conveyor in accordance with an exemplary embodiment of the invention.
Figure 10B:
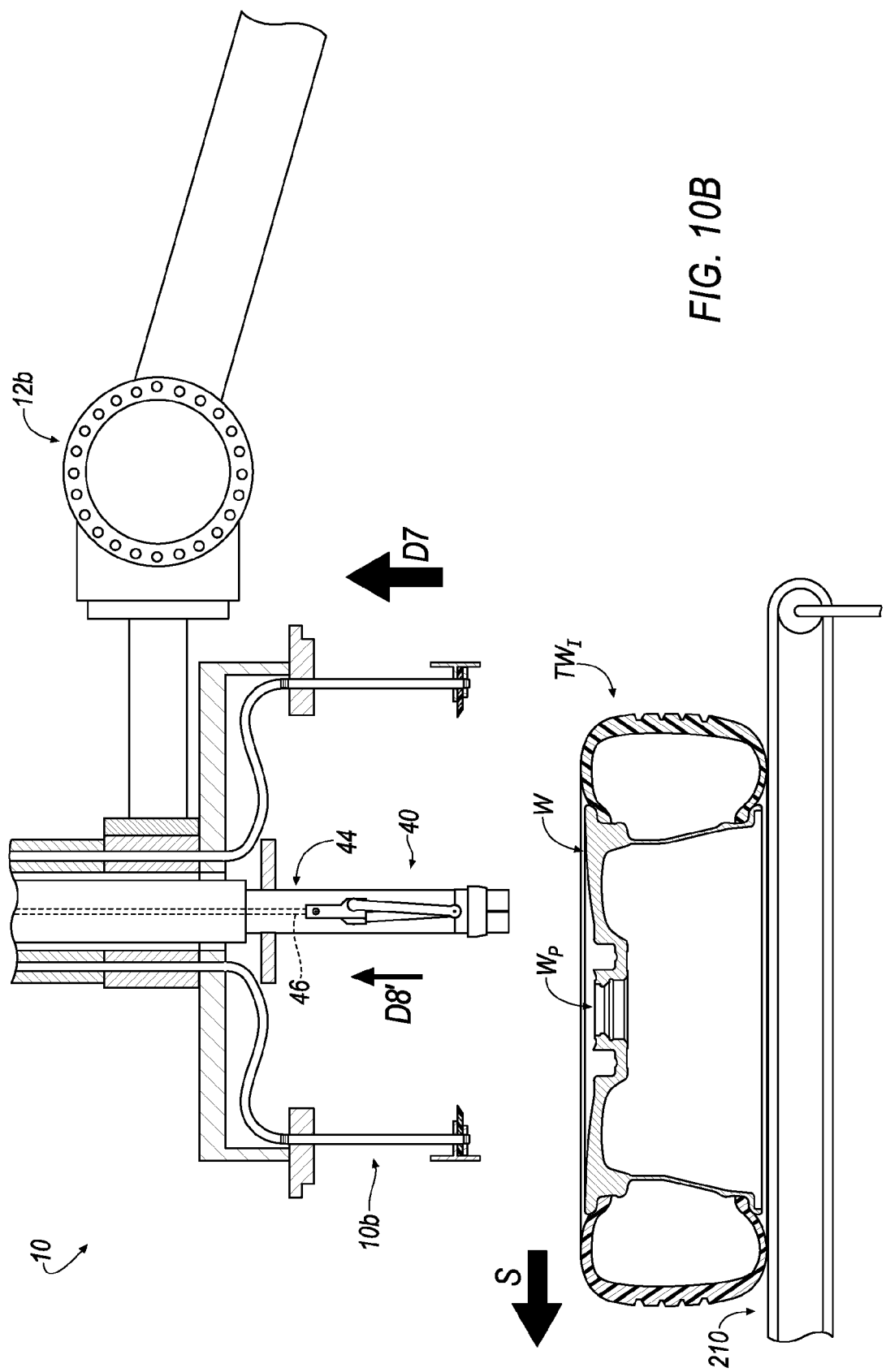
FIG. 10B illustrates the retaining member of the inflating end effecter manipulated from the expanded, second orientation of FIGS. 4D-4E, 6B, 10A back to the retracted, first orientation of FIGS. 4B-4C, 6A to permit the inflating end effecter to be selectively de-coupled from the inflated tire-wheel assembly.

With reference to FIG. 6B, when it is desired to move the retaining member from the radially-expanded, "enlarged orientation" back to the radially-retracted, "collapsed orientation," the actuating rod 46 may be moved according to the direction of the arrow, D10', which is opposite the direction of the arrow, D10. As seen in FIGS. 10A-10B, movement according to the direction of the arrow, D10', permits the inflating end effecter 10b to be selectively de-coupled from the wheel, W, such that an inflated tire-wheel assembly, $TW_I$, may be selectively detached from the inflating end effecter 10b.

Figure 8A:
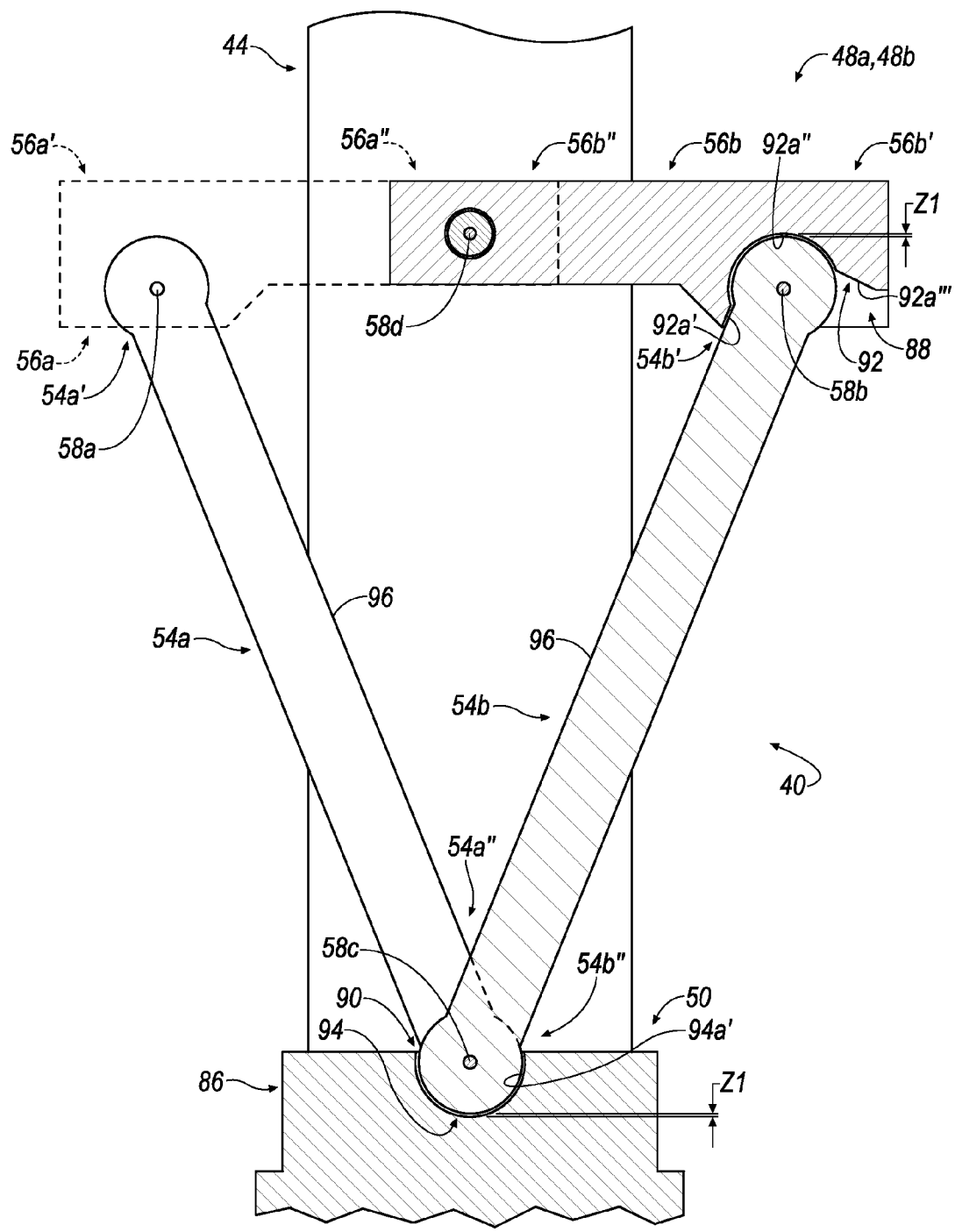
FIG. 8A illustrates a cross-sectional view of a portion of the retaining member of FIG. 6B in accordance with an exemplary embodiment of the invention.
Figure 8B:
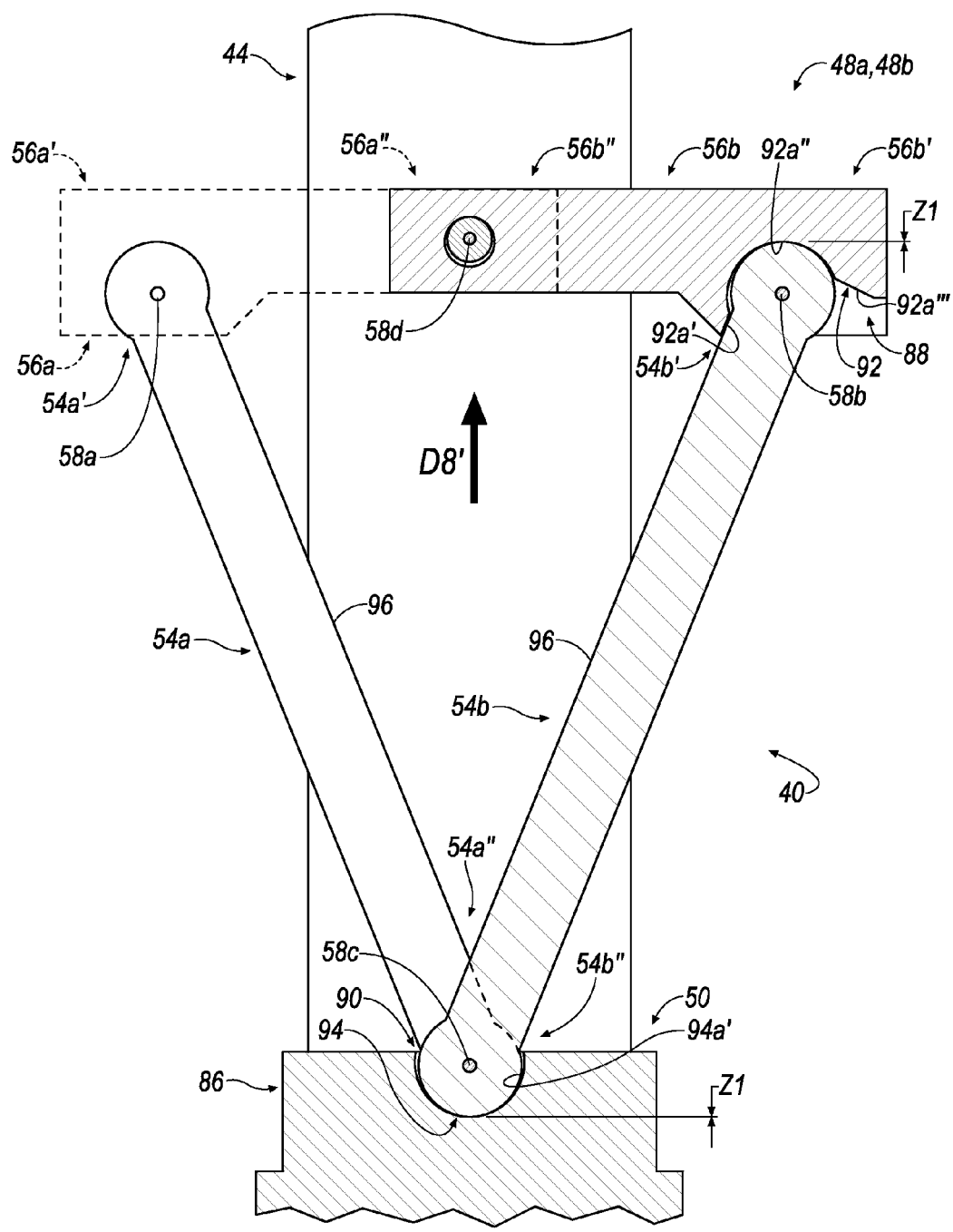
FIG. 8B illustrates another cross-sectional view of the portion of the retaining member of FIG. 8A in accordance with an exemplary embodiment of the invention.

Referring now to FIGS. 8A and 8B a partial cross-sectional view of the first and second hinged assembly 48a, 48b of the pair of the pair hinged assemblies 48 is shown according to an embodiment of the invention. Prior to discussing the partial cross-sectional view of the first and second hinged assembly 48a, 48b of the pair of the pair hinged assemblies 48 of FIGS. 8A and 8B, reference is made back to FIG. 5. In an embodiment, as seen in FIG. 5, each of the first and second hinge arm brackets 56a, 56b include thickness, T1. In an embodiment, the thickness, T1, is reduced in at least one selected area of each of the first and second hinge arm brackets 56a, 56b to form each of the first and second hinge arm brackets 56a, 56b to include a recessed pocket 88 having a bearing surface 92.

In an embodiment, as seen in FIGS. 8A, 8B, the bearing surface 92 includes a first flat portion 92a', an arcuate portion 92a" and a second flat portion 92a'". In an embodiment, an axial center of the arcuate portion 92a" is referenced from a pin passage formed in the second hinge arm bracket 56b that receives the second pin 58b.

Referring back to FIG. 5, in a substantially similar manner as described above, the sleeve member 50 includes a thickness, T2, that is reduced in at least two selected areas proximate an upper distal end 86 of the sleeve member 50 to form two recessed pockets 90 having a bearing surface 94. In an embodiment, the two recessed pockets 90 are formed in a diametrically opposing relationship on the outer surface 60 of the sleeve member 50.

In an embodiment, each recessed pocket 90 of the sleeve member 50 includes, respectively, the pin passage 62a, 62b. In an embodiment, as seen in FIGS. 8A, 8B, the bearing surface 94 includes an arcuate portion 94a'. In an embodiment, an axial center of the arcuate portion 94a' is referenced from the pin passage 62a. 62b formed in the sleeve member 50 that receives the third pin 58c.

With continued reference to FIG. 5, each of the first and second hinge arms 54a, 54b include a side surface 96 forming a thickness, T3, of each of the first and second hinge arms 54a, 54b. In an embodiment, the thickness, T3, of each of the first and second hinge arms 54a, 54b is less than the thickness, T1, T2, of the first and second hinge arm brackets 56a, 56b and sleeve member 50. Further, in an embodiment, the thickness, of each of the first and second hinge arms 54a, 54b is approximately the same as a width/thickness formed by the bearing surface 92, 94 of the recessed pocket 88, 90.

Referring now to FIG. 8A, in an embodiment, when the retaining member 40 is assembled relative the plunger member 44 as described above, the first end 54b' of the second hinge arm 54b may be arranged within the recessed pocket 88 formed at the first end 56b' of the second hinge arm bracket 56b; likewise (although not entirely shown due to the partial view of FIG. 8A), the first end 54a' of the first hinge arm 54a may be arranged within the recessed pocket 88 formed at the first end 56a' of the first hinge arm bracket 56a. Once the first end 54b' of the second hinge arm 54b may be arranged within the recessed pocket 88 formed at the first end 56b' of the second hinge arm bracket 56b, the second pin 58b may be extended through each of the second hinge arm 54b and the second hinge arm bracket 56b; likewise (although not entirely shown due to the partial view of FIG. 8A), once the first end 54a' of the first hinge arm 54a may be arranged within the recessed pocket 88 formed at the first end 56a' of the first hinge arm bracket 56a, the first pin 58a may be extended through each of the first hinge arm 54a and the first hinge arm bracket 56a.

Further, in an embodiment, when the retaining member 40 is assembled relative the plunger member 44 as described above (although not entirely shown due to the partial view of FIG. 8A), the second end 54a" of the first hinge arm 54a may be arranged within the recessed pocket 90 formed at the upper distal end 86 of the sleeve member 50. Once the second end 54a" of the first hinge arm 54a is arranged within the recessed pocket 90 formed at the upper distal end 86 of the sleeve member 50, the second end 54b" of the second hinge arm 54b may be arranged over/next to/adjacent the second end 54a" of the first hinge arm 54a that is arranged within the recessed pocket 90 formed at the upper distal end 86 of the sleeve member 50. Then, the third pin 58c may be extended through each of the first and second hinge arms 54a, 54b and the sleeve member 50.

With continued reference to FIG. 8A, when the retaining member 40 is arranged in the radially-expanded, "enlarged orientation," a portion of the side surface 96 of the first end 54b' of the second hinge arm 54b may be arranged proximate the first flat portion 92a' and the arcuate portion 92a" of the bearing surface 92 of the second hinge arm bracket 56b; likewise (although not entirely shown due to the partial view of FIG. 8A), a portion of the side surface 96 of the first end 54a' of the first hinge arm 54a may be arranged proximate the first flat portion 92a' and the arcuate portion 92a" of the bearing surface 92 of the first hinge arm bracket 56a. Conversely, when retaining member 40 is arranged in the radially-retracted, "collapsed orientation" a portion of the side surface 96 of the first end 54b' of the second hinge arm 54b may be arranged proximate the arcuate portion 92a" and the second flat portion 92a'" of the bearing surface 92 of the second hinge arm bracket 56b; likewise (although not entirely shown due to the partial view of FIG. 8A), a portion of the side surface 96 of the first end 54a' of the first hinge arm 54a may be arranged proximate the arcuate portion 92a" and the second flat portion 92a'" of the bearing surface 92 of the first hinge arm bracket 56a. Further, when the retaining member 40 is arranged in either of the radially-expanded, "enlarged orientation" and the radially-retracted, "collapsed orientation" a portion of the side surface 96 of the second end 54a" of the first arm 54a may be arranged proximate the arcuate portion 94a' of the bearing surface 94 formed at the upper distal end 86 of the sleeve member 50.

In an embodiment, the bearing surface 92, 94 of each of the sleeve member 50 and first and second hinge arm brackets 56a, 56b may functionally support or permit a portion of the side surface 96 of the first and second hinge arms 54a, 54b to bear against the sleeve member 50 and first and second hinge arm brackets 56a, 56b. By permitting portions of the side surface 96 to bear against the sleeve member 50 and first and second hinge arm brackets 56a, 56b as described above, it will be appreciated that shear forces, which would otherwise be almost entirely imparted to the pins 58a, 58b, 58c are significantly reduced or eliminated.

Referring to FIG. 8A, in an embodiment, upon arranging the retaining member 40 in the radially-expanded, "enlarged orientation," a relatively small gap or distance, Z1, may be provided between a portion of the side surface 96 and each of the sleeve member 50 and first and second hinge arm brackets 56a, 56b. Referring to FIG. 8B, however, upon the moving the plunger member 44 according to the direction of the arrow, D8', for drawing the distal end surface 42 of the retaining member 40 adjacent the inner surface, $W_{S2-I}$, of the second side, $W_{S2}$, of the wheel, W, at least a portion of the arcuate portion 94a' of the bearing surface 94 formed at the upper distal end 86 of the sleeve member 50 is drawn adjacent the portion of the side surface 96 of the second end 54a" of the first arm 54a, which also results in at least a portion of the side surface 96 of the first end 56b' of the second arm 56b being drawn adjacent one or more of the first flat portion 92a' and the arcuate portion 92a" of the bearing surface 92 of the second hinge arm bracket 56b; likewise (although not entirely shown due to the partial view of FIG. 8A), at least a portion of the side surface 96 of the first end 56a' of the first arm 56a is drawn adjacent one or more of the first flat portion 92a' and the arcuate portion 92a" of the bearing surface 92 of the first hinge arm bracket 56a. As seen in FIG. 8B, upon moving the plunger member 44 according to the direction of the arrow, D8', as described immediately above, the relatively small gap or distance, Z1, is reduced to approximately zero.

Figure 9A:
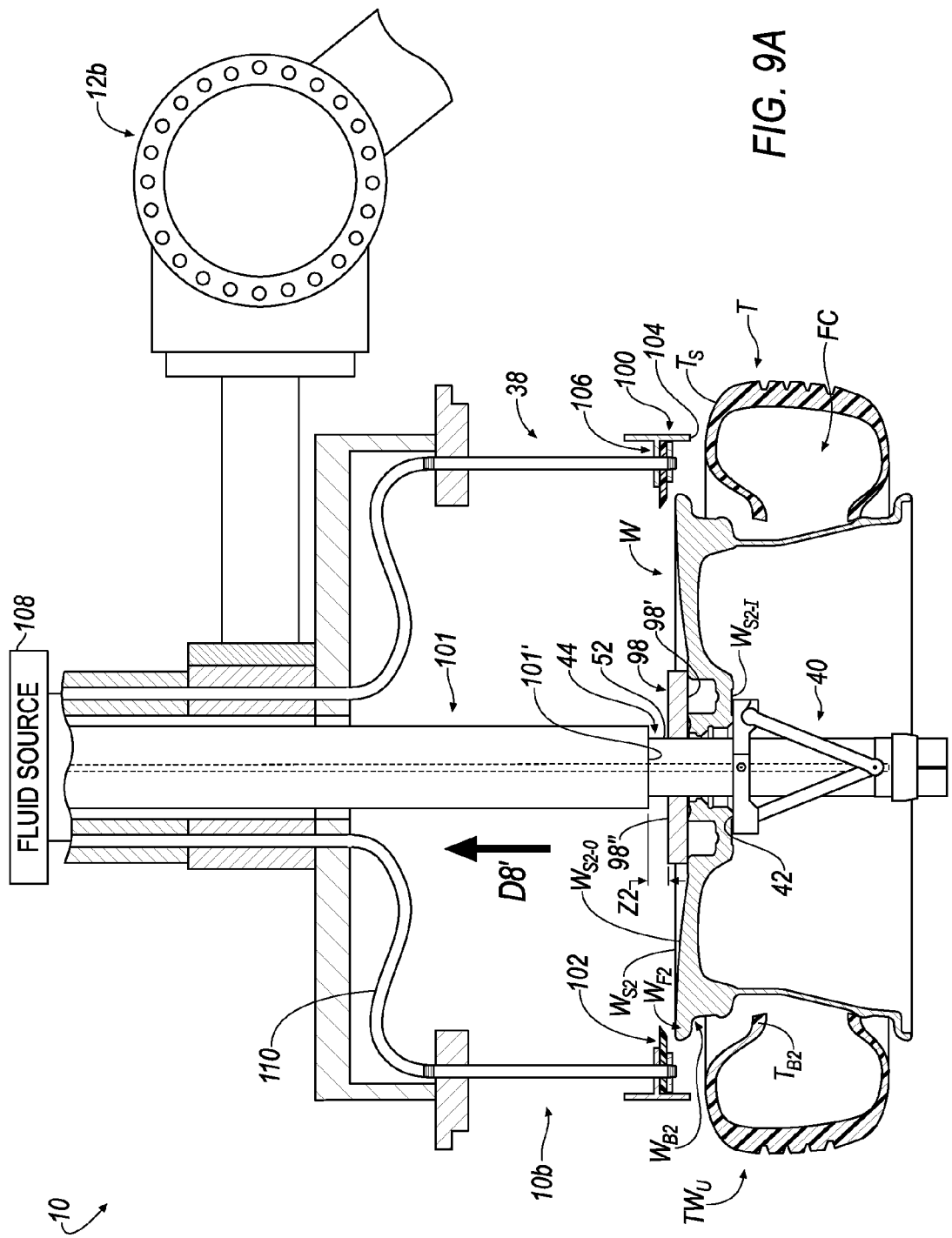
FIG. 9A illustrates an orientation of the inflating end effecter of the apparatus being manipulated to permit inflation of the un-inflated tire-wheel assembly in accordance with an exemplary embodiment of the invention.
Figure 9B:
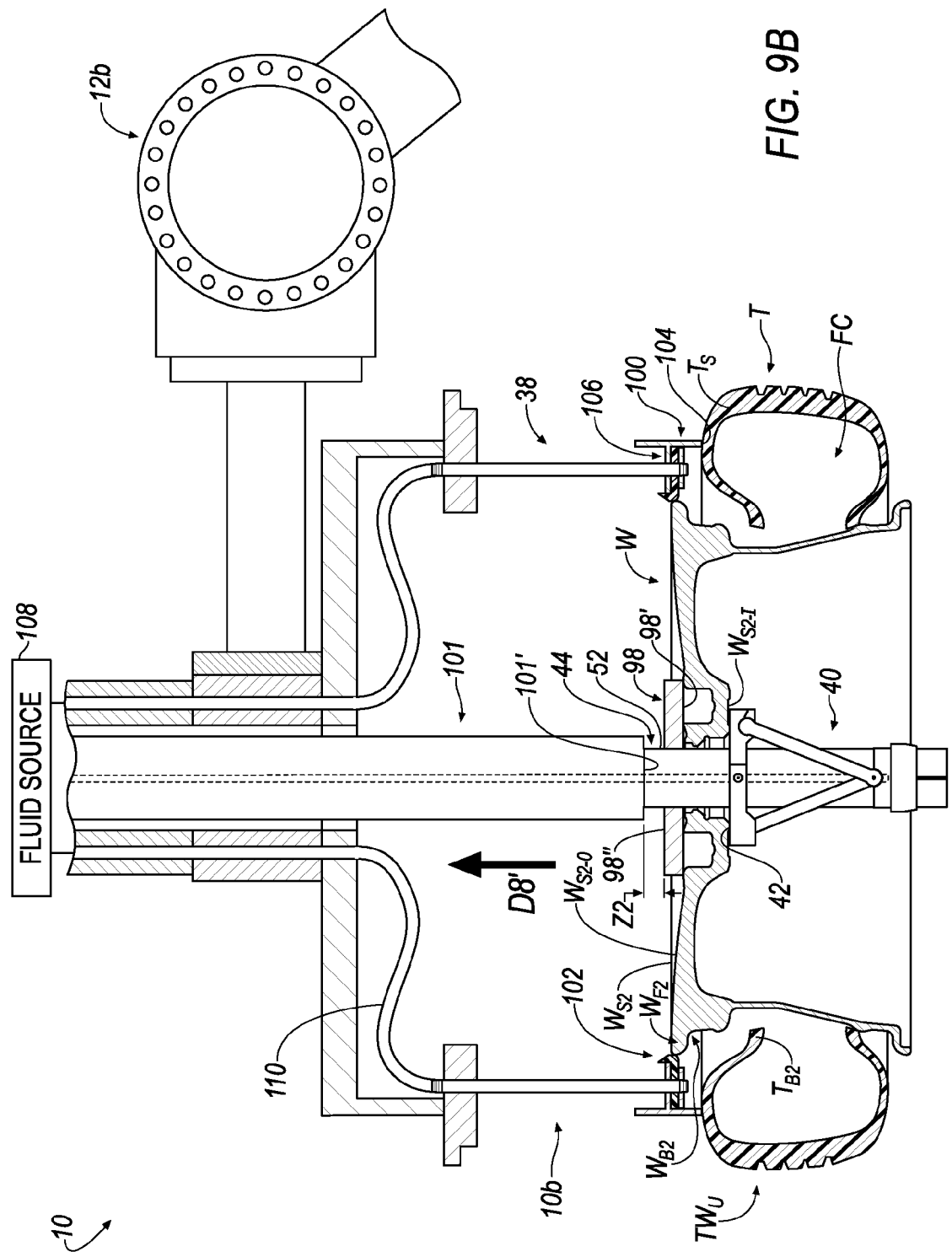
FIG. 9B illustrates the orientation of the inflating end effecter of the apparatus being further manipulated to permit inflation of the un-inflated tire-wheel assembly according to FIG. 9A in accordance with an exemplary embodiment of the invention.
Figure 9C:
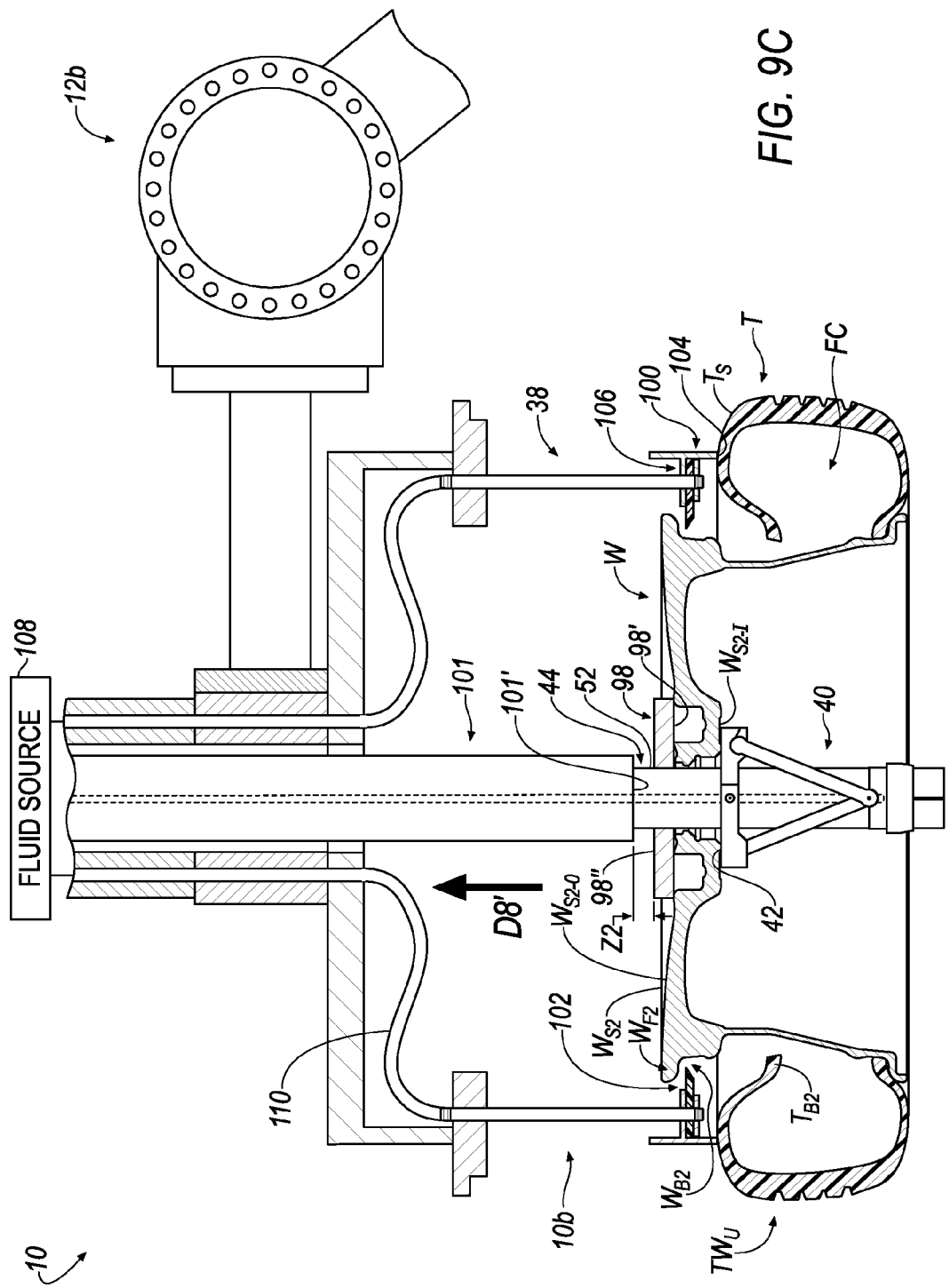
FIG. 9C illustrates the orientation of the inflating end effecter of the apparatus being further manipulated prior to an inflation procedure for inflating the un-inflated tire-wheel assembly according to FIG. 9B in accordance with an exemplary embodiment of the invention.

Referring to FIGS. 9A-9F, a method for utilizing the inflating end effecter 10b for inflating the un-inflated tire-wheel assembly, $TW_U$, is described in accordance with an exemplary embodiment of the invention. In an embodiment, as seen in FIGS. 9A-9C, upon moving the plunger member 44 according to the direction of the arrow, D8', the distal end surface 42 of the retaining member 40 is moved adjacent the inner surface, $W_{S2-I}$, of the second side, $W_{S2}$, of the wheel, W. Further, in an embodiment, as the distal end surface 42 of the retaining member 40 is moved as a result of the movement of the plunger member 44 according to the direction of the arrow, D8', the corresponding axial movement imparted to the retaining member 40 causes an outer surface, $W_{S2-O}$, of the second side, $W_{S2}$, of the wheel, W, to be axially drawn adjacent a lower axial surface 98' of a wheel engaging portion 98 that projects radially away from the outer surface 52 of the plunging member 44.

With continued reference to FIG. 9A, upon movement of the retaining member 40 according to the direction of the arrow, D8', an upper axial surface 98" of the wheel engaging portion 98 is spaced apart from a lower surface 101' of a carrier body 101 at a distance, Z2. In an embodiment, the carrier body includes a bore. In an embodiment, the plunger member 44 and actuating rod 46 are movably-disposed within the bore of the carrier body 101.

Referring to FIGS. 9A and 9B, movement of the plunging member 44 according to the direction of the arrow, D8', which is opposite the direction of the arrow, D8, causes the un-inflated tire-wheel assembly, $TW_U$, to be drawn towards an engaging assembly 100 of the inflating portion 38. In an embodiment, the engaging assembly 100 includes a radially-projecting, annular rim body 106 extending from the axially-projecting annular rim body 104 that is connected to the substantially annular, ring-shaped seal portion 102.

In an embodiment, movement of the plunging member 44 according to the direction of the arrow, D8', also results in the outer surface, $W_{S2-O}$, of the second side, $W_{S2}$, of the wheel, W, to be moved toward a substantially annular, ring-shaped seal portion 102 of the engaging assembly 100 as a sidewall, $T_S$, of the tire, T, is moved toward an axially-projecting, annular rim body 104 of the engaging assembly 100. Further, in an embodiment, as the plunging member 44 is moved according to the direction of the arrow, D8', the plunging member 44 may be withdrawn into the bore of the carrier body 101 such that the distance, Z2, is reduced as the upper axial surface 98" of the wheel engaging portion 98 is drawn closer to the lower surface 101' of the carrier body 101.

Referring to FIG. 9B, as the plunging member 44 is further drawn according to the direction of the arrow, D8', in an embodiment, as the axially-projecting, annular rim body 104 of the engaging assembly 100 engages the sidewall, $T_S$, of the tire, T, the substantially annular, ring-shaped seal portion 102 is disposed about and engages the second flange, $W_{F2}$, of the wheel, W. As seen in FIG. 9B, because the inner diameter of the substantially annular, ring-shaped seal portion 102 is substantially the same as but slightly less than a diameter of the second flange, $W_{F2}$, of the wheel, W, the substantially annular, ring-shaped seal portion 102 is moved from a substantially planar, neutral orientation (see, e.g., FIG. 9A) such that the substantially annular, ring-shaped seal portion 102 "flips" upwardly and away from the substantially planar, neutral orientation. The "flipped" orientation of the substantially annular, ring-shaped seal portion 102 is maintained until the substantially annular, ring-shaped seal portion 102 is permitted to move back to the neutral orientation (see, e.g., FIG. 9C) by further movement of the plunging member 44 according to the direction of the arrow, D8', such that the substantially annular, ring-shaped seal portion 102 is located proximate the second bead seat, $W_{B2}$, of the wheel, W.

Referring to FIG. 9D, in an embodiment, movement of the plunging member 44 according to the direction of the arrow, D8', ceases at approximately the moment when the substantially annular, ring-shaped seal portion 102 is moved back to the neutral orientation proximate the second bead seat, $W_{B2}$, of the wheel, W. Once the substantially annular, ring-shaped seal portion 102 is located proximate the second bead seat, $W_{B2}$, of the wheel, W, in the "neutral orientation," in an embodiment, a fluid cavity, FC, of the un-inflated tire-wheel assembly, $TW_U$, receives fluid, F, from a fluid source 108 by way of a fluid conduit 110 extending through one or more of the radially-projecting, annular rim body 106 and the substantially annular, ring-shaped seal portion 102.

As seen in FIG. 9D, upon the fluid, F, being moved into the fluid cavity, FC, the sidewall, $T_S$, of the tire, T, exerts a force according to the direction of the arrow, D11, such that the sidewall, $T_S$, of the tire, T, pushes the axially-projecting, annular rim body 104 of the engaging assembly 100 away from the un-inflated tire-wheel assembly, $TW_U$. As the sidewall, $T_S$, of the tire, T, pushes the axially-projecting, annular rim body 104 of the engaging assembly 100 away from the un-inflated tire-wheel assembly, $TW_U$, the substantially annular, ring-shaped seal portion 102 is disposed substantially adjacent the second flange, $W_{F2}$, of the wheel, W, proximate the second bead seat, $W_{B2}$, of the wheel, W, for causing the engaging assembly 100 to seal the fluid cavity, FC, from ambient surroundings in order to permit inflation of the un-inflated tire-wheel assembly, $TW_U$.

In an embodiment, it will be appreciated that when the force exerted by the sidewall, $T_S$, of the tire, T, is imparted to the axially-projecting, annular rim body 104, the plunging member 44 may be moved slightly according to the direction of the arrow, D8, for locating the substantially annular, ring-shaped seal portion 102 adjacent the second flange, $W_{F2}$, of the wheel, W, proximate the second bead seat, $W_{B2}$, of the wheel, W. Further, in an embodiment, as the plunging member 44 is moved according to the direction of the arrow, D8, the plunging member 44 may be slightly drawn out of the bore of the carrier body 101 such that the distance, Z2, is marginally increased as the upper axial surface 98" of the wheel engaging portion 98 is moved slightly away from the lower surface 101' of the carrier body 101.

In an embodiment, it will be appreciated that the fluid, F, being deposited into the fluid cavity, FC, may be pressurized or compressed such that the fluid, F, may be automatically evacuated from the fluid source 108 and into the fluid cavity, FC. Further, in an embodiment, it will be appreciated that the fluid source 108 may be excluded from the design of the inflating end effector 10b in favor of, for example, a pump (not shown); in an embodiment, the pump may move fluid, F (e.g. ambient air), from ambient surroundings, through the fluid conduit 110 and into the fluid cavity, FC.

Figure 9E:
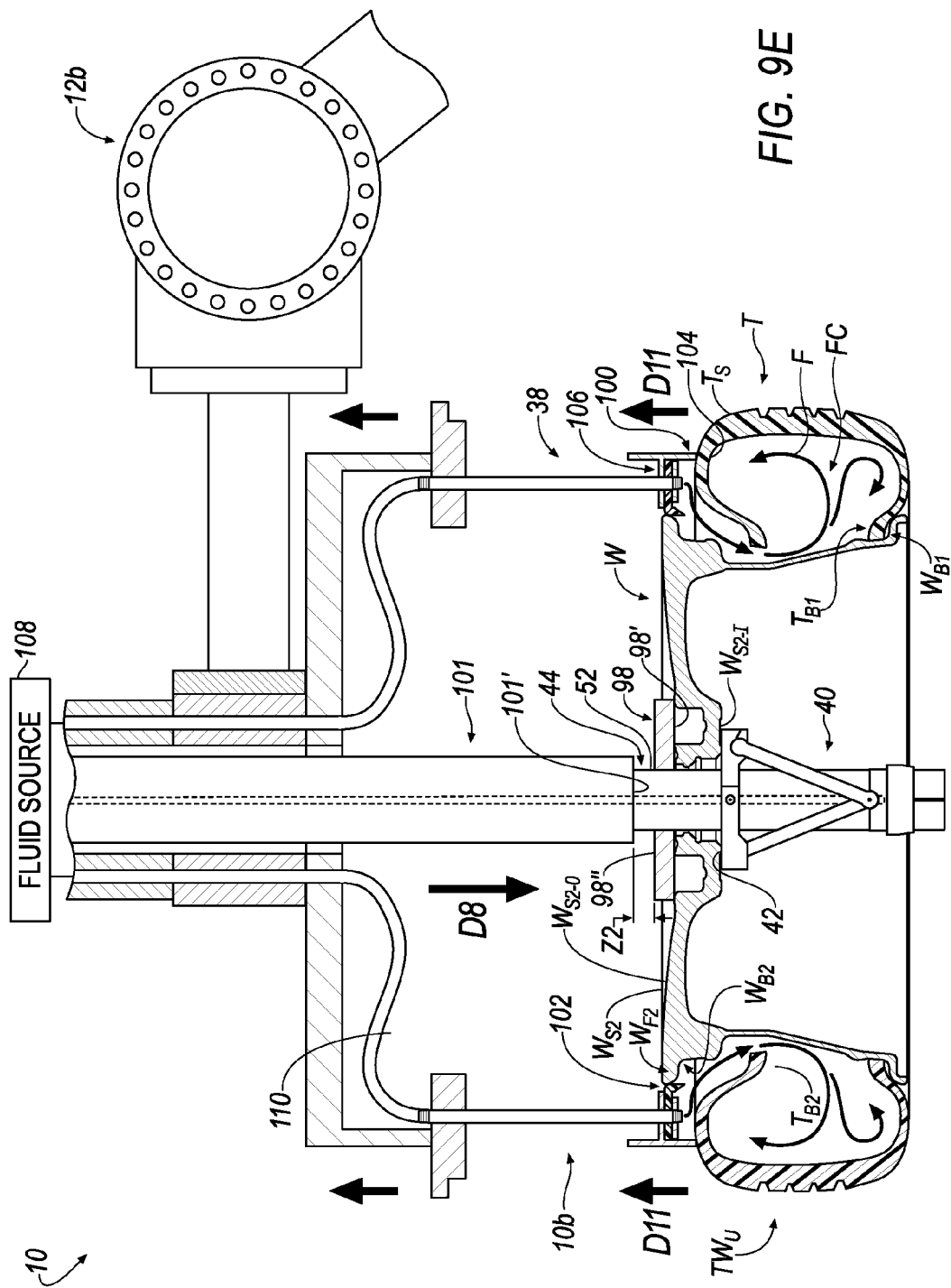

Referring to FIG. 9E, as the fluid cavity, FC, is continued to be filled with the fluid, F, the sidewall, $T_S$, of the tire, T, continues to impart a force to the axially-projecting, annular rim body 104 of the engaging assembly 100 according to the direction of the arrow, D11. Further, as seen in FIG. 9E, the plunging member 44 continues to move slightly at the distance according to the direction of the arrow, D8, such that the substantially annular, ring-shaped seal portion 102 is moved from the sealed, substantially planar, neutral orientation adjacent the second flange, $W_{F2}$, of the wheel, W (see, e.g., FIG. 9D), to an orientation that is partially engaged with the second flange, $W_{F2}$, of the wheel, W, such that the substantially annular, ring-shaped seal portion 102 becomes "flipped" downwardly, and away from the substantially planar, neutral orientation adjacent the second flange, $W_{F2}$, of the wheel, W. As seen in FIG. 9E, during this re-orientation of the substantially annular, ring-shaped seal portion 102, the substantially annular, ring-shaped seal portion 102 remains disposed adjacent the second flange, $W_{F2}$, of the wheel, W, until the fluid, F, fills the fluid cavity, FC, thereby causing the substantially annular, ring-shaped seal portion 102 to be moved away from the second flange, $W_{F2}$, of the wheel, W, such that the second bead, $T_{B2}$, of the tire, T, may become automatically seated (see, e.g., FIG. 9F) adjacent the second bead seat, $W_{B2}$, of the wheel, W. Further, in an embodiment, it will be appreciated that the fluid, F, filling the fluid cavity, FC, also causes the first bead, $T_{B1}$, of the tire, T, to be seated adjacent the first bead seat, $W_{B1}$, of the wheel, W.

Figure 9F:
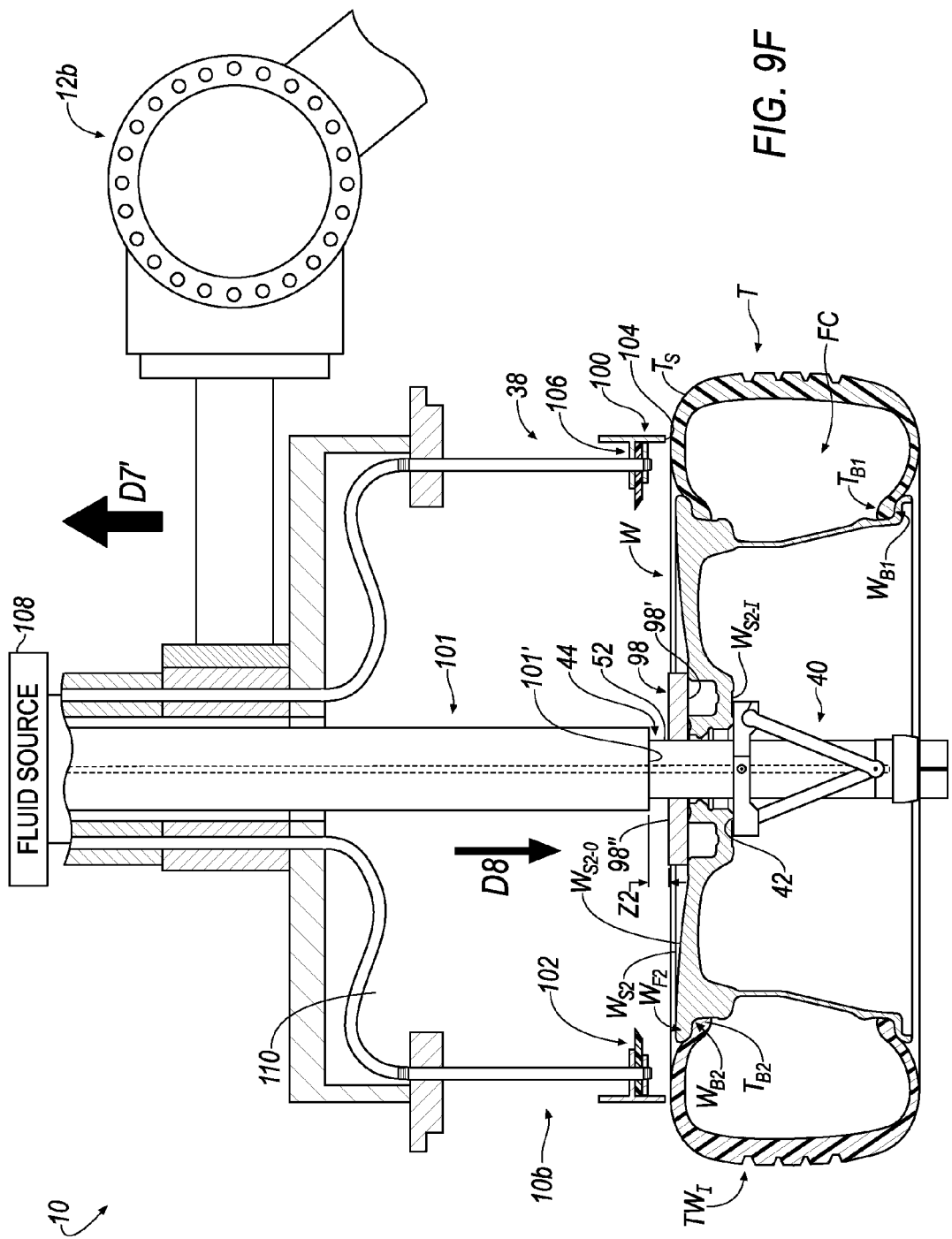
FIG. 9F illustrates the orientation of the inflating end effecter of the apparatus being further manipulated once the inflation procedure for inflating the un-inflated tire-wheel assembly is completed according to FIG. 9E in accordance with an exemplary embodiment of the invention.

Referring to FIG. 9F, upon the second bead, $T_{B2}$, of the tire, T, becoming seated adjacent the second bead seat, $W_{B2}$, of the wheel, W, the plunging member 44 may continue to move slightly at the distance according to the direction of the arrow, D8, such that the now-inflated tire-wheel assembly, $TW_I$, may be further moved away from the engaging assembly 100 of the inflating portion 38. Once the inflating end effector 10b has finished processing (i.e., inflating) the inflated tire-wheel assembly, $TW_I$, the second robotic arm 12b may move according to the direction of the arrow, D7', which is opposite the direction of the arrow, D7, toward a receiving conveyor 210 (see, e.g., FIG. 10A). Further, as seen in FIGS. 1 and 10A, it will be appreciated that the apparatus 10, conveyor 202, mounting station 204 and conveyor 210 may be said to be components of the system 200.

Referring to FIG. 10A, once the second robotic arm 12b moves the inflated tire-wheel assembly, $TW_I$, proximate the conveyor 210, the actuating rod 46 may be moved according to the direction of the arrow, D10', which is opposite the direction of the arrow, D10, for causing the retaining member 40 to move according to the direction of the arrow, D9', which is opposite the direction of the arrow, D9. It will be appreciated that movement of the retaining member 40 according to the direction of the arrow, D9', causes the distal end surface 42 of the retaining member 40 to be drawn away from the inner surface, $W_{S2-I}$, of the second side, $W_{S2}$, of the wheel, W, such that the retaining member 40 may be moved from the radially-expanded, "enlarged orientation" back to the radially-retracted, "collapsed orientation."

Referring to FIG. 10B, once the retaining member 40 is moved to the radially-retracted, "collapsed orientation," the plunging member 44 may be moved according to the direction of the arrow, D8', which is opposite the direction of the arrow, D8, for moving the retaining member 40 and plunging member 44 axially away from the inflated tire-wheel assembly, $TW_I$. In an embodiment, when the plunging member 44 is moved according to the direction of the arrow, D8', for moving the plunging member 44 away from the inflated tire-wheel assembly, $TW_I$, the plunging member 44 is withdrawn from being disposed within axially-centered passage, $W_P$, of the wheel, W.

Upon moving the plunging member 44 away from the inflated tire-wheel assembly, $TW_I$, as described above, the inflated tire-wheel assembly, $TW_I$, may be said to be disconnected from the inflating end effector 10b/apparatus 10. The conveyor 210 may shuttle the inflated tire-wheel assembly, $TW_I$, according to the direction of the arrow, S, for further processing (e.g., balancing and the like). Further, the inflating end effector 10b may be moved by the second robotic arm 12b according to the direction of the arrow, D7, for returning the inflating end effector 10b back to an orientation shown in FIG. 4A for subsequent interfacing with another un-inflated tire-wheel assembly, $TW_U$, assembled by the assembling end effector 10a.

Referring to FIGS. 11A-11D, an alternative retaining member 40' is shown according to an embodiment of the invention. In an embodiment, the retaining member 40' is substantially similar to the retaining member 40. It will be appreciated, however, that the retaining member 40' is not limited to being a component of an inflating end effector 10b as shown and described above with respect to the retaining member 40. For example, in an embodiment, the retaining member 40' may be a component of either of the assembling end effector 10a, the inflating end effector 10b or the like. As such, the views shown and described in FIGS. 11A-11D are not limited to illustrate either of the assembling end effecter 10*a* and inflating end effecter 10*b*; rather, FIGS. 11A-11D are illustrated to only display the wheel, W, in order to illustrate how an orientation of the retaining member 40' is manipulated to engage the wheel, W.

In an embodiment, the retaining member 40' is substantially similar to the retaining member 40 with the exception that the retaining member 40' does not include the structure of the sleeve/carrier member 50 and hinge arm brackets 56*a*, 56*b* including recessed pockets 88, 90 having bearing surfaces 92, 94. Rather, the retaining member 40' is formed to include a carrier member 50' and a first pair of hinge arms 54' and a second pair of hinge arms 54".

Structurally, in an embodiment, the retaining member 40' includes a pair of hinged assemblies 48 including a first hinged assembly 48*a* and a second hinged assembly 48*b*. Because the view of the retaining member 40' is a side view, it will be appreciated that the side view illustrates only one of the first and second hinged assembly 48*a*, 48*b* and that the other of the first and second hinged assembly 48*a*, 48*b* is provided in a diametrically opposing relationship on the other side of the plunger member 44.

In an embodiment each of the first and second hinged assemblies 48*a*, 48*b* is formed by pins 58' connecting a first pair of hinge arms 54', a second pair of hinge arms 54" and the carrier member 50'. In an embodiment, the pins 58' connect the first pair of hinge arms 54' to a first distal end 50*a*' the carrier member 50'. In an embodiment, the pins 58' connect the first pair of hinge arms 54' to the second pair of hinge arms 54". In an embodiment, the pins 58' connect the second pair of hinge arms 54" to a second distal end 50*b*' of the carrier member 50'. In an embodiment, because the retaining member 40' does not include structure that forms the recessed pockets 88, 90 having bearing surfaces 92, 94, the pins 58' may be formed from a substantially rigid material in order for the retaining member 40' to withstand shear forces imparted about the pins 58' as the orientation of the first and second pairs of hinge arms 54', 54" are changed as the orientation of the retaining member 40' is manipulated relative the wheel, W.

In an embodiment, the carrier member 50' may further comprise a stem portion 51'. In an embodiment, the stem portion 51' is fixed to the second distal end 50*b*' of the carrier member 50'. In an embodiment, the first distal end 50*a*' of the carrier member 50' is slidably-disposed relative the stem portion 51'.

Figure 11A:
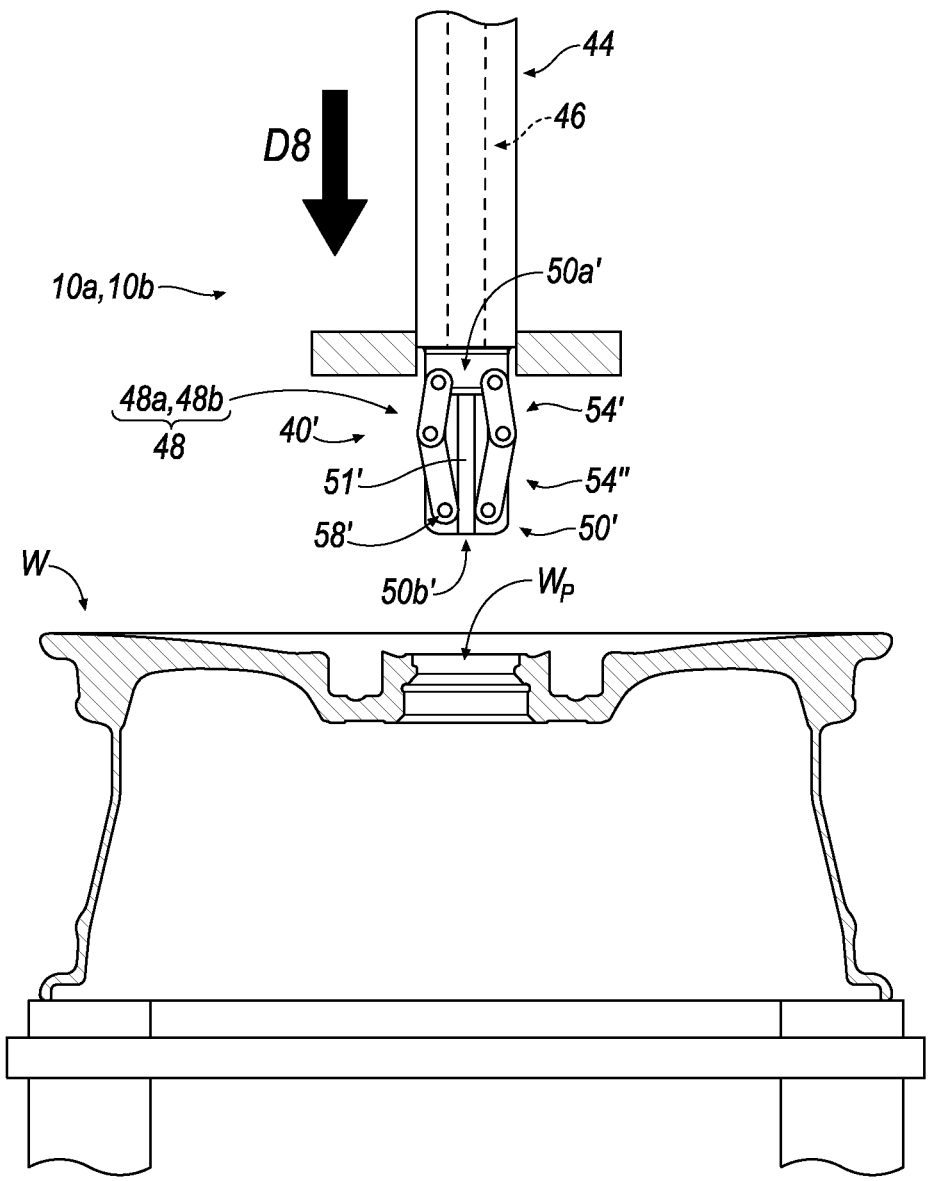
FIG. 11A illustrates a retaining member of one of an assembling end effecter or an inflating end effecter in a retracted, first orientation in accordance with an exemplary embodiment of the invention.

In an embodiment, it will be appreciated that the actuating rod 46 is connected to the first distal end 50*a*' of the carrier member 50' for axially moving the first distal end 50*a*' of the carrier member 50' relative the stem portion 51' for manipulating the orientation of the first and second pair of hinge arms 54', 54". Referring initially to FIG. 11A, prior to axially moving the actuating rod 46 for axially moving the first distal end 50*a*' of the carrier member 50', the plunging member 44 is moved according to the direction of the arrow, D8, for moving at least a portion of the retaining member 40' through the axially-centered passage, Wp, of the wheel, W.

Figure 11B:
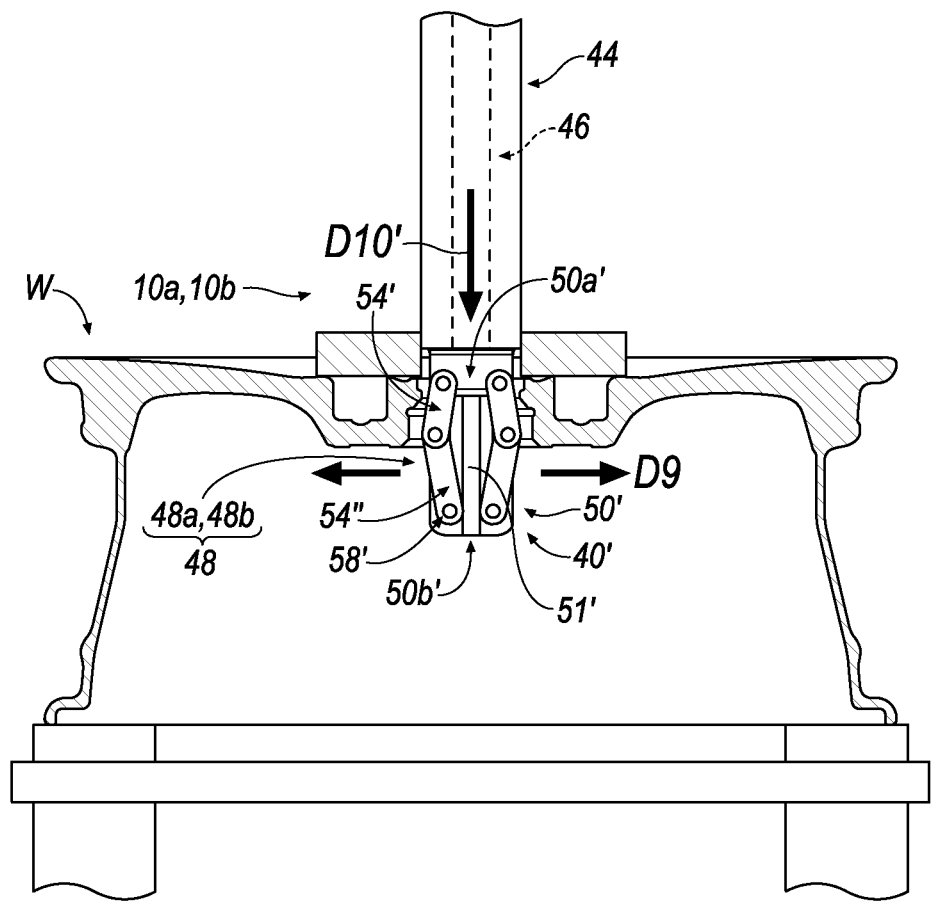
FIG. 11B illustrates the retaining member of FIG. 11A being inserted through a wheel while in the retracted, first orientation in accordance with an exemplary embodiment of the invention.
Figure 11C:
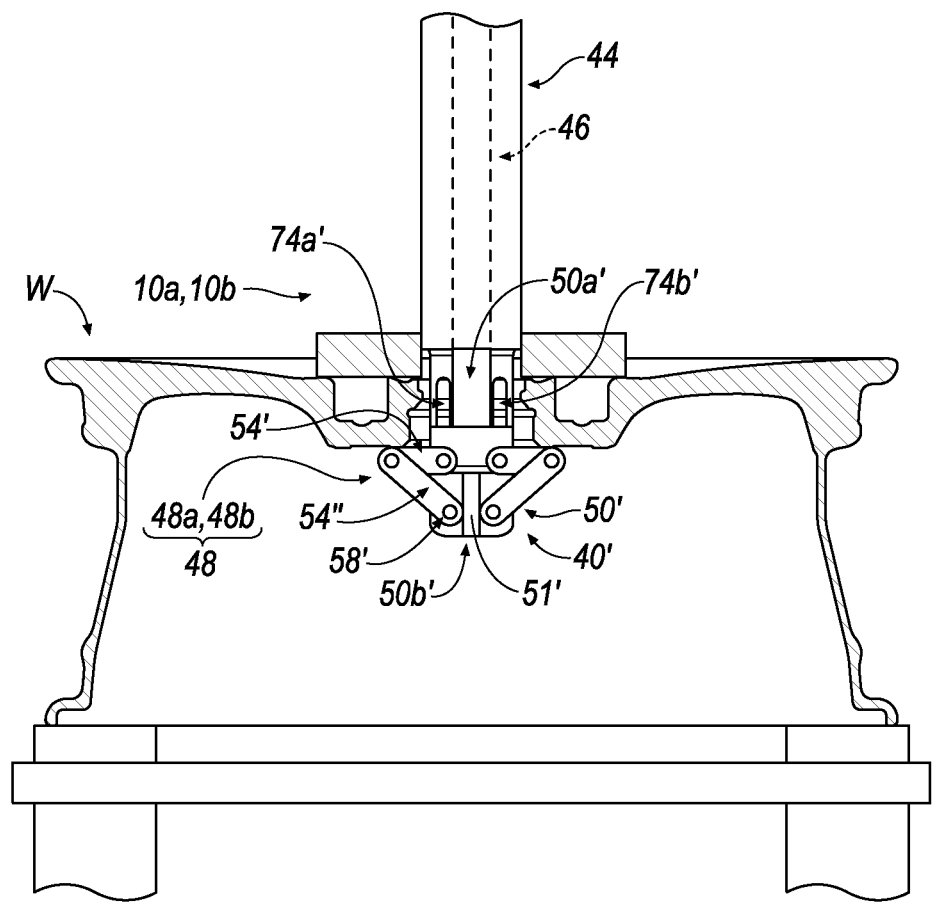
FIGS. 11C-11D illustrate the retaining member of FIG. 11B being moved from the retracted, first orientation to an expanded, second orientation for permitting the retaining member to engage the wheel in accordance with an exemplary embodiment of the invention.

Referring to FIG. 11B, in an embodiment, the actuating rod 46 is then moved according to the direction of the arrow, D10', for causing a corresponding movement of the first distal end 50*a*' of the retaining member 40' in order to move the first and second pair of hinge arms 54', 54" according to the direction of the arrow, D9. Referring to FIG. 11C, because of the movement of the actuating rod 46 according to the direction of the arrow, D10', the first distal end 50*a*' of the carrier member 50' is axially plunged according to the direction of the arrow, D10', relative the stem portion 51' for causing the first and second pair of hinge arms 54', 54" to move according to the direction of the arrow, D9, from the radially-retracted, "collapsed orientation" (see, e.g., FIGS. 11A, 11B) to a radially-expanded, "enlarged orientation" (see, e.g., FIGS. 11C, 11D). In an embodiment, as seen in FIG. 11C, the plunging member 44 may also be formed to include slots 74*a*', 74*b*' such that the pins 58' may extend through the first pair of hinge arms 54', through the first distal end 50*a*' of the carrier member 50' and into the slots 74*a*', 74*b*, such that the pins 58' are slidably-disposed within the slots 74*a*', 74*b*'.

In an embodiment, it will be appreciated that movement of the first ands second pair of hinge arms 54', 54" according to the direction of the arrow, D9, is responsive to movement of the actuating rod 46 according to the direction of the arrow, D10', whereas movements of the pair of hinge arms 54 and pair of hinge arm bearing brackets 56 according to the direction of the arrow, D9, is responsive according to movement of the actuator rod 46 according to the direction of the arrow, D10, which is opposite the direction of arrow, D10'. As such, it will be appreciated that the present disclosure sets forth several structurally unique retaining members 40, 40' that are functionally similar in the engagement of the wheel, W; however, it will be appreciated that the orientation of the retaining member 40, 40' from the radially-retracted, "collapsed orientation" to the radially-expanded, "enlarged orientation" may be arrived at in a non-limiting fashion according to one of a movement of the actuating rod 46 according to the direction of one of the arrows, D10, D10' relative the wheel, W, (i.e. the actuating rod 46 may move away from or toward the wheel, W, to cause the retaining member 40, 40' to engage the wheel, W).

Figure 11D:
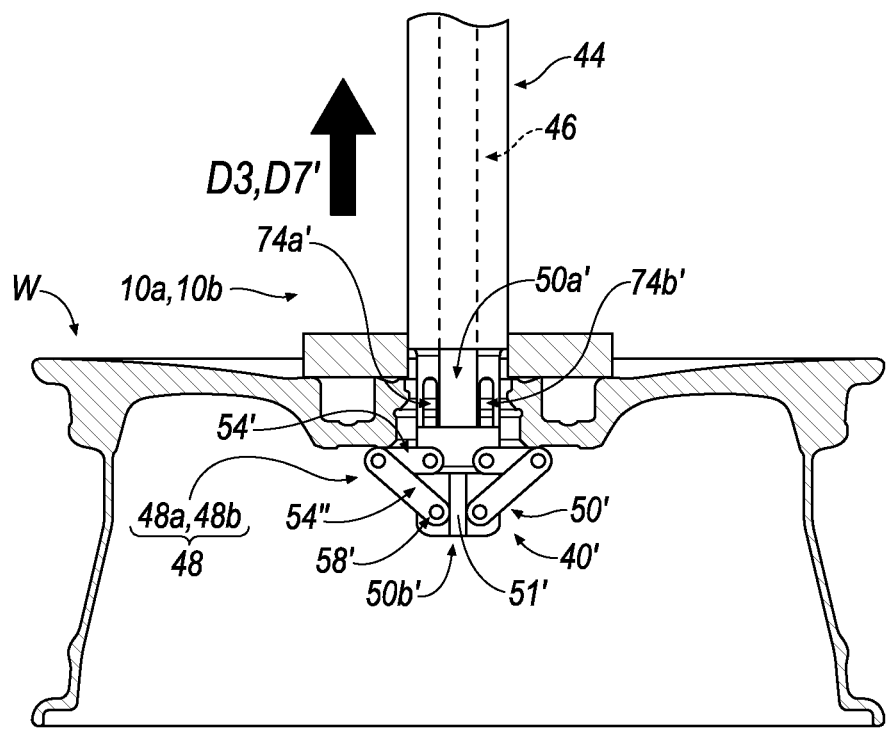
Figure 11D:
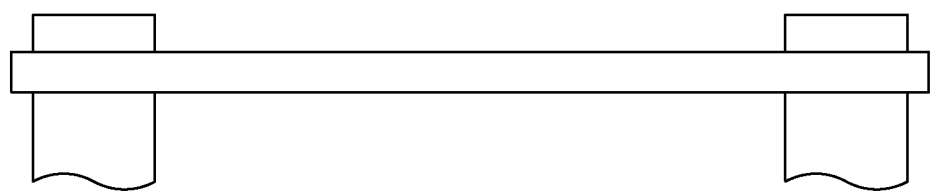

Further, as seen in FIG. 11D, it will be appreciated that upon the retaining member 40' engaging the wheel, W, the wheel, W, may be moved according to the direction of one of the arrows, D3, or D7'. As such, in an embodiment, it will be appreciated that the retaining member 40' may be associated with one of the first robotic arm 12*a* or the second robotic arm 12*b*. As such, if, for example, the retaining member 40' is associated with the first robotic arm 12*a*, it will be appreciated that the retaining member 40' may replace the structure associated with, for example, the bracket 20, the one or more flanges 22, the pair of sliding members 24 and the pair of wheel-engaging members 26 such that the robotic arm 12*a* including the retaining member 40' may move the wheel, W, according to the direction of the arrow, D3; alternatively, if, for example, the retaining member 40' is associated with the second robotic arm 12*b*, it will be appreciated that the retaining member 40' may replace the structure associated with, for example, the retaining member 40 such that the robotic arm 12*b* may move the wheel, W, according to the direction of the arrow, D7'.

Figure 12A:
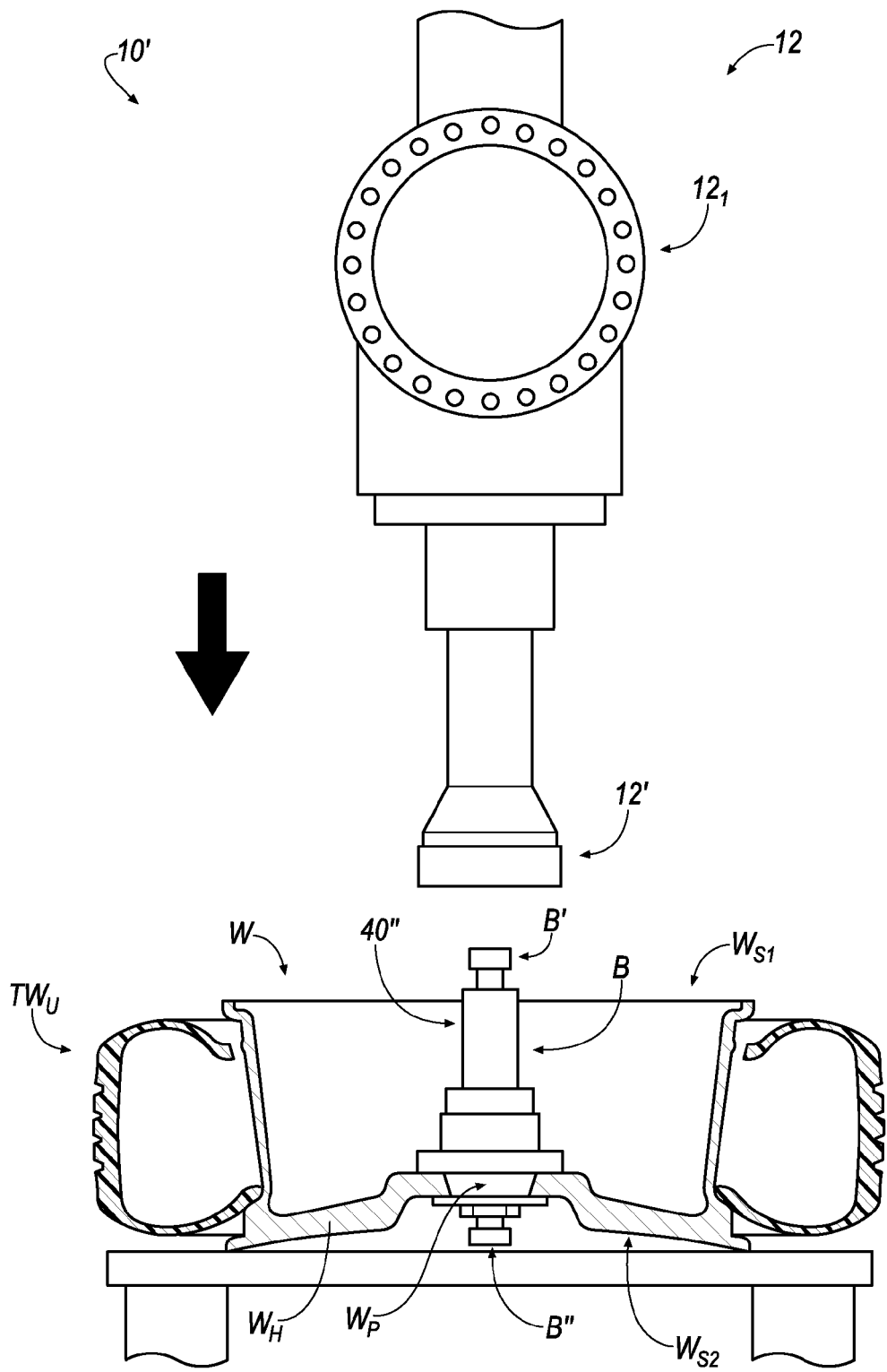
FIG. 12A illustrates an end of a robotic arm and a retaining member attached to a wheel of an un-inflated tire-wheel assembly in accordance with an exemplary embodiment of the invention.
Figure 12B:
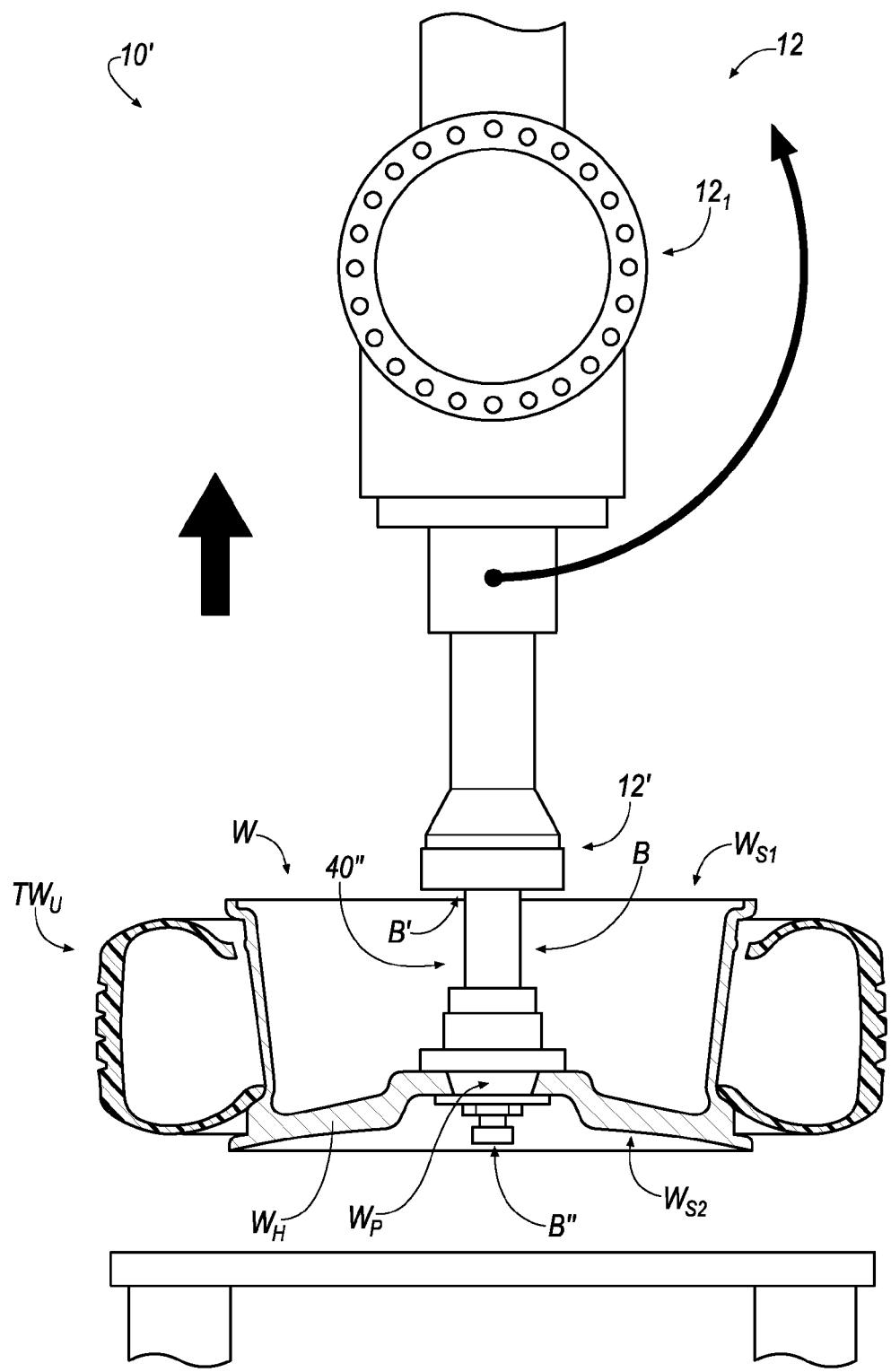
FIG. 12B illustrates the end of a robotic arm attached to the retaining member of FIG. 12A for moving the un-inflated tire-wheel assembly in accordance with an exemplary embodiment of the invention.
Figure 12C:
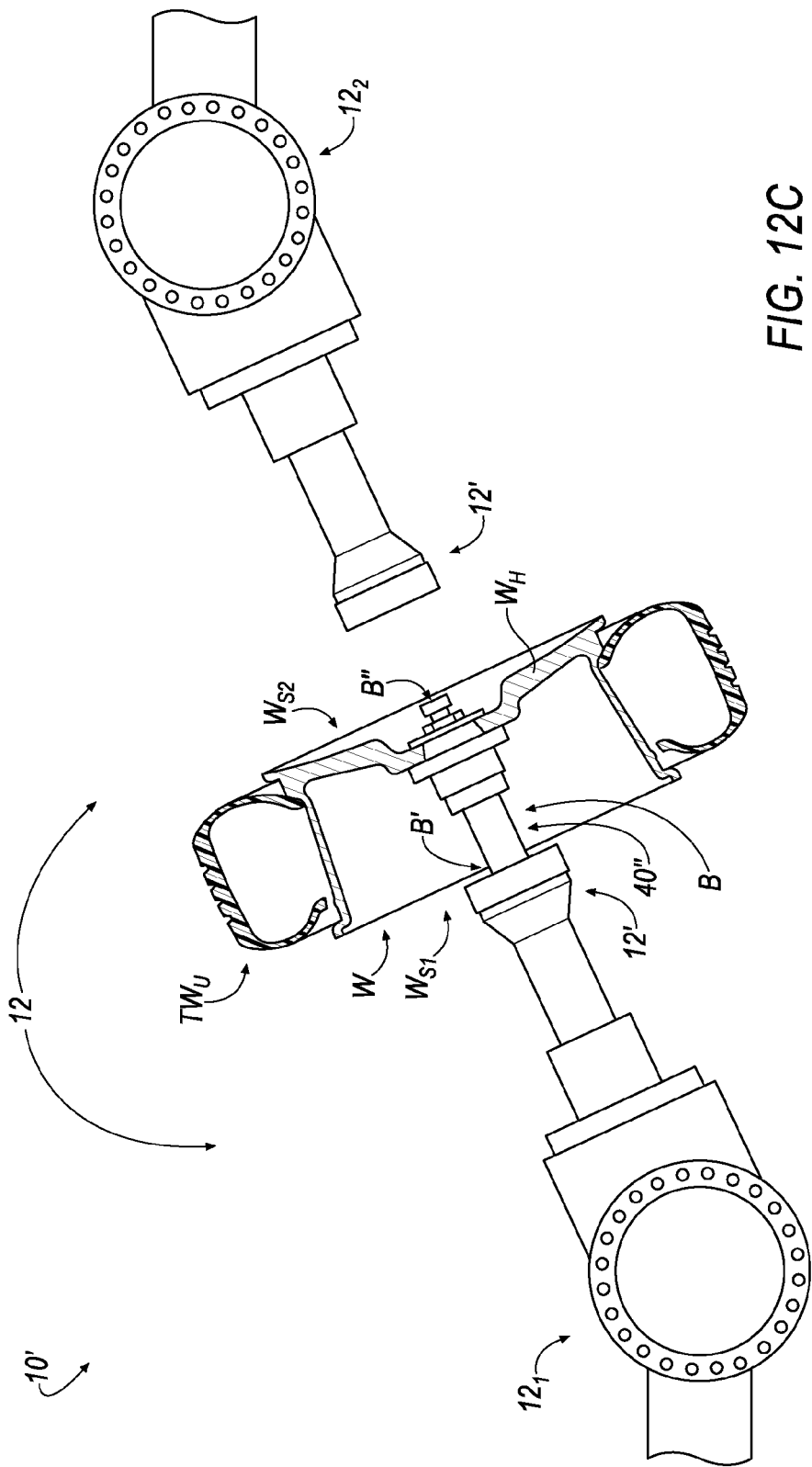
FIGS. 12C-12E illustrates the robotic arm of FIG. 12B utilizing the retaining member to hand off the un-inflated tire-wheel assembly to a second robotic arm in accordance with an exemplary embodiment of the invention.
Figure 12D:
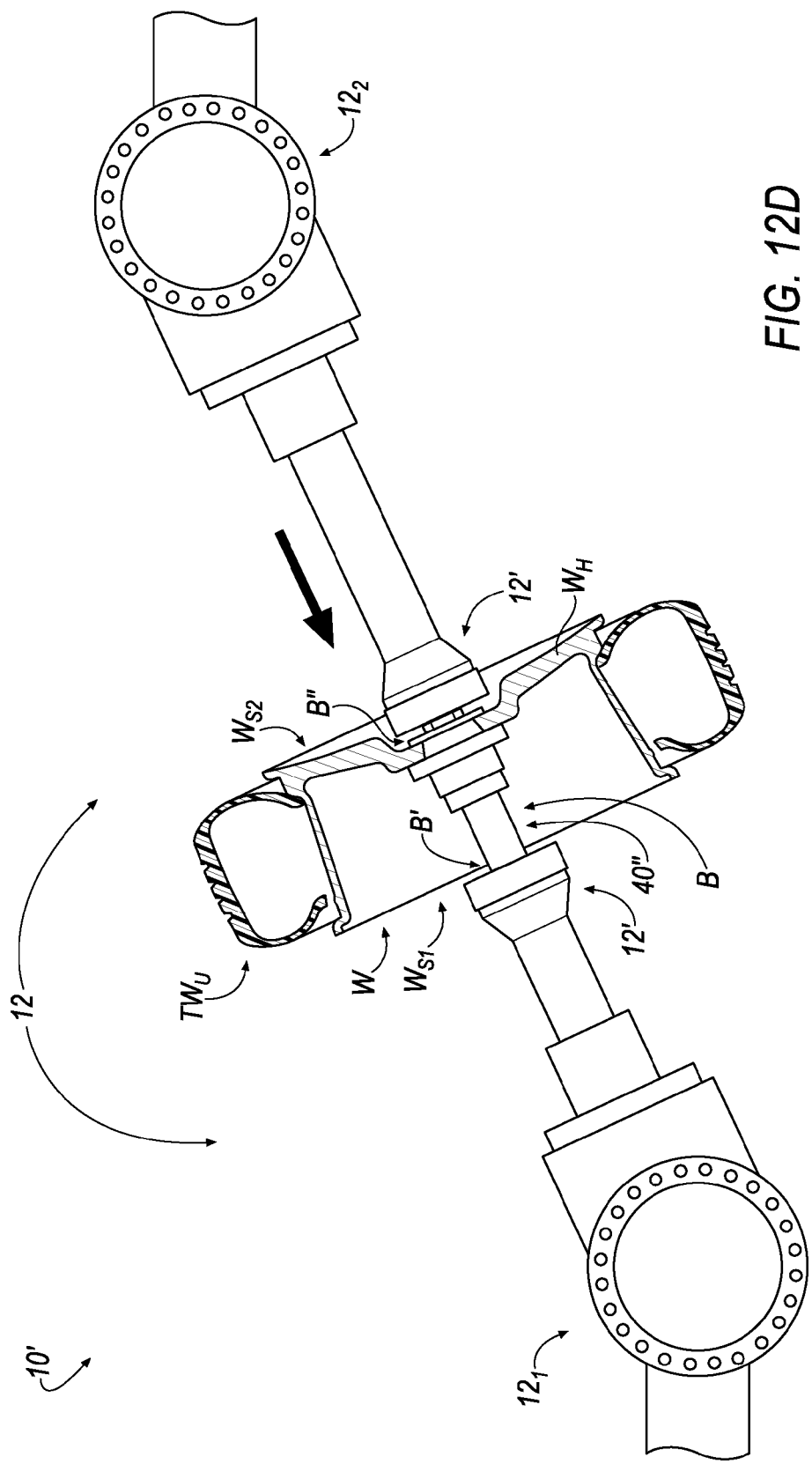
Figure 12E:
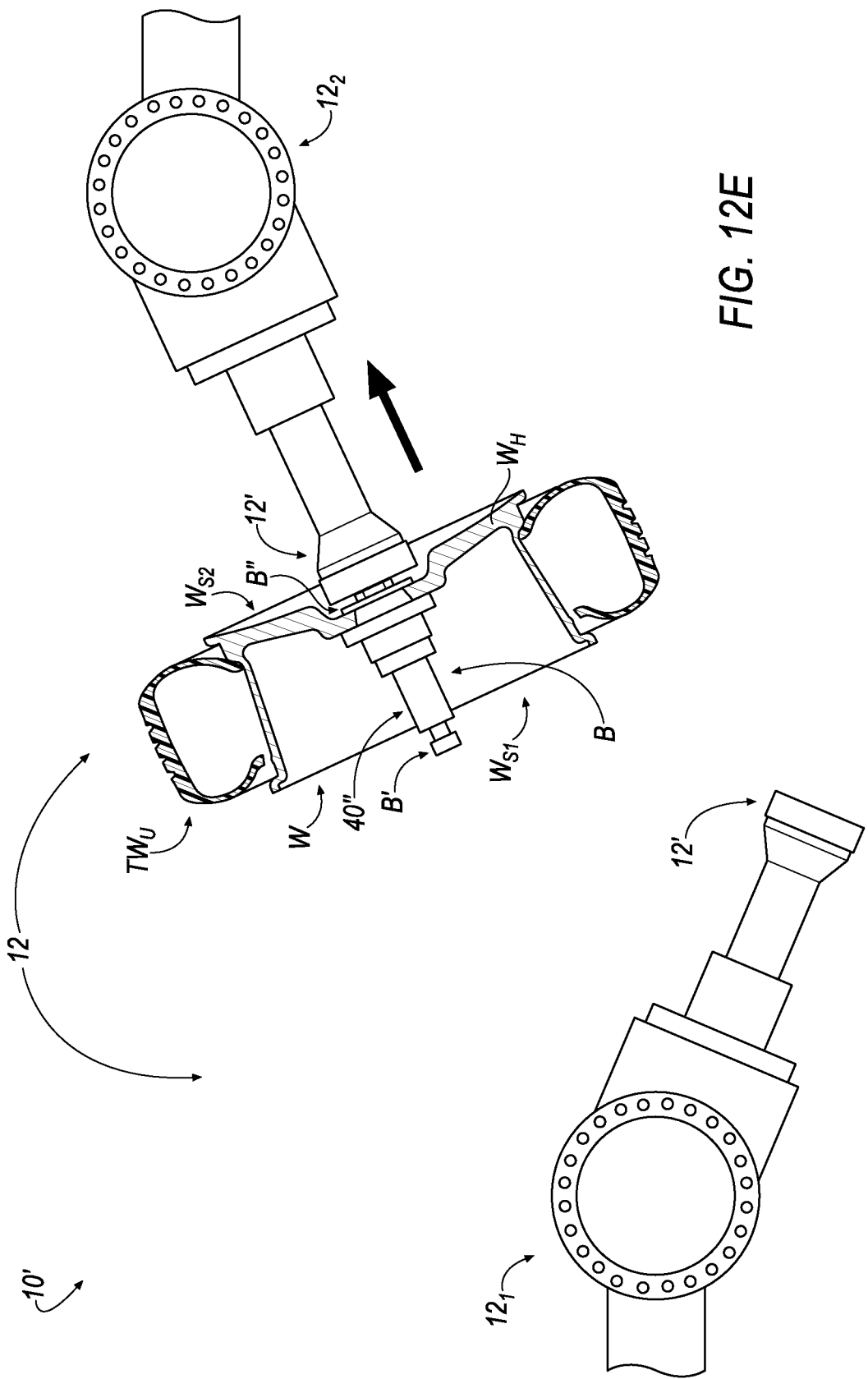
Figure 12F:
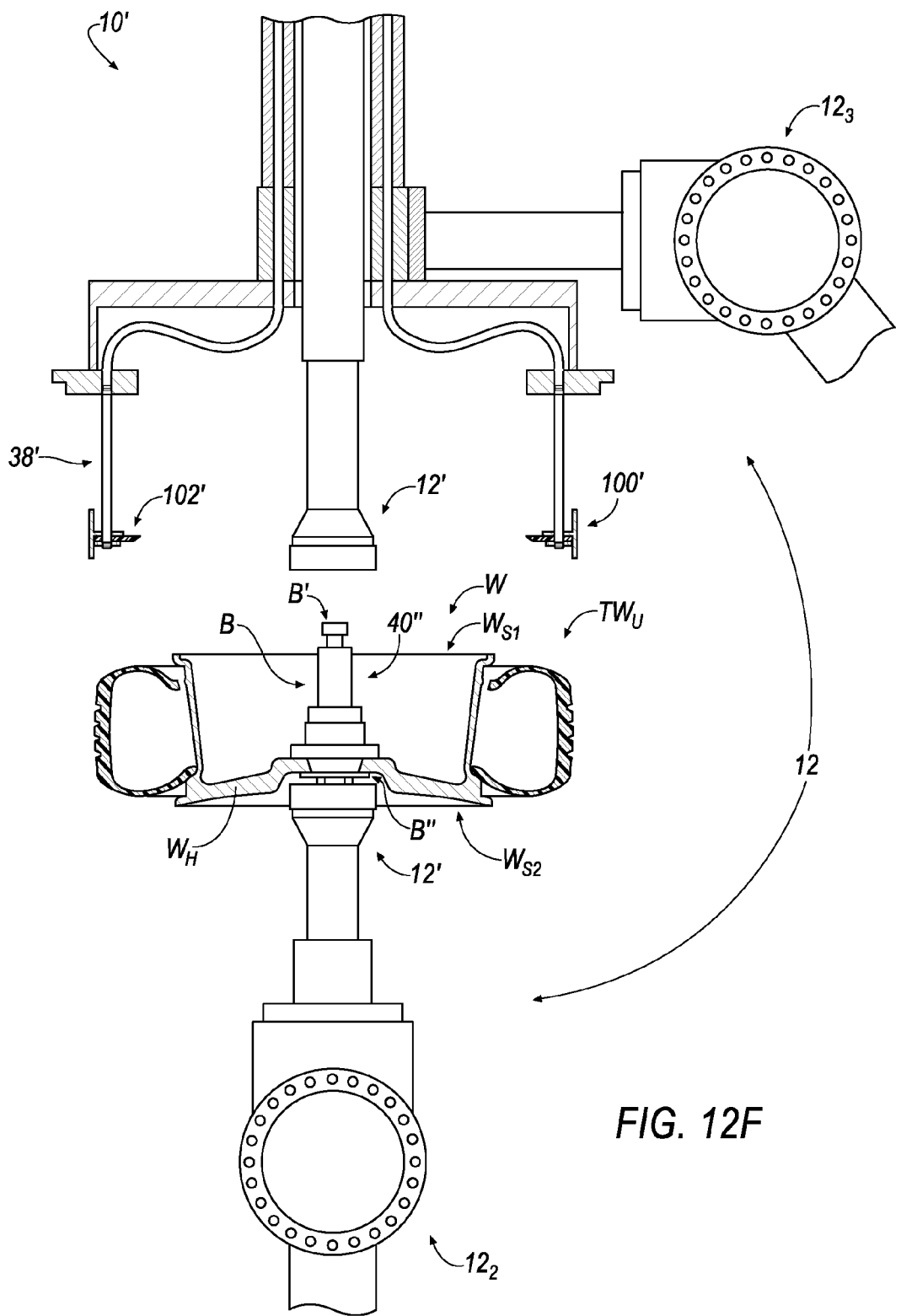
FIG. 12F illustrates the second robotic arm of FIGS. 12C-12E utilizing the retaining member to removably-affix the un-inflated tire-wheel assembly to an inflating end effecter of a robotic arm connected to an inflating apparatus.

Referring to FIGS. 12A-12F, an alternative retaining member 40" is shown in conjunction with an apparatus 10' according to an embodiment of the invention. In an embodiment, the retaining member 40" includes a baton, B, that affixed to the wheel, W. In an embodiment, the baton, B, is extended through the axially-centered passage, Wp, of the wheel, W. It will be appreciated that the baton, B, is not limited to being utilized in conjunction with the assembling end effecter 10*a* or the inflating end effecter 10*b* of the apparatus 10'. As such, although the views shown and described in FIGS. 12A-12F do not illustrate the baton, B, being utilized in conjunction with a first robotic arm associated with an assembling end effecter 10*a*, it will be appreciated that the baton, B, is not limited to being utilized in conjunction with an inflating end effecter 10*b* as shown in FIG. 12F. Thus, in a substantially similar manner as described above with respect to the apparatus 10, it will be appreciated that the baton, B, may be joined to a robotic arm associated with an assembling end effecter 10a of the apparatus 10' for subsequent, indirect interfacing of the assembling end effecter 10a of the apparatus 10' (by way of, e.g., the un-inflated tire-wheel assembly, $TW_U$) to an inflating end effecter 10b of the apparatus 10'; as such, in an embodiment, the assembling end effecter 10a may be said to "hand off" the un-inflated tire-wheel assembly, $TW_U$, to the inflating end effecter 10b of the apparatus 10' without directly engaging the inflating end effecter 10b of the apparatus 10'.

Referring initially to FIG. 12A, the baton, B, is shown being utilized in conjunction with an apparatus 10' for assembling and inflating an un-inflated tire-wheel assembly, $TW_U$. In an embodiment, the apparatus 10' includes an assembling end effecter (not shown), a plurality of robotic arms 12 (all having a similar distal interfacing end 12') and an inflating end effecter 10b (see, e.g., FIG. 12F). In an embodiment, the distal interfacing end 12' of each robotic arm of the plurality of robotic arms 12 is engagable with the baton, B, which is shown affixed to the wheel, W.

In an embodiment, the baton, B, is illustrated to include a first distal end, B', and a second distal end, B". In an embodiment, each of the first and second distal ends, B', B", of the baton, B, are selectively connectable with the distal interfacing end 12' of each of the plurality of robotic arms 12. In an embodiment, the first distal end, B', extends axially away from a hub, $W_H$, of the wheel, W, and is located proximate a first side, $W_{S1}$, of the wheel, W. In an embodiment, the second distal end, B", extends axially away from the hub, $W_H$, of the wheel, W, and is located proximate a second side, $W_{S2}$, of the wheel, W.

Functionally, it will be appreciated that the baton, B, is utilized by the plurality of robotic arms 12 in a substantially similar manner as that of a "track-and-field baton" that is utilized, for example, in a "relay race" wherein the track-and-field baton is passed from one runner participant to another runner participant. In the present embodiment of the invention, however, the baton, B, is "passed" from one robotic arm to another robotic arm of the plurality of robotic arms 12 all while the wheel, W, is attached to the baton, B, such that the plurality of robotic arms 12 may transport the wheel, W, from one processing station to another without ever directly contacting the wheel, W, with the distal interfacing end 12' of each robotic arm of the plurality of robotic arms 12. As seen in FIG. 12A, however, the wheel, W, is shown joined to the tire, T, to form an un-inflated tire-wheel assembly, $TW_U$; as such, it will be appreciated that the baton, B, may not only be utilized to carry the wheel, W, but also, the tire, T, when the wheel, W, is attached to the tire, T, to form the un-inflated tire-wheel assembly, $TW_U$.

Referring to FIG. 12A, the un-inflated tire-wheel assembly, $TW_U$, is shown disposed upon a stand, conveyor or the like such that the first distal end B' of the baton, B, projects away from the stand, conveyor or the like as the second distal end B" of the baton, B, projects toward and faces the stand, conveyor or the like. Further, in an embodiment, the distal interfacing end 12' of a first robotic arm $12_1$ is arranged proximate the first distal end, B', of the baton, B. Referring to FIG. 12B, the distal interfacing end 12' of the first robotic arm $12_1$ is selectively interfaced with the first distal end, B', of the baton, B, such that the first robotic arm $12_1$ may be connected to the baton, B, in order to permit subsequent transporting of the un-inflated tire-wheel assembly, $TW_U$, away from the stand, conveyor or the like and toward a second robotic arm $12_2$ (see, e.g., FIG. 12C).

Referring to FIG. 12C, the first robotic arm $12_1$ moves the un-inflated tire-wheel assembly, $TW_U$, such that the second distal end, B", of the baton, B, is located proximate the distal interfacing end 12' of the second robotic arm $12_2$. Referring to FIG. 12D, the distal interfacing end 12' of the second robotic arm $12_2$ is selectively interfaced with the second distal end, B", of the baton, B. Referring to FIG. 12E, upon interfacing the distal interfacing end 12' of the second robotic arm $12_2$ with the second distal end, B", of the baton, B, the distal interfacing end 12' of the first robotic arm $12_1$ is selectively de-coupled from the first distal end, B', of the baton, B. Once the distal interfacing end 12' of the first robotic arm $12_1$ is selectively de-coupled from the first distal end, B', of the baton, B, the second robotic arm $12_2$ may transport the un-inflated tire-wheel assembly, $TW_U$, to a third robotic arm $12_3$ (see, e.g., FIG. 12F).

Referring to FIG. 12F, the third robotic arm $12_3$ is shown connected to an inflation apparatus 38'. In an embodiment, the distal interfacing end 12' of the third robotic arm $12_3$ is arranged in an axial center of an inflating portion 38' that includes a substantially annular, ring-shaped seal portion 102' of an engaging assembly 100'. In an embodiment, the engaging assembly 100' functions substantially similarly to the engaging assembly 100 disclosed above in order to permit inflation of the un-inflated tire-wheel assembly, $TW_U$.

In an embodiment, the second robotic arm $12_2$ may transport the un-inflated tire-wheel assembly, $TW_U$, to the third robotic arm $12_3$, such that the distal interfacing end 12' of the third robotic arm $12_3$ may be selectively interfaced with the first distal end, B', of the baton, B. In an embodiment, once the distal interfacing end 12' of the third robotic arm $12_3$ is selectively interfaced with the first distal end, B', of the baton, B, the distal interfacing end 12' of the second robotic arm $12_2$ may be de-coupled from the second distal end, B", of the baton, B. Once the distal interfacing end 12' of the second robotic arm $12_2$ is de-coupled from the second distal end, B", of the baton, B, the axial orientation of the distal interfacing end 12' of the third robotic arm $12_3$ may be manipulated before/during/after the inflation of the un-inflated tire-wheel assembly, $TW_U$, by way of the inflating portion 38'.

Upon inflating the un-inflated tire-wheel assembly, $TW_U$, the third robotic arm $12_3$ may transport the inflated tire-wheel assembly, $TW_I$, to, for example, a stand, conveyor or the like (not shown) such that the distal interfacing end 12' of the third robotic arm $12_3$ may be de-coupled from the first distal end, B', of the baton, B. Once the distal interfacing end 12' of the third robotic arm $12_3$ may be de-coupled from the first distal end, B', of the baton, B, the baton, B, may be de-coupled from the wheel, W, such that the inflated tire-wheel assembly, $TW_I$, is no longer attached to the baton, B.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. An apparatus for processing an un-inflated tire-wheel assembly for forming an inflated tire-wheel assembly, comprising:

at least a first robotic arm and a second robotic arm forming a pair of robotic arms;

an assembling end effecter attached to the first robotic arm; and an inflating end effecter attached to the second robotic arm, wherein the assembling end effecter is indirectly interfaceable with the inflating end effecter by way of the un-inflated tire-wheel assembly.

2. The apparatus according to claim 1, wherein the assembling end effecter provides:

means for engaging a wheel, wherein the assembling end effecter attached to the first robotic arm provides means for moving the wheel through an opening of a tire for attaching the wheel to the tire for forming the un-inflated tire-wheel assembly, wherein the inflating end effecter attached to the second robotic arm provides means for engaging the wheel for permitting the assembling end effecter to selectively disengage the wheel, wherein the inflating end effecter provides means for inflating the un-inflated tire-wheel assembly for forming the inflated tire-wheel assembly after the assembling end effecter has selectively disengaged the wheel.

3. The apparatus according to claim 2, wherein the assembling end effecter includes:

at least one wheel-engaging member selectively movable from an expanded orientation to a contracted orientation to provide means for disposing the at least one wheel engaging member at least substantially proximate or adjacent a bead seat of the wheel for arranging the at least one wheel engaging member in an engagable orientation with the wheel.

4. The apparatus according to claim 3, wherein the at least one wheel-engaging member is connected to one or more components of the assembling end effecter including a base portion, a bracket, one or more flanges and at least one sliding member, wherein the at least one wheel-engaging member is connected to the at least one sliding member, wherein the at least one sliding member is connected to the one or more flanges, wherein the one or more flanges are connected to the bracket, wherein the bracket is connected to the base portion.

5. The apparatus according to claim 2, wherein the inflating end effecter includes:

a retaining member including a distal end surface, wherein the retaining member is movable from a radially-retracted, collapsed orientation to a radially-expanded, enlarged orientation to provide means for selectively engaging the distal end surface of the retaining member with an inner surface of the wheel.

6. The apparatus according to claim 5, wherein the retaining member is connected to a plunging portion and an actuating rod, wherein the actuating rod is disposed within a bore of the plunging portion.

7. The apparatus according to claim 6, wherein the movability of the retaining member from the radially-retracted, collapsed orientation to the radially-expanded, enlarged orientation is responsive to an axial movement of the actuating rod.

8. The apparatus according to claim 7, wherein the retaining member includes:

a pair hinged assemblies including a first hinged assembly and a second hinged assembly; and a carrier member coupled to the pair of hinged assemblies.

9. The apparatus according to claim 8, wherein each of the first hinged assembly and the second hinged assembly includes:

a pair of hinge arms including a first hinge arm and a second hinge arm;

a pair of hinge arm brackets connected to the pair of hinge arms, wherein the pair of hinge arm brackets include a first hinge arm bracket and a second hinge arm bracket.

10. The apparatus according to claim 9, wherein the first hinged assembly and the second hinged assembly are attached to an outer surface of the plunging portion by one or more pins, wherein the sleeve member is attached to the actuating rod by an actuating pin that extends through one or more slots formed in the plunging portion.

11. The apparatus according to claim 10, wherein the connection of the sleeve member to the actuating rod by way of the actuating pin provides:

means for transmitting an axial force applied to the actuating pin from the actuating rod to the sleeve member for causing the sleeve member to move in axial tandem with the actuating rod for imparting the axial force to the first hinged assembly and the second hinged assembly for causing the first hinged assembly and the second hinged assembly to form the radially-expanded, enlarged orientation of the retaining member.

12. The apparatus according to claim 8, wherein each of the first hinged assembly and the second hinged assembly of the retaining member includes a first pair of hinge arms;

a second pair of hinge arms connected to the first pair of hinge arms;

a carrier member including a first distal end and a second, distal end, wherein the first distal end is connected to the first pair of hinge arms, wherein the second distal end is connected to the second pair of hinge arms; and pins that extend through and connect the first pair of hinge arms to the second pair of hinge arms as well as the carrier member to each of the first and second pairs of hinge arms.

13. The apparatus according to claim 12, wherein the carrier member includes a stem portion, wherein the second distal end is fixed to the stem portion, wherein the first distal end is slidably-disposed relative the stem portion.

14. The apparatus according to claim 13, wherein the first distal end is connected to the actuating rod to provide:

means for transmitting an axial force from the actuating rod to the first distal end to the carrier member for causing the first distal end of the carrier member to move in axial tandem with the actuating rod relative the stem portion for imparting the axial force to the first hinged assembly and the second hinged assembly for causing the first hinged assembly and the second hinged assembly to form the radially-expanded, enlarged orientation of the retaining member.

15. A component of an apparatus for processing an un-inflated tire-wheel assembly including a wheel and a tire for forming an inflated tire-wheel assembly, the apparatus including at least a first robotic arm and a second robotic arm forming a pair of robotic arms, an assembling end effecter attached to the first robotic arm, and an inflating end effecter attached to the second robotic arm, wherein the assembling end effecter is indirectly interfaceable with the inflating end effecter by way of the un-inflated tire-wheel assembly, the component comprising:

a retaining member selectively attached to at least one of the assembling end effecter and the inflating end effecter, wherein the retaining member includes a distal end surface, wherein the retaining member is movable from a radially-retracted, collapsed orientation to a radially-expanded, enlarged orientation to provide means for selectively engaging the distal end surface of the retaining member with an inner surface of the wheel.

16. The component of the apparatus according to claim 15, wherein the retaining member is connected to a plunging portion and an actuating rod, wherein the actuating rod is disposed within a bore of the plunging portion.

17. The component of the apparatus according to claim 16, wherein the movability of the retaining member from the radially-retracted, collapsed orientation to the radially-expanded, enlarged orientation is responsive to an axial movement of the actuating rod.

18. The apparatus according to claim 17, wherein the retaining member includes
a pair hinged assemblies including a first hinged assembly and a second hinged assembly; and
a carrier member coupled to the pair of hinged assemblies.

19. The component of the apparatus according to claim 18, wherein each of the first hinged assembly and the second hinged assembly includes:
a pair of hinge arms including a first hinge arm and a second hinge arm;
a pair of hinge arm brackets connected to the pair of hinge arms, wherein the pair of hinge arm brackets include a first hinge arm bracket and a second hinge arm bracket.

20. The component of the apparatus according to claim 19, wherein the first hinged assembly and the second hinged assembly are attached to an outer surface of the plunging portion by one or more pins, wherein the sleeve member is attached to the actuating rod by an actuating pin that extends through one or more slots formed in the plunging portion.

21. The component of the apparatus according to claim 20, wherein the connection of the sleeve member to the actuating rod by way of the actuating pin provides:
means for transmitting an axial force applied to the actuating pin from the actuating rod to the sleeve member for causing the sleeve member to move in axial tandem with the actuating rod for imparting the axial force to the first hinged assembly and the second hinged assembly for causing the first hinged assembly and the second hinged assembly to form the radially-expanded, enlarged orientation of the retaining member.

22. The component of the apparatus according to claim 18, wherein each of the first hinged assembly and the second hinged assembly of the retaining member includes:
a first pair of hinge arms;
a second pair of hinge arms connected to the first pair of hinge arms;
a carrier member including a first distal end and a second, distal end, wherein the first distal end is connected to the first pair of hinge arms, wherein the second distal end is connected to the second pair of hinge arms; and
pins that extend through and connect the first pair of hinge arms to the second pair of hinge arms as well as the carrier member to each of the first and second pairs of hinge arms.

23. The component of the apparatus according to claim 22, wherein the carrier member includes a stem portion, wherein the second distal end is fixed to the stem portion, wherein the first distal end is slidably-disposed relative the stem portion.

24. The component of the apparatus according to claim 23, wherein the first distal end is connected to the actuating rod to provide:
means for transmitting an axial force from the actuating rod to the first distal end to the carrier member for causing the first distal end of the carrier member to move in axial tandem with the actuating rod relative the stem portion for imparting the axial force to the first hinged assembly and the second hinged assembly for causing the first hinged assembly and the second hinged assembly to form the radially-expanded, enlarged orientation of the retaining member.

25. A component utilized for processing an un-inflated tire-wheel assembly including a wheel and a tire for forming an inflated tire-wheel assembly, comprising:
a retaining member forming a baton that is affixed to the wheel, wherein the baton extends through a passage formed by the wheel, wherein the baton includes a first distal end and a second distal end, wherein the first distal end extends axially away from a hub of the wheel, wherein the first distal end is located proximate a first side of the wheel, wherein the second distal end extends axially away from the hub of the wheel, wherein the second distal end is located proximate a second side of the wheel.

26. The component of the apparatus according to claim 25, wherein the baton is utilized in conjunction with a system, the system including
at least first robotic arm and a second robotic arm, wherein each of the first and second robotic arms include
a distal interfacing end, wherein the distal interfacing end of the first robotic arm is interfaceable with one of the first distal end and the second distal end of the baton, wherein the distal interfacing end of the second robotic arm is interfaceable with one of the other of the first distal end and the second distal end of the baton.

27. The component of the apparatus according to claim 26, wherein the baton provides:
means for permitting one or more of the first robotic arm and the second robotic arm to indirectly engage the wheel in order to move one or more of the wheel and during the processing of the un-inflated tire-wheel assembly including the wheel and the tire for forming the inflated tire-wheel assembly.

28. A component of an apparatus for processing an un-inflated tire-wheel assembly including a wheel and a tire for forming an inflated tire-wheel assembly, the apparatus including at least a robotic arm and an assembling end effecter attached to the robotic arm, the component comprising:
an assembly connected to the assembling end effecter, wherein the assembly connected to the assembling end effecter provides
means for engaging the wheel, wherein the assembling end effecter attached to the first robotic arm provides
means for moving the wheel through an opening of the tire for attaching the wheel to the tire for forming the un-inflated tire-wheel assembly, wherein the assembly includes
at least one wheel-engaging member selectively movable from an expanded orientation to a contracted orientation to provide
means for disposing the at least one wheel engaging member at least substantially proximate or adjacent a bead seat of the wheel for arranging the at least one wheel engaging member in an engagable orientation with the wheel.

29. The component of the apparatus according to claim 28, wherein the assembly further includes a base portion, a bracket, one or more flanges and at least one sliding member, wherein the at least one wheel-engaging member is connected to the at least one sliding member, wherein the at least one sliding member is connected to the one or more flanges, wherein the one or more flanges are connected to the bracket,
wherein the bracket is connected to the base portion.

* * * * *